United States Patent
McNulty et al.

(10) Patent No.: US 7,146,407 B2
(45) Date of Patent: *Dec. 5, 2006

(54) DATA SYNCHRONIZATION MECHANISM FOR INFORMATION BROWSING SYSTEMS

(75) Inventors: John Edward McNulty, Oakland, CA (US); Catherine Lee Mulford, San Francisco, CA (US)

(73) Assignee: PocketThis, Inc., Oakland, CA (US)

( * ) Notice: Subject to any disclaimer, the term of this patent is extended or adjusted under 35 U.S.C. 154(b) by 647 days.

This patent is subject to a terminal disclaimer.

(21) Appl. No.: 10/037,489

(22) Filed: Oct. 22, 2001

(65) Prior Publication Data

US 2003/0093495 A1   May 15, 2003

(51) Int. Cl.
*G06F 15/16*   (2006.01)

(52) U.S. Cl. ............... 709/217; 709/219; 709/213; 707/3; 707/10; 455/412.1

(58) Field of Classification Search ............... 709/248, 709/203, 217, 219, 213, 224; 707/3, 10; 455/412.1

See application file for complete search history.

(56) References Cited

U.S. PATENT DOCUMENTS

| | | | |
|---|---|---|---|
| 6,049,796 A * | 4/2000 | Siitonen et al. ............ 707/3 |
| 6,192,416 B1 * | 2/2001 | Baxter ............ 709/248 |
| 6,272,545 B1 * | 8/2001 | Flanagin et al. ............ 709/228 |
| 6,343,287 B1 * | 1/2002 | Kumar et al. ............ 707/4 |
| 6,389,461 B1 * | 5/2002 | Shah ............ 709/217 |
| 6,671,757 B1 * | 12/2003 | Multer et al. ............ 710/100 |
| 6,678,741 B1 * | 1/2004 | Northcutt et al. ............ 709/248 |
| 6,741,690 B1 * | 5/2004 | Eisinger et al. ............ 379/201.12 |
| 6,766,363 B1 * | 7/2004 | Rothschild ............ 709/219 |
| 6,813,489 B1 * | 11/2004 | Wu et al. ............ 455/412.1 |
| 6,823,373 B1 * | 11/2004 | Pancha et al. ............ 709/219 |
| 6,985,902 B1 * | 1/2006 | Wise et al. ............ 707/10 |
| 7,050,790 B1 * | 5/2006 | Yamaga ............ 455/412.1 |
| 7,051,079 B1 * | 5/2006 | Tanaka et al. ............ 709/217 |
| 7,062,484 B1 * | 6/2006 | Pass ............ 707/3 |

* cited by examiner

*Primary Examiner*—Saleh Najjah
*Assistant Examiner*—Faruk Hamza
(74) *Attorney, Agent, or Firm*—James D. Ivey

(57) ABSTRACT

Data objects are gathered and organized through a computer system and stored for subsequent access through a computer network by a mobile device such as a wireless telephone. The data objects have attributes and can be acted upon using predefined actions and associated types to greatly simplify user accessibility to such data objects through the limited user interface and bandwidth capabilities of a mobile device.

10 Claims, 48 Drawing Sheets

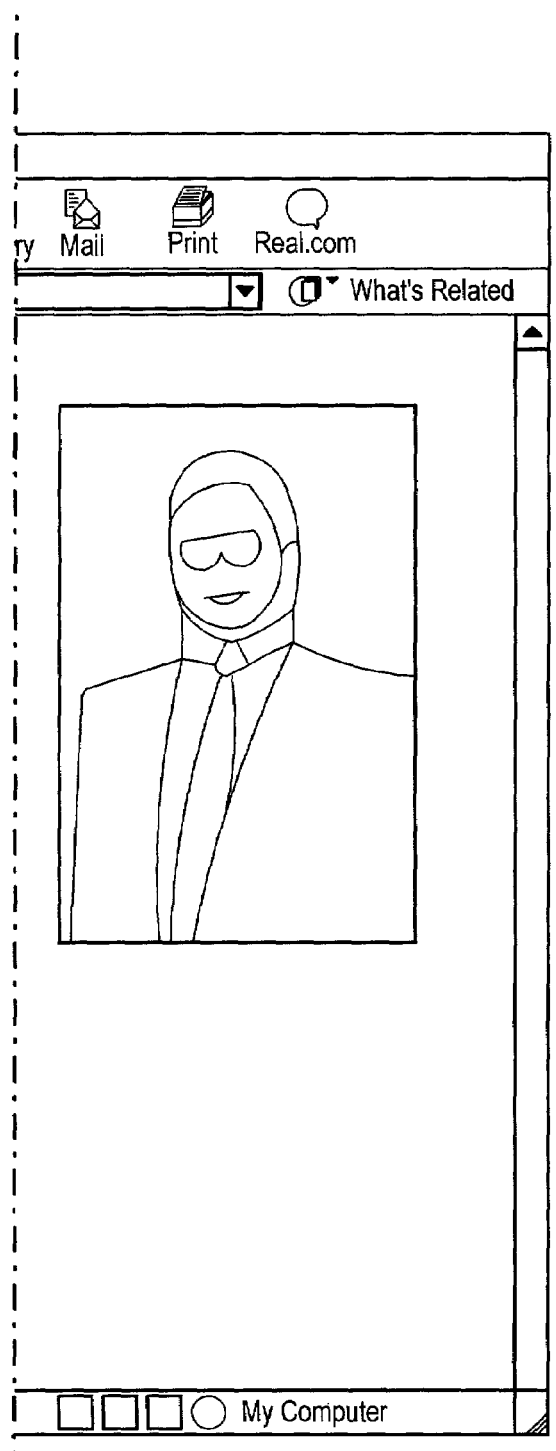
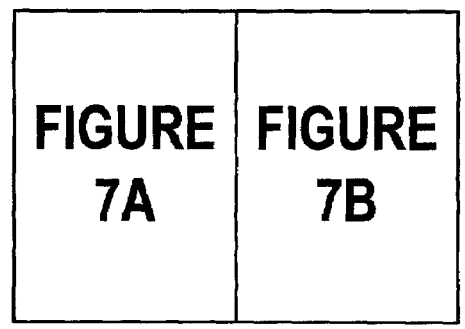
FIGURE 7A | FIGURE 7B
FIGURE 7
FIGURE 7B

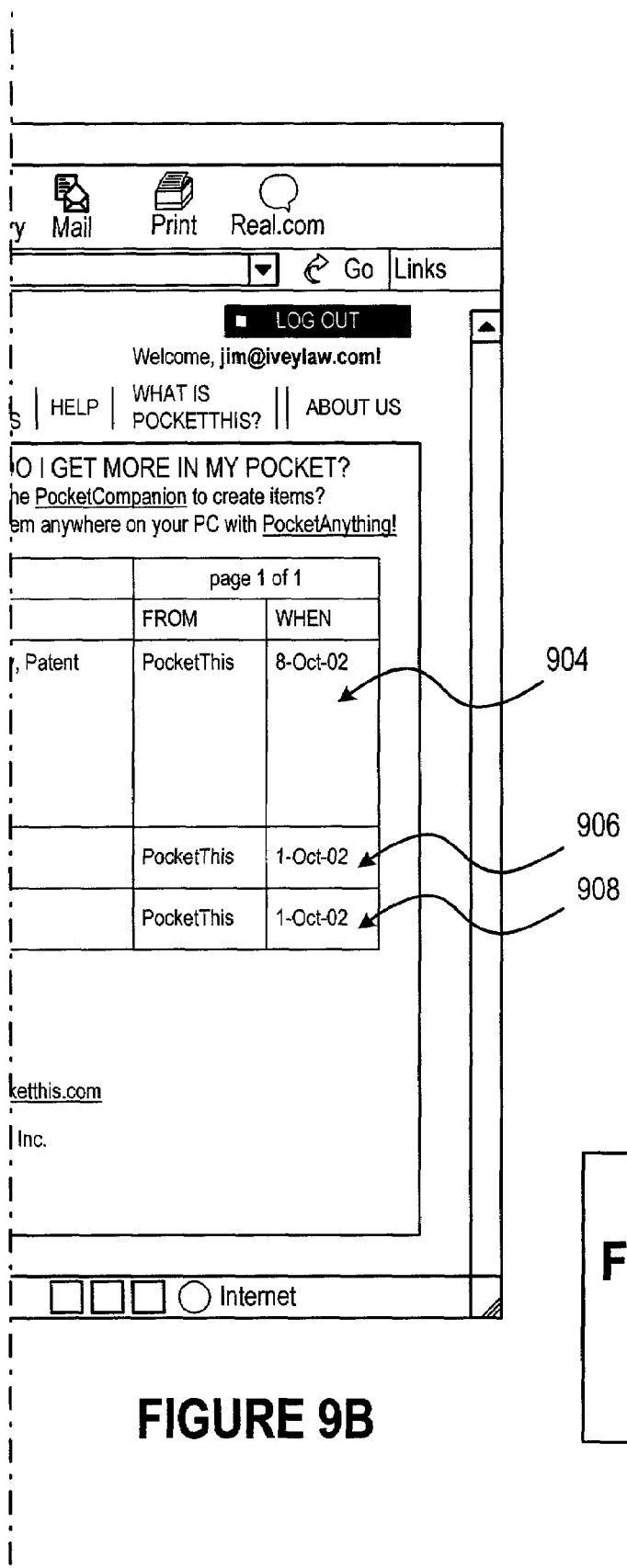
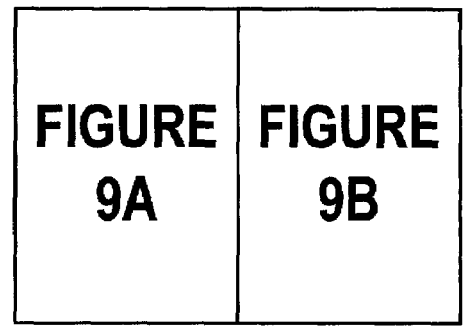
FIGURE 9B
FIGURE 9

FIGURE 35B tions | httpunit | XML docs | java | java.lang | java.util | java.lo

Google ▼ [         ] ▼ Search Web

■ LOG OUT

Welcome, jhull@pocketthis.com!

| MY POCKET | USER GUIDE | POCKET SETTINGS | HELP | WHAT IS POCKETTHIS? | ABOUT US |

HOW DO I GET MORE IN MY POCKET?

Launch the PocketCompanion to create items!
Pocket from anywhere on your PC with PocketAnythir

[Add Item] [New Folder]

der: [My Pocket ▼]    page 1 of 1

| MEMO | FROM |
|---|---|
| I hope the government stops going after them | PocketThis 08-Oct-01 |
| | PocketThis 08-Oct-01 |
| | PocketThis 08-Oct-01 |
| Meeting for dinner at 9 pm | PocketThis 08-Oct-01 |
| | PocketThis 08-Oct-01 |
| | PocketThis 08-Oct-01 |
| MEMO | FROM | der: [My Pocket ▼]    page 1 of 1

◯ Local Intrane

FIGURE 39B tions | e httpunit | e XML docs | e java | e java.lang | e java.util | e java.lo Google - [ ] Search Web

■ LOG OUT

Welcome, jhull@pocketthis.com!

| MY POCKET | USER GUIDE | POCKET SETTINGS | HELP | WHAT IS POCKETTHIS? | ABOUT US |

HOW DO I GET MORE IN MY POCKET?

Launch the PocketCompanion to create items!
Pocket from anywhere on your PC with PocketAnythir

[ Add Item ] [ New Folder ]

der: [ My Pocket ▼ ]     page 1 of 1

| MEMO | FROM |
| --- | --- |
| Movie coming out soon | PocketThis 08-Oct-01 |
| I hope the government stops going after them | PocketThis 08-Oct-01 |
|  | PocketThis 08-Oct-01 |
|  | PocketThis 08-Oct-01 |
| Meeeting for dinner at 9 pm | PocketThis 08-Oct-01 |
|  | PocketThis 08-Oct-01 |
|  | PocketThis 08-Oct-01 |

□ □ ○ Local Intran

FIGURE 45A

PocketThis | My Pocket - Microsoft Internet Explorer provided by @Home

File  Edit  View  Favorites  Tools  Help  |  Links  qadb  LocalPocketThis  colle Back  Search  Favorites  History Address http://nepal/us/www/sl.asp?

PocketThis

MY POCKET

[ Delete Selected ]    [ Move Selected ]    to fo

| | ACTIONS | NAME | INFORMATION |
|---|---|---|---|
| ☐ | | PocketThis | 1922 Webster St<br>Oakland, CA 94612<br>(510) 835 4300 |
| ☐ | | Harry Potter and the Goblet of Fire | By JK Rowling<br>$18.16<br>ISBM: 0439139597 |
| ☐ | | MSFT | Company: MICROSOFT CP<br>Last Trade: $57.96, 6:49 PM GMT<br>Change: +0.24<br>Exchange: NasdaqNM |
| ☐ | | Hilton | 40 Dalton Str<br>Boston, MA<br>(617) 236 1100 |
| ☐ | | Boston Flight | 09-Oct-01<br>United Airlines Flt. 998 SFO-BOS<br>depart SFO 9:00 AM<br>arrive BOS 5:38 PM |
| ☐ | | Aujourd'hui Restaurant | 200 Boylston St<br>Boston, Ma<br>(617) 451 1392 |
| ☐ | | work | 1922 Webster St<br>Oakland, CA 94612 |

Done

FIGURE 45B

;tions  e httpunit  e XML docs  e java  e java.lang  e java.util  e java.lo

Google ▼ [          ] ▼ Search Web

■ LOG OUT

Welcome, jhull@pocketthis.com!

| MY POCKET | USER GUIDE | POCKET SETTINGS | HELP | WHAT IS POCKETTHIS? | ABOUT US |

HOW DO I GET MORE IN MY POCKET?

Launch the PocketCompanion to create items!
Pocket from anywhere on your PC with PocketAnythir'

[Add Item]  [New Folder]

der: [My Pocket ▼]          page 1 of 1

| MEMO | FROM |
|---|---|
|  | PocketThis 08-Oct-01 |
| Movie coming out soon | PocketThis 08-Oct-01 |
| I hope the government stops going after them | PocketThis 08-Oct-01 |
|  | PocketThis 08-Oct-01 |
|  | PocketThis 08-Oct-01 |
| Meeting for dinner at 9 pm | PocketThis 08-Oct-01 |
|  | PocketThis 08-Oct-01 |

□ □ ○ Local Intran

4500

DATA SYNCHRONIZATION MECHANISM FOR INFORMATION BROWSING SYSTEMS

FIELD OF THE INVENTION

This invention relates to the field of data organization systems, and more specifically to a system for organizing information accessible to two or more information browsing devices.

BACKGROUND OF THE INVENTION

The growth of the Internet over the past few years has been tremendous—both in terms of the number of people accessing information through the Internet and in terms of the amount and nature of information available through the Internet. Information services now available on the Internet include driving directions between two addresses, nearly up-to-the-minute stock quotes, and directories of addresses and telephone numbers. In addition, the Internet has been a platform for offering a number of services including, for example, purchasing goods and services, making reservations at restaurants and hotels, purchasing airline tickets, and other services pertaining to vacations and travel generally.

The accessibility of such information and services to the typical user is greatly enhanced by organization of such information and user interface tools into multimedia documents known generally as Web pages. Such multimedia documents can include images, text, audio, motion video, and active computer instructions (e.g., Java™ scripts) to effectively and efficiently communicate information to the user and to provide intuitive and self-explanatory user interface mechanisms. In addition, such multimedia documents can refer to other multimedia documents to provide a hierarchical information structure to suit the specific informational needs of individual users. These tools, while conventional, provide a highly effective information browsing experience for the user.

The user's experience is frequently described as browsing or surfing since the user picks and chooses her way through the apparent sea of information to find her own path to her own information of interest. The descriptive terms of browsing and surfing seem particularly apt as broadband Internet access increases in popularity making the Internet user's experience a truly multimedia one.

If the general Internet is an apparent sea of information, accessing the Internet through a web-capable wireless telephone seems like a trickle of information by comparison. While many Internet-capable computer systems have screen resolutions of 1024 by 768 pixels or greater, 105-key keyboards, a pointing device such as a mouse or trackball, and sound capability; most Internet-capable wireless telephones are limited to just a few lines of just a few characters of alphanumeric text and input keypads of little more than a dozen keys. In addition, communications bandwidth of Internet-capable wireless telephones is also severely limited relative to the typical Internet-capable computer. If surfing in a sea aptly describes the typical user's experience through an Internet-capable computer, a typical user's experience in accessing information in an Internet-capable wireless telephone can sometimes feel like building a model ship in a bottle.

This limited browsing experience through mobile devices such as wireless telephones is exacerbated by the fact that the user is typically preoccupied with other activities while using the mobile device to browse information. Mobile device derive their value primarily from their mobility and are therefore likely to be used when the user is preoccupied with other activities. Mobile devices are therefore frequently used with only one hand and in manners in which the user's physical control of the mobile device is other otherwise compromised. As a result, mobile devices are not particularly well suited for handling large amounts of information and the user's interest is typically highly localized to a small amount of very specific information.

Of course, the great advantage of Internet access through a wireless telephone is the ability to access information of the apparent sea of information of the Internet while out and about—such as while commuting or while traveling away from home or while out shopping, for example. However, a better way to access information through an Internet-capable wireless telephone is highly desirable.

SUMMARY OF THE INVENTION

In accordance with the present invention, a user of a base system such as a desktop computer system organizes information stored on a server system for subsequent access by the user through a mobile device such as a wireless telephone. The server system is coupled to both the base system and the mobile device through a wide area computer network such as the Internet, for example.

The user organizes information of interest using all the storage, bandwidth, multimedia, and user interface capabilities of a general purpose, modern computer system. Such information is gathered from local software applications on the base system such as personal information manager (PIM) programs or from any of a number of other computer systems through the wide area network. Thus, in accordance with the present invention, the user can use full bandwidth and full multimedia and user interface capabilities to navigate and collect information through the Internet for convenient, immediate, subsequent access through the mobile device.

When accessing the information through the mobile device, the server system provides a list of one or more data objects representing information previously gathered by the user, wherein each of the data objects can be accessed through the mobile device with a single user-interface gesture, e.g., by pressing a single key of a numeric keypad on the mobile device.

Each of the data objects stored by the server system representing information gathered and submitted by the user is associated with a data type according to which the content of each data object is organized into attributes and according to which actions are applicable to the data object. For example, information of a place type data object includes a name attribute, a street address attribute, a city attribute, a telephone number attribute, etc. Actions associated with a place type data object include initiating a telephone call to the telephone number of the place, getting driving directions to or from the address of the place, etc.

Some of the actions are performed by the mobile device. For example, initiating a telephone call in the mobile device uses data of the place object already displayed on the mobile device in conjunction with an initiate telephone call instruction performed by the mobile device. Others of the actions are performed primarily by the server system, using the mobile device primarily for user interface purposes. For example, in obtaining driving directions relative to a place object, the server system prompts the user, through the mobile device, to specify whether the place data object currently displayed is the origin or destination of the trip for which directions are sought and for another place which specifies the other end of the trip. The system server requests directions for the trip from a map server through a wide area network such as the Internet and formats the resulting driving directions for display on the user's mobile device and sends the formatted directions for such display.

Thus, while the Internet is generally very open-ended and user's are free to meander about the virtual sea of information using apt multimedia-capable computer system and apt user input devices, a user is free to organize information gathered from the Internet or from her computer for storage in a number of predefined data types with associated actions such that the user's interaction with the Internet through a mobile device with limited display capabilities, limited bandwidth, and limited user input devices can be prearranged and customized by the user. Such improves dramatically the usability of Internet-capable mobile devices for the types of tasks they are likely to be used in an Internet context.

DETAILED DESCRIPTION

Figure 1:
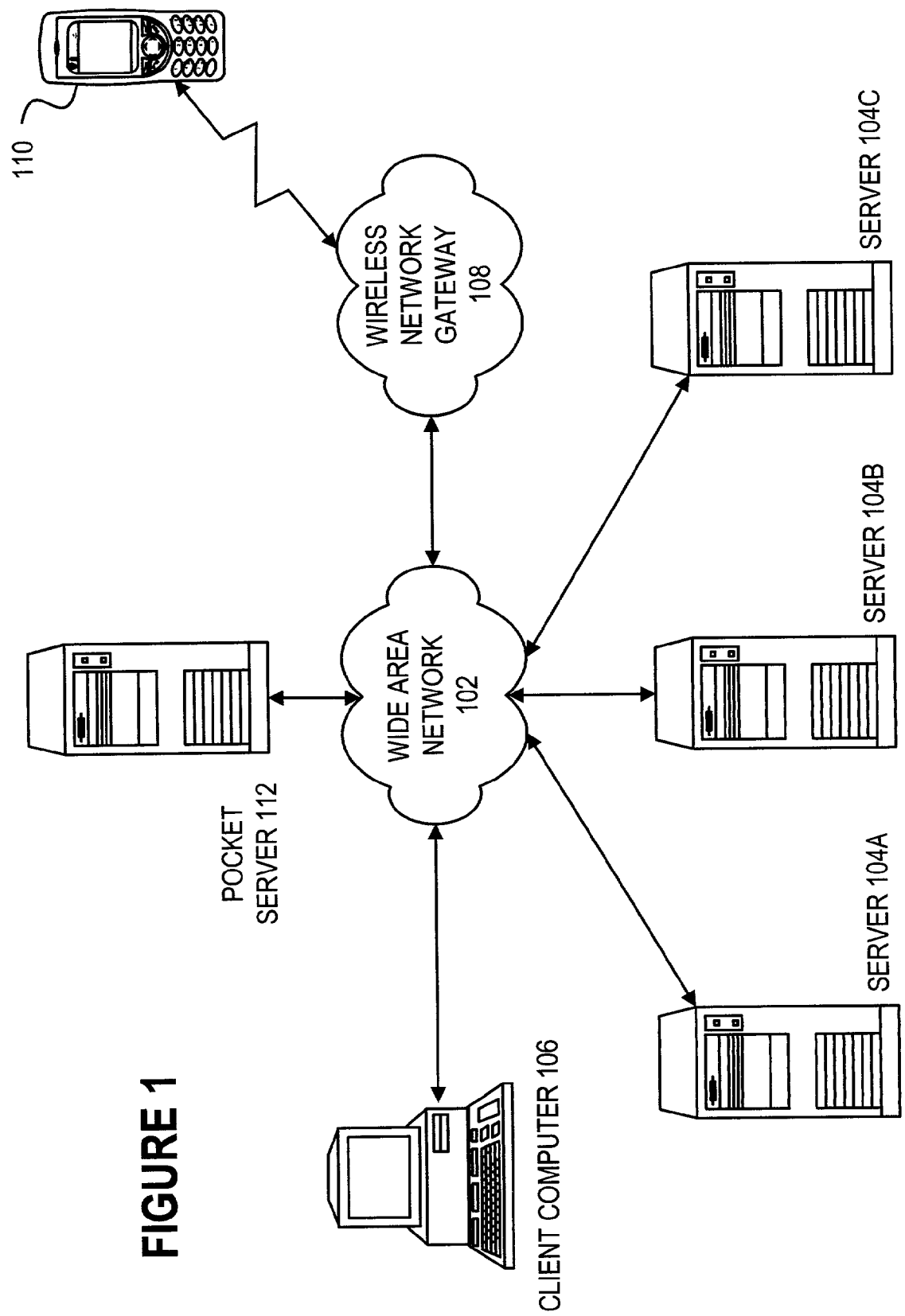
FIG. 1 is a block diagram of a wide area computer network in which the present invention can be implemented and which includes a pocket server in accordance with the present invention.

In accordance with the present invention, information accessible by an Internet-capable mobile device is gathered and organized using an Internet-capable computer. Thus, the full bandwidth, multimedia capabilities, and user interface efficiencies of a general purpose computer is used by the user to collect and organize specific information of interest and to make that specific information readily accessible through a mobile device with limited bandwidth, display, and user interface capabilities. In addition, actions are associated with and actionable upon the specific information to provide significant user interface leverage, i.e., allowing the user to process such specific information with very little interaction with the mobile device. To facilitate appreciation and understanding of the invention, a few aspects of information browsing in a wide area network 102 are briefly described.

Servers 104A–C are server computers which provide information and/or services through wide area network 102. In this illustrative embodiment, wide area network 102 is the Internet. Of course, while only three (3) servers 104A–C are shown, wide area network 102 can be coupled to many more servers. Servers 104A–C provide information and/or services through wide area network 102 to numerous users in a conventional and known manner. Servers 104A–C are conventional and are not described further herein.

A user accesses such information and/or services through a client computer system 106 which is similarly known and conventional. The user in this illustrative embodiment also uses a wireless telephone 110 which is capable of accessing information and/or services of servers 104A–C through wide area network using a wireless network gateway 108. Wireless telephone 110 and wireless network gateway 108 are known and conventional. In this illustrative embodiment, wireless telephone 110 implements the known and conventional Wireless Application Protocol (WAP) to access such information and/or services. Wireless telephone 110 can use other protocols for data communications as well, including the Short Message Service (SMS) protocol.

A pocket server 112 enables the user of client computer 106 and wireless telephone 110 to collect and organize information for later access through wireless telephone 110 in accordance with the present invention. Pocket server 112 is shown in greater detail in FIG. 2.

Pocket server 112 includes a base system interface 202 for interacting with client computer 106 and other, similar Internet-capable computers of other users. Base system interface 202 serves requests from clients, such as client computer 106, which are presumed to have substantial data bandwidth capabilities, multimedia and presentation capabilities, and considerable user interface capabilities. In a manner described more completely below, the user of client computer 106 collects data through wide area network 102 (FIG. 1), e.g., from servers 104A–C, and submits the data to base system interface 202 (FIG. 2) for storage in a pocket dataset 204 for subsequent retrieval using wireless telephone 110 (FIG. 1).

One of the more significant advantages of Internet-capable wireless telephones, such as wireless telephone 110, is the ability to perform telephony actions upon data retrieved from the Internet. In addition, one of the more significant advantages of the Internet is the ability to tailor information retrieved from the Internet according to data entered by the user. To preserve these advantages, a number of actions, e.g., pocket item actions 208, are associated with various types of data received through base system interface 202. To determine which of actions 208 pertain to which data objects of pocket dataset 204, each data object stored in pocket dataset 204 is associated with one of pocket item types 206. Thus, pocket server 112 is able to distinguish an address from an airline flight reservation and different actions are associated with each.

Figure 3:
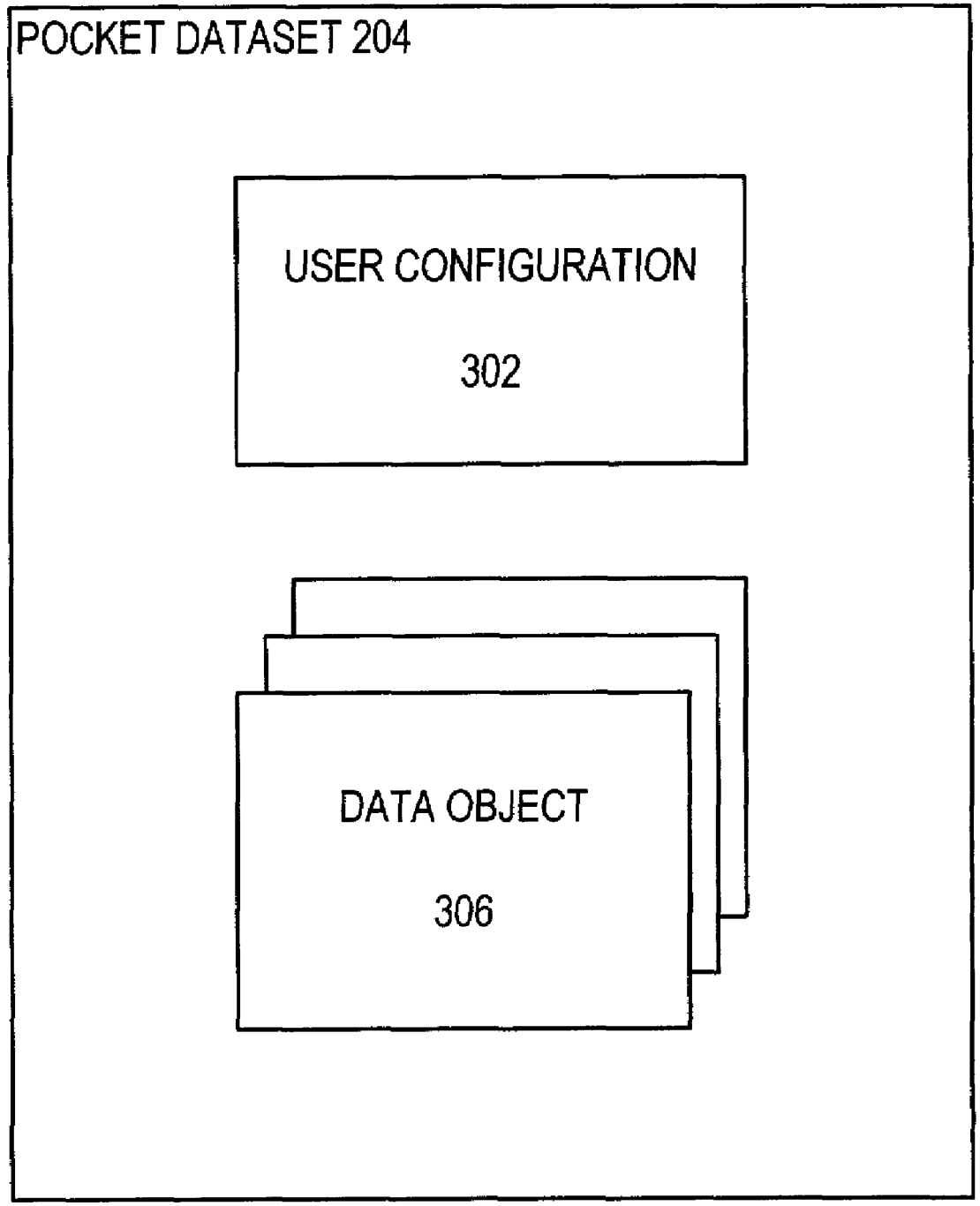
FIG. 3 is a block diagram of a pocket data set of FIG. 2 in greater detail.

Pocket dataset 204 for the subject user is shown in greater detail in FIG. 3. The subject user is a user of client computer 106 (FIG. 1) and wireless telephone 110 in accessing information and services through wide area network 102 in an illustrative example of the described illustrative embodiment of the present invention. Pocket dataset 204 (FIG. 3) includes a user configuration 302 and one or more data objects 306. Data objects 306 comport with the object-oriented programming paradigm of computer software development in that data objects have both a state defined by one or more attributes and a behavior defined by one or more methods specified for a class of objects, data objects 306 in this illustrative embodiment support neither inheritance nor polymorphism, both of which are known aspects of some object-oriented programming languages. In alternative embodiment, inheritance, polymorphism, or both can be supported for data objects 306.

Figure 4:
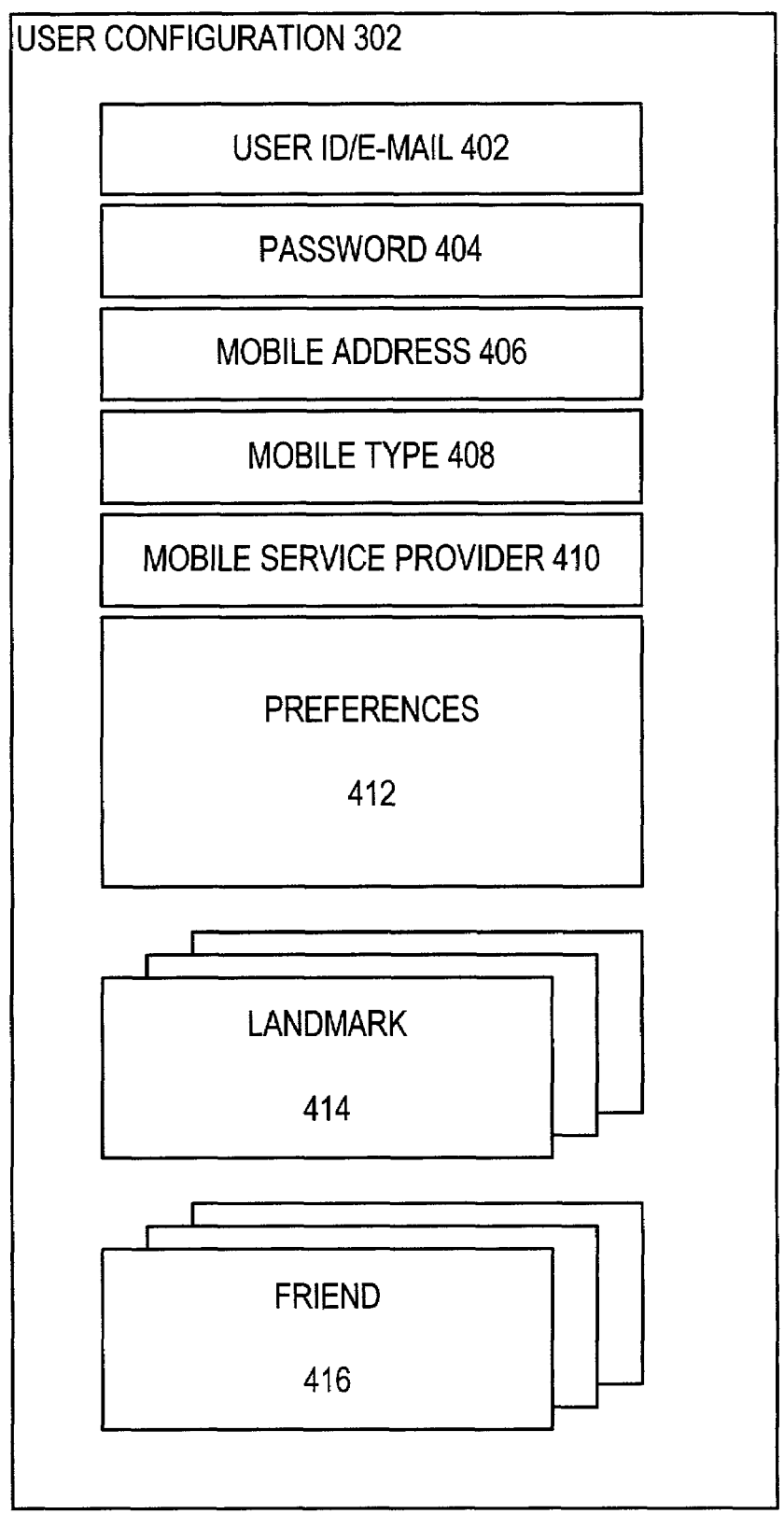
FIG. 4 is a block diagram of a user configuration of FIG. 3 in greater detail.

User configuration 302 is shown in greater detail in FIG. 4. User configuration 302 includes the following data fields: (i) user identifier/e-mail address 402; (ii) password 404; (iii) mobile address 406; (iv) mobile type 408; (v) mobile service provider 410; (vi) preferences 412; (vii) landmarks 414; and (viii) friends 416.

User identifier 402 is an e-mail address of the subject user in this illustrative embodiment. Typically, this is the e-mail address through which the subject user is reachable through client computer 106 (FIG. 1). In this illustrative embodiment, user identifier 402 serves the dual purposes of unique identification of the subject user and specifying a means by which a message can be sent to the subject user. In an alternative embodiment, the user's identifier can be independent of, and different from, the user's e-mail address.

Password 404 is maintained in secrecy and is specified by the subject user, in combination with user identifier 402, for authentication purposes.

Mobile address 406 is a network address by which the subject user can receive data on wireless telephone 110. Typically, mobile address 406 is a telephone number by which wireless telephone 110 is reached. Mobile type 408 specifies the type of mobile system used by the subject user. Such types can include, for example, WAP wireless telephone, SMS (Short Message Service) wireless telephone, two-way alphanumeric pager, and personal digital assistant (PDA). Mobile service provider 410 specifies the organization which is responsible for delivering data to wireless telephone 110 (FIG. 1), i.e., the owner of wireless network gateway 108.

Preferences 412 specify one or more preferences specified by the subject user. In this illustrative embodiment, a single user preference is supported. In particular, the user can specify whether adding a new data object 306 (FIG. 3) to the user's pocket dataset 204 causes a text message summarizing the added object to be immediately sent to the user's mobile system, e.g., wireless telephone 110. Of course, other user preferences can be specified within preferences 412 (FIG. 4).

Landmarks 414 each specify a location which is frequently used by the subject user. Typically, one of landmarks 414 specify the user's home address and another specifies the user's work address. Landmarks 414 provide a particularly useful feature of the information management system according to the present invention. Since the raison d'etre of a mobile device is that it is mobile, location-oriented services through wide area network are particularly useful. However, such location-oriented services frequently require that an address is specified by the user. Since an address typically includes both numerical and alphanumerical data, specification of an address using only a numeric keypad of a mobile device is particularly tedious for a user. A numeric keypad is the sole input device for textual input in many mobile devices. Entering an address using a numeric keypad is particularly difficult if the user is distracted with other activities which is frequently the case for users of mobile devices. Allowing the user to enter and store frequently used locations as landmarks 414 greatly simplifies use of location-specific services as described more completely below.

Friends 416 each specify another user of the system implemented by pocket server 112. Like landmarks 414, friends 416 enable the user to use the full user interface capabilities of a general purpose computer such as client computer 106 to enter frequently contacted people with whom the subject user is likely to share information for easy subsequent retrieval or reference using wireless telephone 110 in a manner described more completely below.

Figure 5:
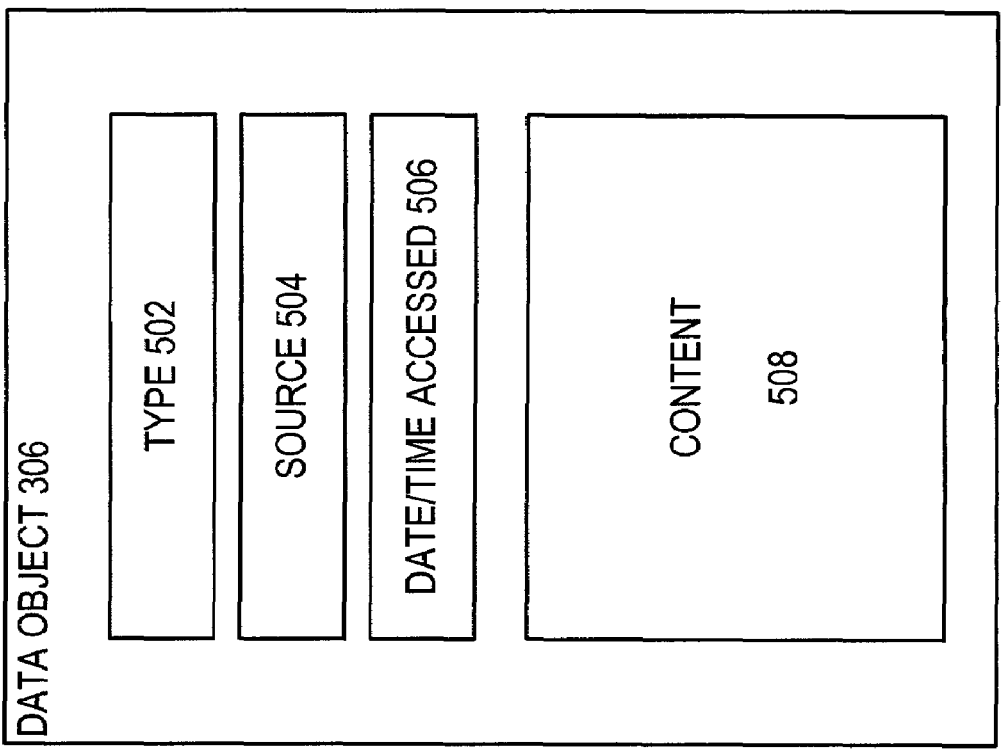
FIG. 5 is a block diagram of a data object of FIG. 3 in greater detail.

Data object 306 (FIG. 3) is shown in greater detail in FIG. 5. Data object 306 includes the following data fields: a type 502, a source 504, an accessed date 506, and content 508.

Type 502 specifies one of pocket item types 206 (FIG. 2) as defining the attributes and actions of data object 306 (FIG. 5). Source 504 specifies the source data object 306. Data objects can be added to pocket dataset 204 (FIG. 3) from any of a number of sources, several of which are described more completely below. Briefly, the subject user can add data object 306 by use of client computer 106 (FIG. 1), the subject user can add data object 306 by user of wireless telephone 110, and another user can send data object 306 to pocket dataset 204 of the subject user, for example. Source 504 specifies from which of these data object 306 originated. Accessed date 506 (FIG. 5) specifies a time and date of the most recent access of the substantive content or other part of data object 306.

Content 508 represents the substantive data of data object 306, i.e., the data intended to be accessible by the subject user through wireless telephone 110 (FIG. 1). The substantive data represented by content 508 is organized in a manner specified by the specific attributes defined for the type of data object 306 as specified in type 502. Accordingly, individual attributes of content 506 are accessible for processing in a manner described more completely below.

Figure 6A:
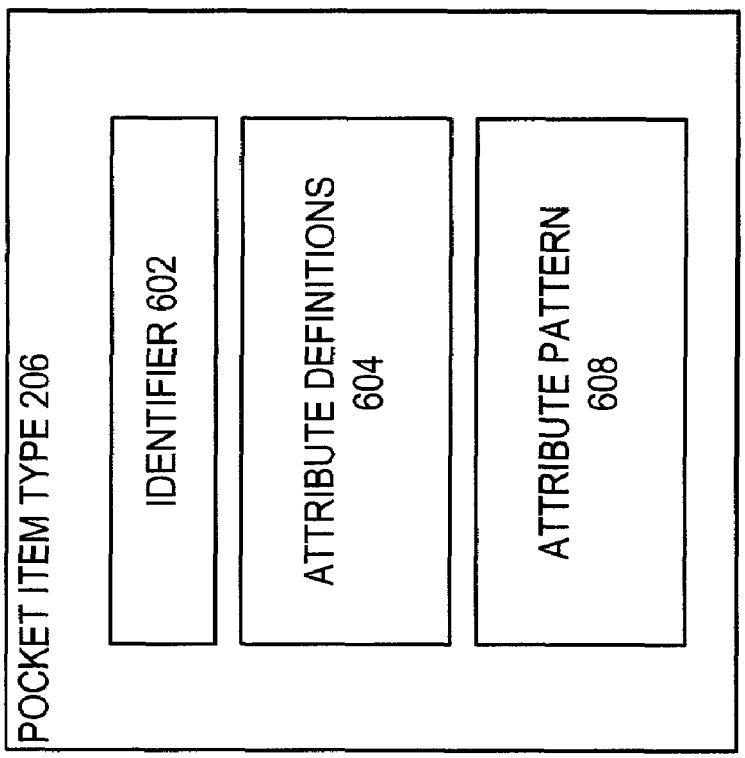
FIG. 6A is a block diagram of a pocket item type of FIG. 2 in greater detail.
Figure 6B:
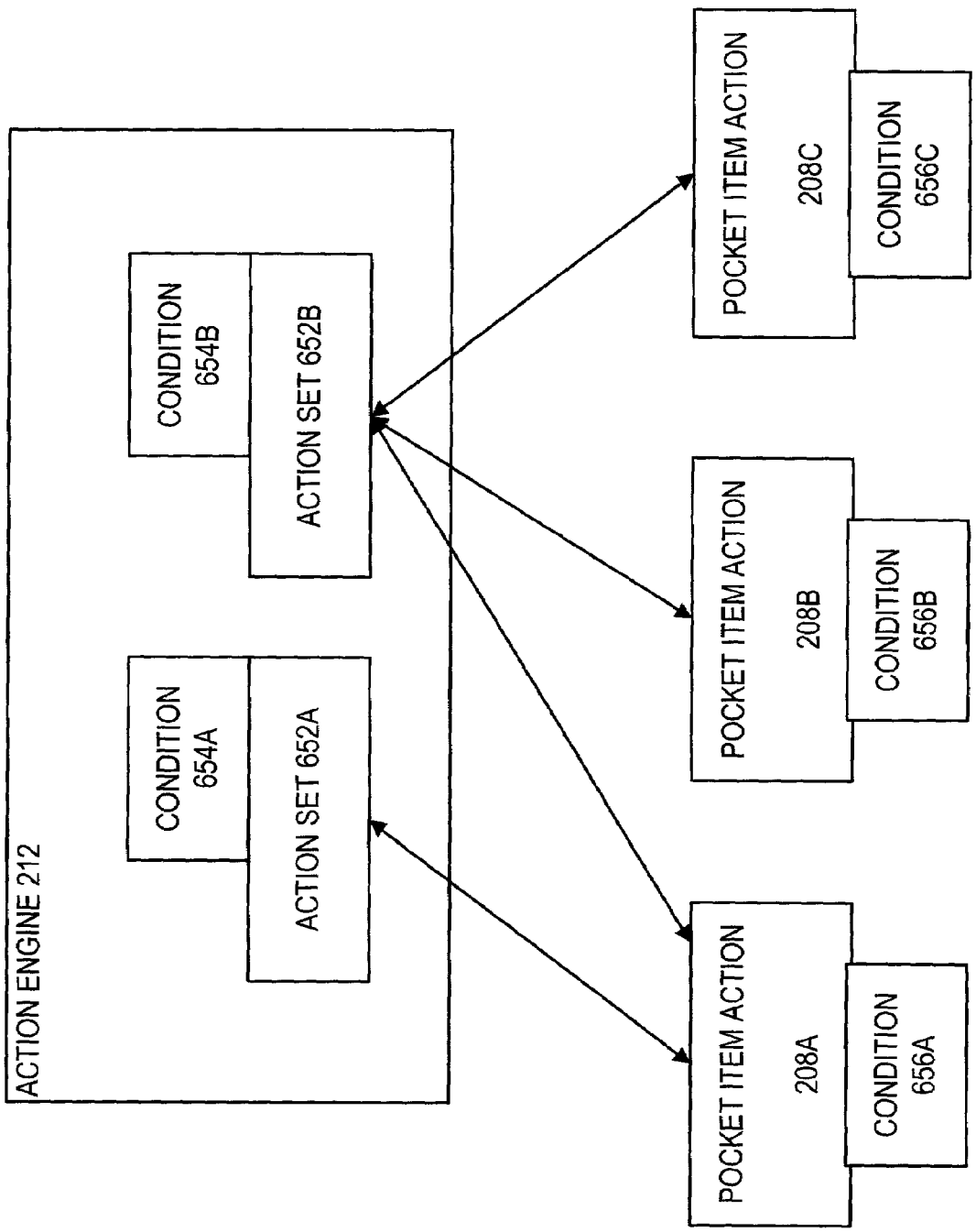
FIG. 6B is a block diagram showing an action engine of FIG. 2 in greater detail.

Pocket item type 206 (FIG. 2) is shown in greater detail in FIG. 6 and includes the following data fields: (i) an identifier 602, (ii) attribute definitions 604, and (iii) attribute pattern 608 (FIG. 6). Pocket item actions 208 are associated with various types of data objects in a manner described more completely below.

Figure 2:
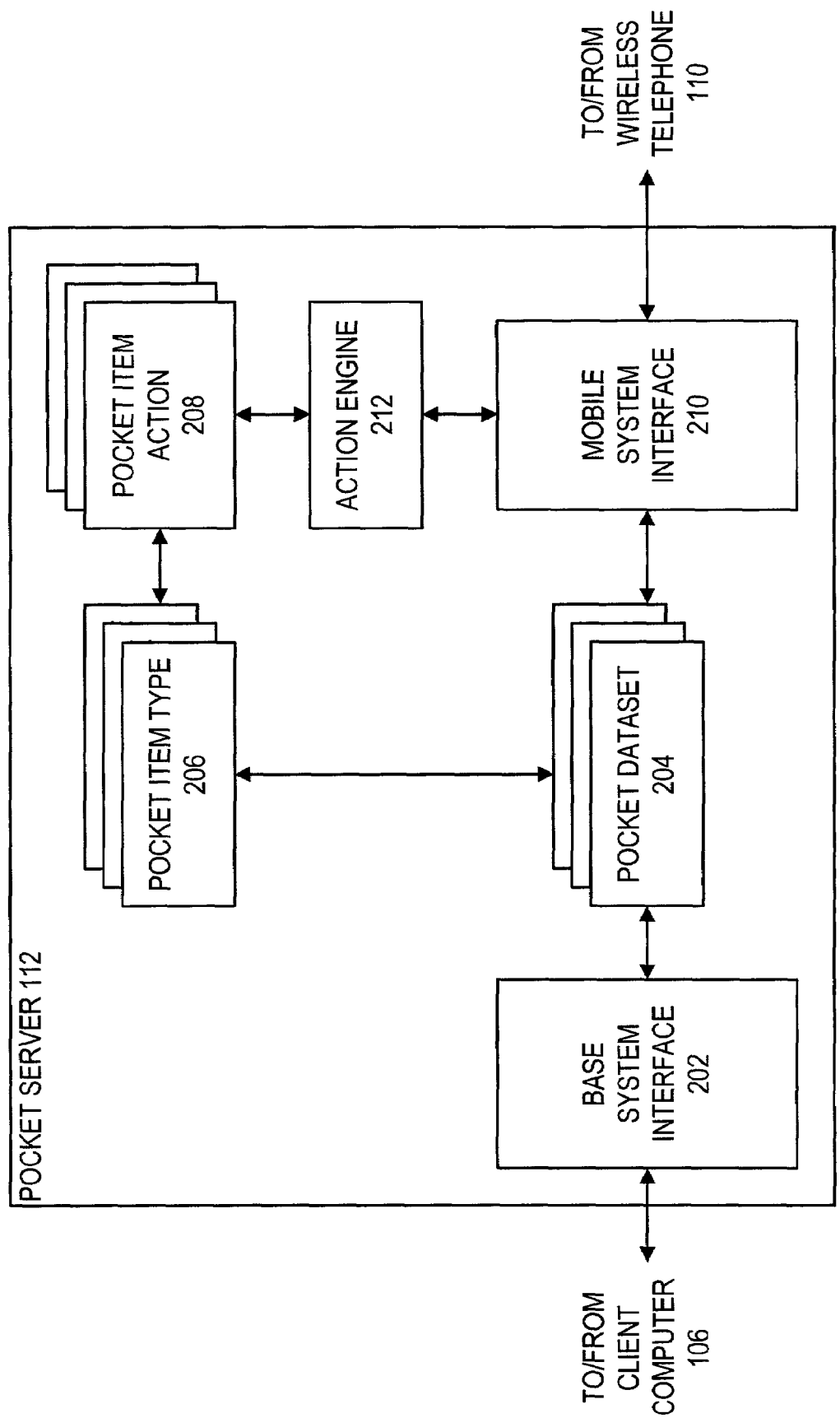
FIG. 2 is a block diagram of the pocket server of FIG. 1 in greater detail.

Identifier 602 uniquely identifies pocket item type 206 among all pocket item types supported by pocket server 112 (FIG. 2). In this illustrative example, pocket item type 206 (FIG. 6) defines an object type to which data object 306 (FIG. 5) belongs. Accordingly, type 502 specifies pocket item type 206 (FIG. 6) by representing identifier 602 of pocket item type 206.

Attribute definitions 604 define one or more attributes of data represented in content 508 (FIG. 5). For example, if pocket time type 206 (FIG. 6) represents an address, attribute definitions 604 specifies that content 508 (FIG. 5) can include an address name, a street number, a street name, a city name, a state name, a country name, telephone numbers for voice and facsimile, and a postal code (such as a zip code in the United States). Each attribute definition represented in attribute definitions 604 can include an attribute identifier, a data type, a maximum length, etc.

Generally, data objects are added in a manner described below in which the associated data item type and the individual component attributes of the data object are individually specified unambiguously. However, a user can also create an object from copied text in a manner described below. As described more completely below, individual attributes are parsed from such bulk text when a user creates a new data object in this manner. Attribute pattern 608 maps bulk text to specific attributes defined by attribute definitions 604. Pocket server 112 (FIG. 2) uses attribute pattern 608 to parse attributes from copied text in forming a new data object. Such parsing is described below in conjunction with FIGS. 42–45.

Mobile system interface 210 (FIG. 2) includes an action engine 212 which collects applicable pocket item actions 208 for a particular data object. Action engine 212 is shown in greater detail in FIG. 6B.

Action engine 212 includes a number of action sets, e.g., action sets 652A–B, each of which (i) is associated with one or more conditions 654A–B and (ii) identifies one or more member actions of pocket item actions 208, e.g., pocket item actions 208A–C. Conditions 654A–B specifying whether action sets 652A–B, respectively, are applicable to a particular data object. For example, conditions 654A can specify that actions of action set 652A are applicable to users whose mobile service provider 410 (FIG. 4) indicates a particular mobile service provider for which action set 652A is designed. Similarly, conditions 654B can specify that actions of action set 652B are applicable to data objects of a particular data item type, e.g., places.

Pocket item actions 208A–C are associated with respective conditions 656A–C, each of which specifies under what conditions the associated action applies. For example, if pocket item action 208A defines an initiate telephone call action, conditions 656A can specify that pocket item action 208A is only applicable for objects which include data in content 508 (FIG. 5) which include a voice telephone number attribute.

In gathering actions applicable to a particular data object, action engine 212 (at the request of mobile interface system 210—FIG. 2) determines which of action sets 652A–B (FIG. 6B) is applicable according to user configuration (FIG. 4) of the current user and data object 306 (FIG. 5) of the particular data object of which actions are being gathered—and therefore pocket item type 206 (FIG. 6A) representing the particular type of the current data object. Of course, while only two action sets 652A–B and associated conditions 654A–B are shown, many more action sets and associated conditions can be defined within action engine 212. In this illustrative embodiment, only one of action sets 652A–B is applicable for any single action request. Conditions 654A–B are evaluated in a predetermined order and the first of conditions 654A–B to be satisfied represents the action set which is determined by action engine 212 to be applicable.

Once an action set is determined by action engine 212 to be applicable, each member action of the applicable action set is evaluated to determine whether individual pocket item actions are applicable. For example, if action set 652B is determined by action engine 212 to be applicable, conditions 646A–C are individually evaluated to determine whether each of pocket item actions 208A–C, respectively, are applicable. More than one of pocket item actions 208A–C can be applicable. Action set 652B specifies a particular order of pocket item actions 208A–C to be presented to the user and that order is preserved in the listing of available actions to the user. Such presentation is described more completely below.

Object Collection and Organization Through the Base System

Figure 7A:
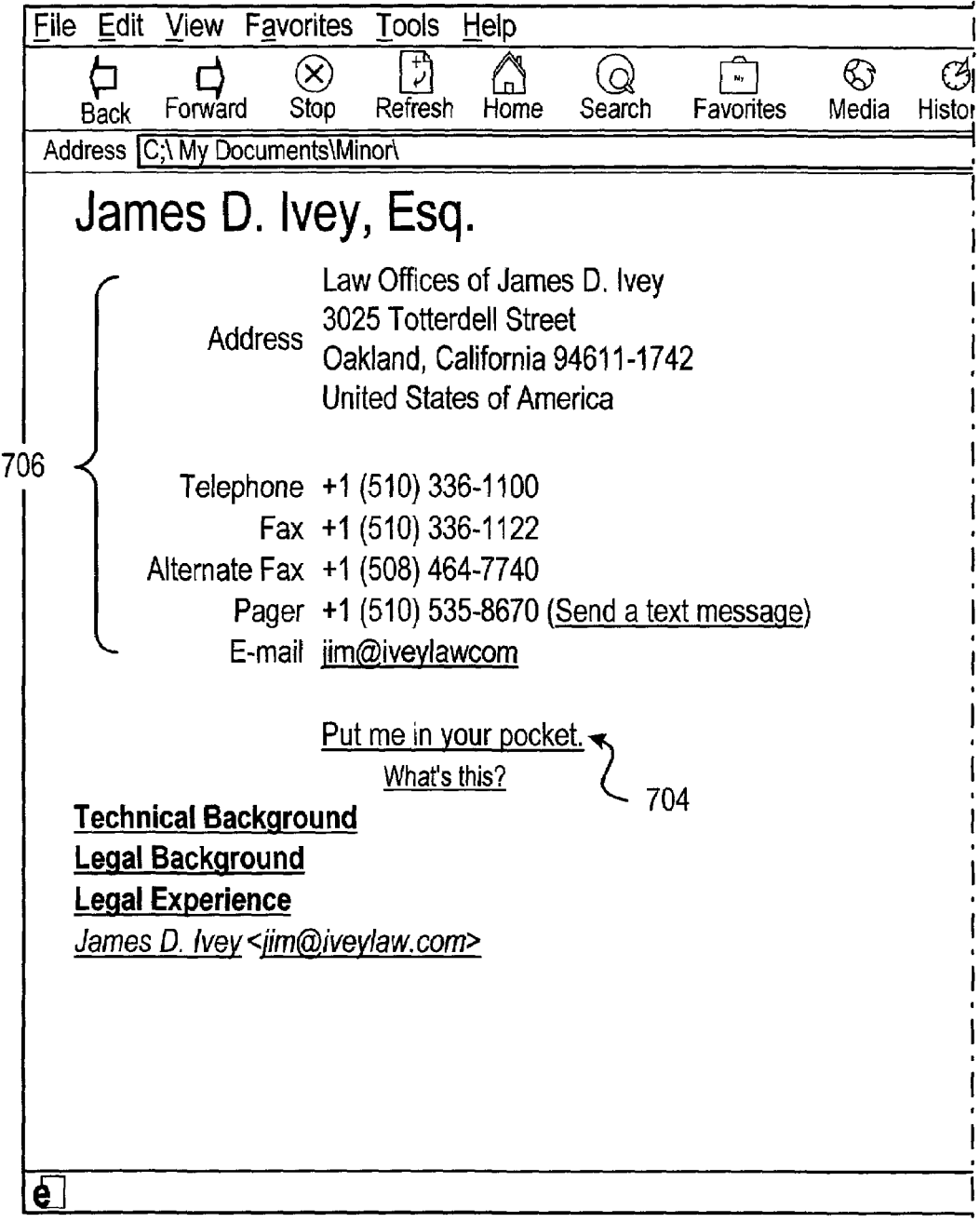
FIG. 7 is a screen view of a Web page which includes a link representing a data object in accordance with the present invention.

Beginning with FIG. 7, use of the system implemented by pocket server 112 is illustrated to further facilitate appreciation and understanding of the present invention. Screen view 702 shows a Web page as presented to the subject user through client computer 106 in a conventional and known manner using a conventional and known Web browser. Briefly, a Web browser is a computer process which enables the subject user to browse the World Wide Web of the Internet. Illustrative examples of known and conventional Web browsers include the Internet Explorer Web browser which is currently available from Microsoft Corporation of Redmond, Wash. and the Netscape Web browser which is also currently available.

The Web page of screen view 702 includes a link 704 by which the subject user is offered to place content 706 in her pocket. To facilitate an intuitive user experience, the analogy of a pocket is used. Essentially, the user is invited to make content 706 immediately accessible through wireless telephone 110 which can presumably be placed in the pocket of the subject user.

In this illustrative embodiment, content 706 is embedded in the URL to which link 704 points. URLs (Universal Resource Locators) are known and conventional and are only briefly described herein for completeness. A URL specifies a network address of a resource, such as a Web page for example, which can be accessed by the user solely by activating an associated link. In addition to specifying the location of a resource, a URL can include data to be provided to the resource. Specifically, the entirety of the URL is passed through the known and conventional Common Gateway Interface (CGI) and is available to a script invoked by the URL. The URL of link 704 includes data specifying a type of data object (an address in this illustrative embodiment) and content 706 parsed into attributes defined by that type. Specifically, the URL of link 704 includes, for each attributed defined by attribute definitions 604 (FIG. 6), data identifying the attribute and—associated therewith—data representing a corresponding portion of content 706 (FIG. 7). As described above, parsing content into attributes enables actions to act upon individual attributes of the content.

Figure 8A:
FIGS. 8A–8C are screen views illustrating creation of a data object in accordance with the link of FIG. 7.

Upon activation of link 704 by the subject user using conventional user interface techniques—typically involving physical manipulation of one or more user input devices and a single user interface gesture such as clicking on link 704, base system interface 202 (FIG. 2) of pocket server 112 presents a Web page to client computer 106 (FIG. 1) resulting in screen view 802 (FIG. 8A) in the Web browser used by the subject user. Screen view 802 shows content 706 (FIG. 7) organized into attributes defined for the Place type for confirmation by the subject user. The attribute organization shown in screen view 802, namely, the particular attributes shown as parsed from content 706 (FIG. 7), is specified by and embedded within the URL of link 704.

In addition to a link embedded in a Web page, the subject user can cause data stored locally within client computer 106 to be made accessible through wireless telephone 110. For example, a Personal Information Management (PIM) process running within client computer 106 can store place information such as addresses and telephone numbers and can store notes of the subject user. In addition, such information is frequently organized in a structural manner, i.e., including attributes. Furthermore, since such PIM processes can be configured using a general purpose programming language with the full capabilities of client computer 106 available to such PIM processes, sending data organized into attributes defined by attribute definitions 604 (FIG. 6) to pocket server 112 is possible. To enable storage of such information in pocket dataset 204 (FIG. 2), the PIM process for the subject user first queries pocket server 112 through wide area network 102 for attribute definitions 604 for a particular type of data according to the type of data currently accessed by the subject user. The PIM process organizes the PIM content selected by the subject user according to the attribute definitions received from pocket server 112 and sends the content to pocket server 112.

In the same manner that link 704 (FIG. 7) communicates the individual component attributes of content 706, a WML link in the form passed through wireless network gateway 108 according to the WAP protocol can similarly communicate individual component attributes of content. Similarly, such content can be stored by mobile system interface 210 in the manner base system interface 202 stores content 706 as described herein. Thus, content can be added by the subject user to her pocket dataset 204 simply and easily from browsing the Internet with client computer 106 or wireless telephone 110 or from local processes executing within either client computer 106 or wireless telephone 110.

Whether from a process or by activation of a link such as link 704 (FIG. 7), screen view 802 (FIG. 8A) includes an HTML form by which the subject user can confirm addition of a data object representing the shown information into pocket dataset 204 (FIG. 2) for the subject user by effecting a single user interface gesture, namely, clicking on confirmation button 804. Alternatively, the subject user can modify the parsed content, or even change the type of data object, prior to adding the content by clicking of confirmation button 804. HTML forms interact with CGI scripts in a known and conventional manner which is not described further herein. If the newly created data object is a result of usage of a mobile device such as wireless telephone 110, a generally analogous user interaction with the mobile device confirms or alters the newly created data object.

Figure 8B:
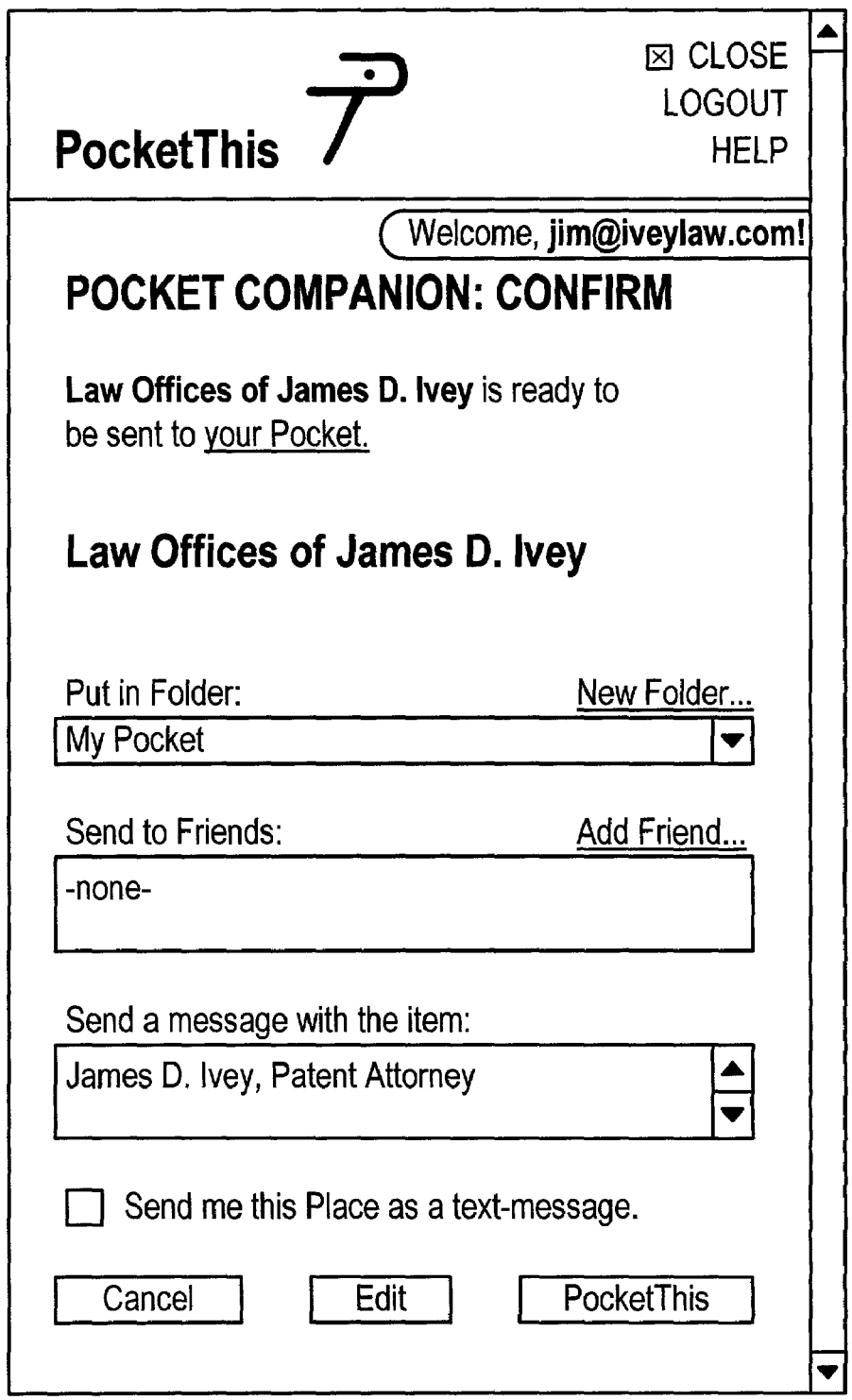

Upon clicking confirmation button 804, base system interface 202 (FIG. 2) of pocket server 112 presents a Web page to client computer 106 (FIG. 1) resulting in screen view 812 (FIG. 8B). Screen view 812 includes an HTML form by which the subject user can specify one of a number of folders of dataset 204 into which to place the newly created data object. Folders are described more completely below. The HTML form of screen view 812 also enables the subject user to send the newly created data object to one or more friends, to send a message summarizing the data object, to return to screen view 802 (FIG. 8A) to edit the data object, to add the data object to object dataset 204 (FIG. 2), or to quit without adding any data object. Such provides the user with an intuitive interface to manage many situations involving data objects.

Figure 8C:
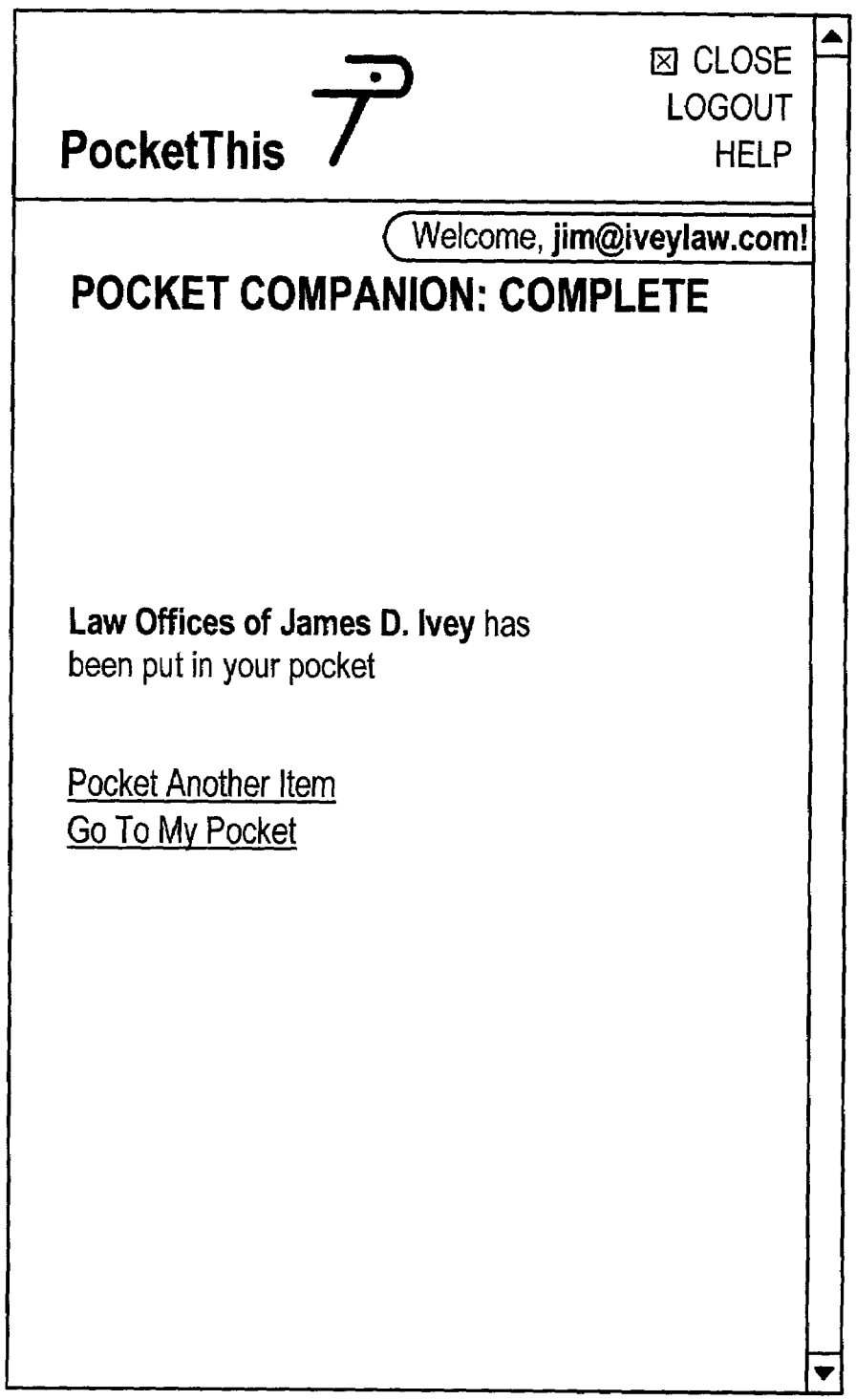

Upon adding the newly created data object to object dataset 204, base system interface 202 sends a Web page to client computer 106 which results in screen view 822 (FIG. 8C) confirming addition of the newly created data object.

Figure 9A:
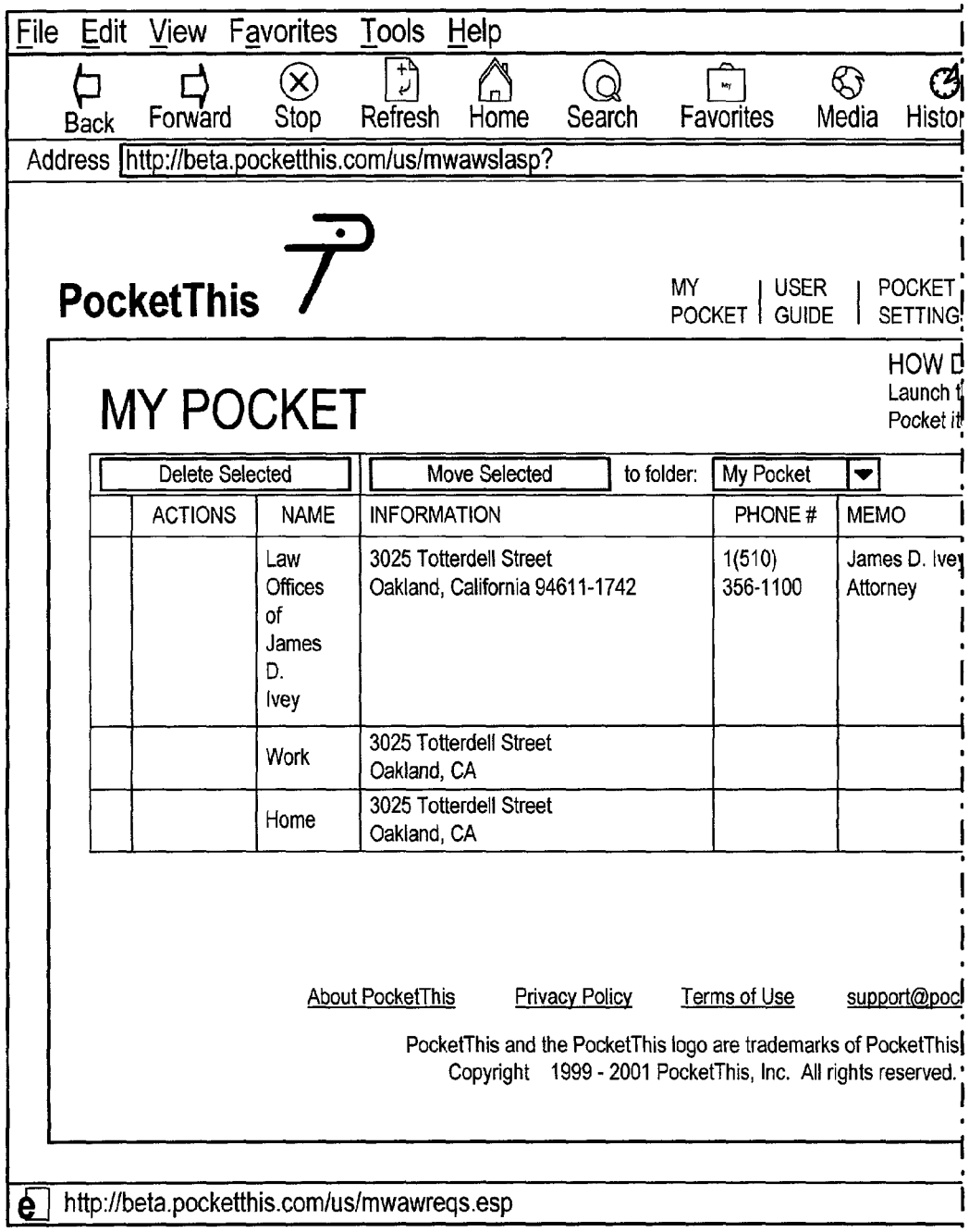
FIG. 9 is a screen view showing a number of data objects which are accessible in accordance with the present invention.

FIG. 9 shows a screen view 902 in which the subject user can view the contents of her pocket, i.e., the data objects represented in object dataset 204 (FIG. 2) associated with the subject user. Row 904 (FIG. 9) shows content 706 (FIG. 7) organized according to the attributes of the particular type of object. In addition, rows 906 (FIG. 9) and 908 show two landmarks, e.g., landmarks 414 (FIG. 4), of the subject user. The data object represented by row 904 (FIG. 9) is now accessible by the subject user through wireless telephone 110 (FIG. 1).

Object Access Through the Mobile System

As shown in FIG. 2, wireless telephone 110 interacts with pocket server 112 though mobile system interface 210. In this illustrative embodiment, wireless telephone 110 and mobile system interface 210 communicate with one another through the Wireless Application Protocol (WAP) using Wireless Markup Language (WML) documents and/or scripts. WAP and WML are both known and conventional and are not described further herein. It should be appreciated however that WML scripts can include instructions which can be carried out by a mobile device such as wireless telephone 110 thereby defining a behavior of wireless telephone 110.

WML documents are briefly described to facilitate understanding and appreciation of the present invention. Since the display screens of most mobile devices are quite small and the bandwidth to and from most mobile devices is quite limited, more than one display is typically sent at one time. Each display is referred to as a card and the collection of cards defined by a single WML document is called a deck. Each card can include one or more links to other cards much like HTML documents can include hypertext links. Such WML links can be to cards within the same deck or within a different deck. Links to cards within the same deck are much like HTML links to anchors within the same HTML document containing the link. Users browsing the World Wide Web experience this routinely as a link within a particular Web page causes a different portion of the same Web page to be displayed. One difference however is that, while a user viewing a Web page in HTML can access all portions of the Web page, cards within a single deck are treated as distinct from one another and generally can only be viewed one at a time.

One advantage of WML decks is that related content can be organized into multiple views but transmitted to a mobile device in a single network transaction. WML decks are used in a manner described more completely below to send multiple views to the subject user in a single network transaction.

Upon initial contact with mobile system interface 210, the user of wireless telephone 110 is authenticated. Wireless telephone 110 contacts mobile system interface 210 by supplying a WAP URL which uniquely identifies mobile system interface 210 within wide area network 102 (FIG. 1). In the following authentication transaction, mobile system interface 210 (FIG. 2) (i) identifies the user of wireless telephone 110 with a reasonable degree of certainty and (ii) determines that access by wireless telephone 110 is to be directed to the particular one of pocket datasets 204 associated with the identified user.

Figure 10A:
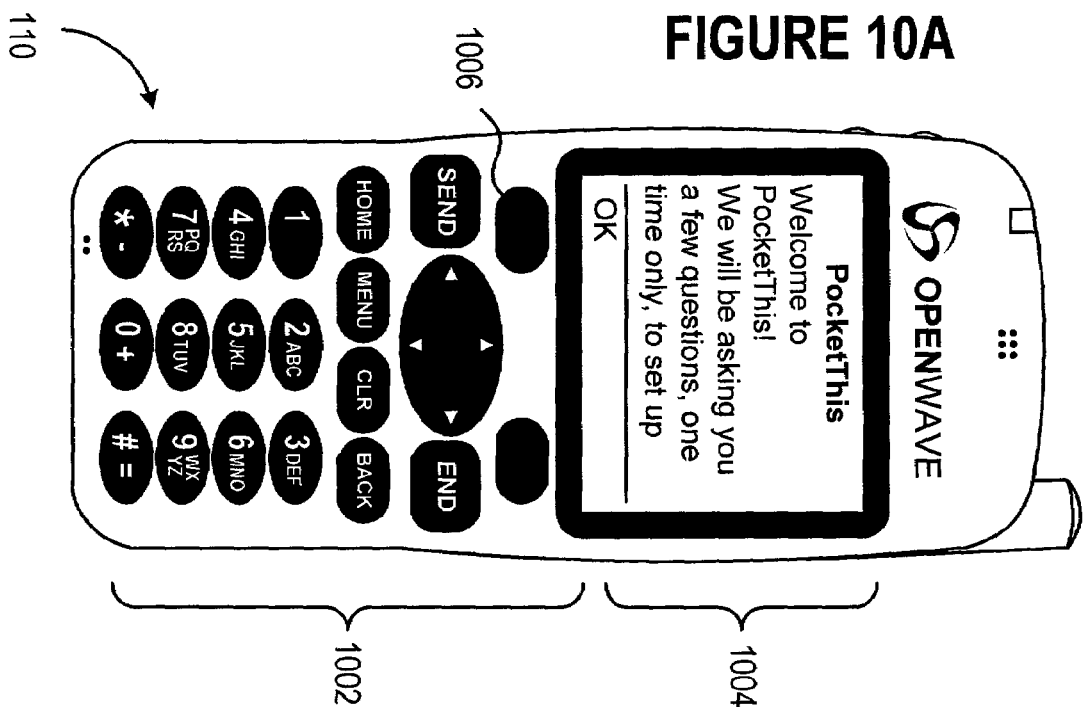
FIGS. 10A–E show user authentication through a mobile device.

Wireless telephone 110 is shown in greater detail in FIG. 10A and includes a keypad 1002 and a display 1004. Keypad 1002 is used by the subject user in a conventional manner to enter data to be supplied to mobile system interface 210 (FIG. 2) according to the WAP protocol. Display 1004 is controlled according to the WAP protocol to present information to the subject user. As shown in FIG. 10A, display 1004 displays a welcome message from mobile system interface 210 (FIG. 2).

Figure 10B:
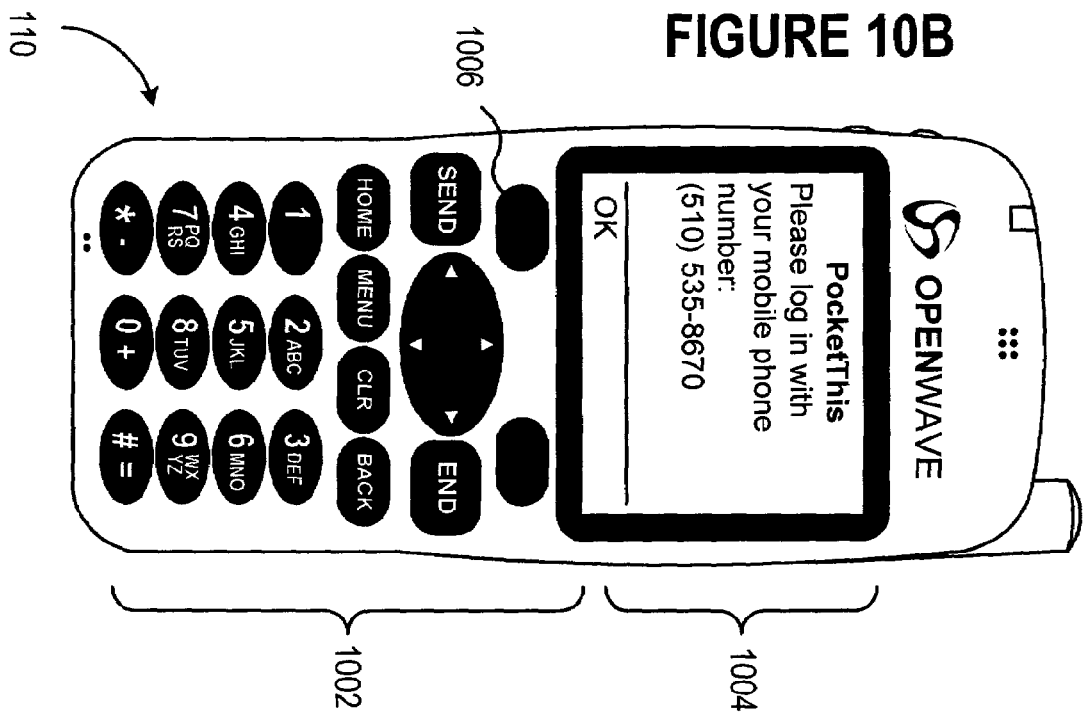

When the subject user presses key 1006 (FIG. 10A) to indicate that the welcome message has been read, mobile system interface 210 (FIG. 2) responds by requesting identification of the subject user in the form of the address of wireless telephone 110, e.g., the telephone number by which wireless telephone 110 can be reached. The request is presented to the subject user as a text message in display 1004 as shown in FIG. 10B. The subject user enters the address of wireless telephone 110 using keypad 1002 and conventional user interface techniques. In an alternative embodiment, mobile system interface 210 gets the address of wireless telephone 110 through wireless network gateway 108 (FIG. 1) using conventional techniques and the interaction shown in FIG. 10B is obviated.

Figure 10C:
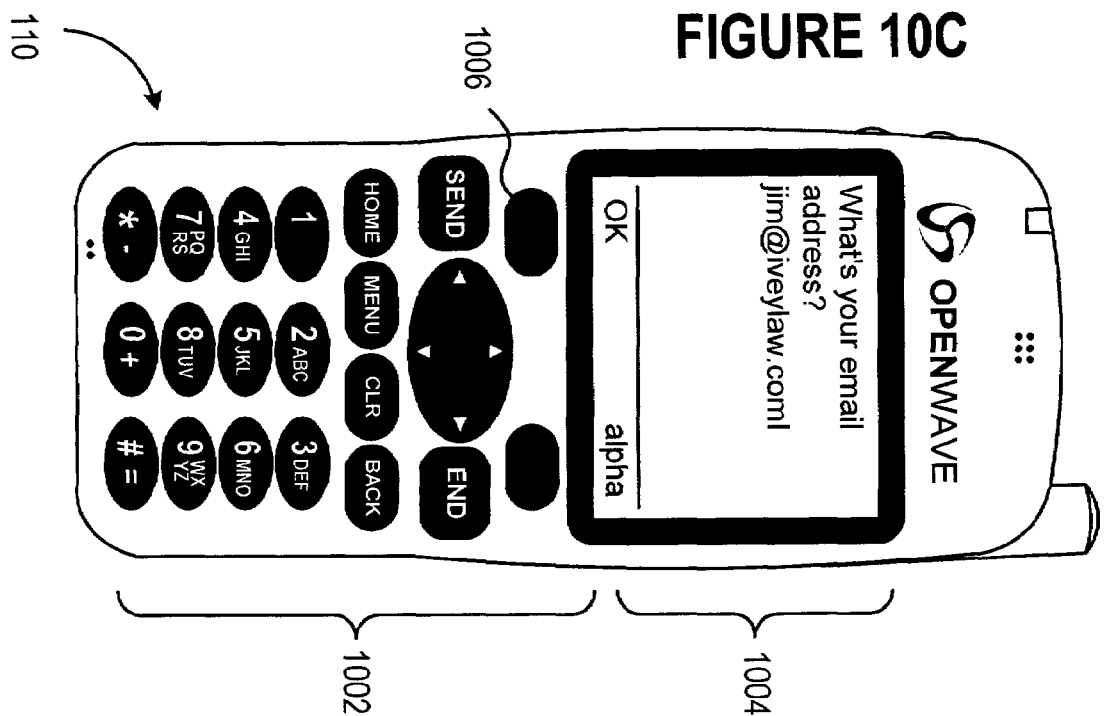

Mobile system interface 210 (FIG. 2) requests, as further identification, the user's e-mail address as a user identifier as shown in FIG. 10C. In an alternative embodiment, the user identifier can be different from the user's e-mail address and that alternative identifier is entered in an analogous manner to that shown in FIG. 10C. In another alternative embodiment, the user is identified according to the address of wireless telephone 110, whether manually entered as described above with respect to FIG. 10B or automatically determined by mobile system interface 210 through wireless network gateway 108.

Figure 10D:
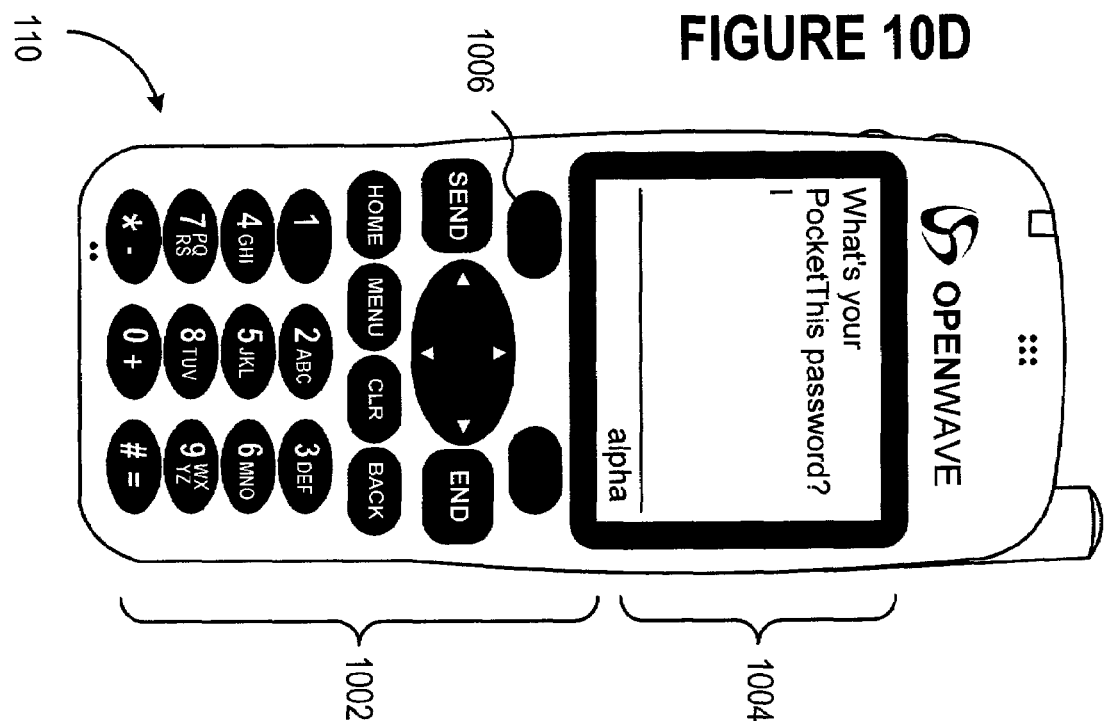

Authentication of the subject user is completed by requesting (by mobile system interface 210) that the user supply as associated password as shown in FIG. 10D. Authentication is successful upon determination by mobile system interface that the password supplied by the subject user matches the password specified for the user identified as shown in FIG. 10C. As described above, user identification and passwords are associated with one another by being stored respectively in identification 402 (FIG. 4) and password 404 of the same user configuration 302.

Figure 10E:
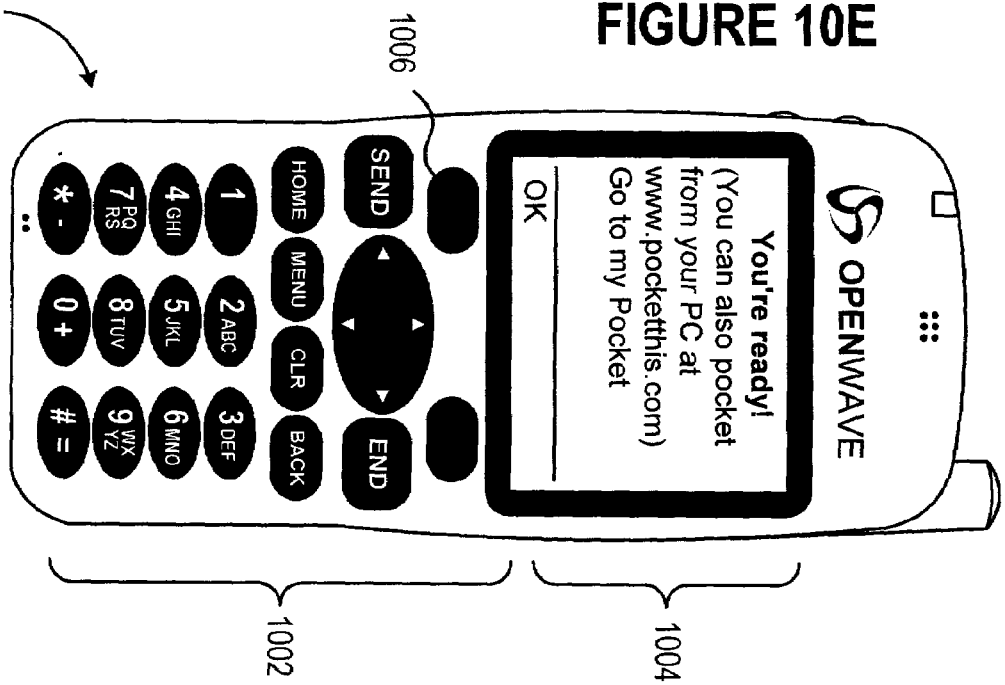

As shown in FIG. 10E, mobile system interface 210 (FIG. 2) responds to successful authentication with a confirmation message. The subject user acknowledges confirmation by pressing key 1006. It should be appreciated that authentication by the subject user is required infrequently. In one embodiment, user authentication is required once each time the user turns wireless telephone 110 on—i.e., once each time wireless telephone 110 establishes new contact with wireless network gateway 108 (FIG. 1). In an alternative embodiment, user authentication is required only when the subject user changes the mobile device with which the subject user accesses her pocket.

Figure 11:
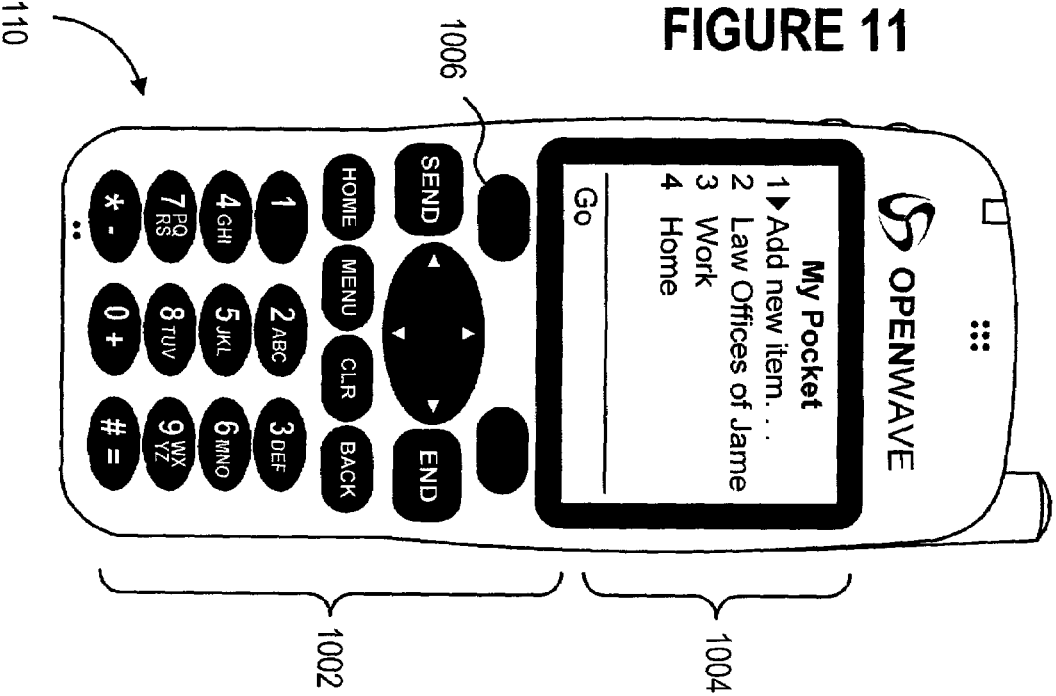
FIG. 11 shows a mobile device through which a user is shown a list of data objects in accordance with the present invention.

After authentication, if necessary according to the particular embodiment, the subject user is presented with a list of data objects in the user's pocket as shown in FIG. 11. In particular, mobile system interface 210 (FIG. 2) retrieves the one of pocket datasets 204 associated with the subject user and retrieves therefrom all data objects 306 (FIG. 3) from that pocket dataset 204. For each of the data objects 306, mobile system interface 210 (FIG. 2) summarizes content 508 (FIG. 5) according to the type of data object. Mobile system interface 210 (FIG. 2) creates a WML document which includes the summaries of a number of the data objects and presents the WML document to wireless telephone 110 for presentation in display 1004 (FIG. 11). In constructing the WML document, mobile system interface 210 incorporates any non-standard WML idiosyncrasies of the particular model of wireless telephone 110. As WAP is relatively new, each model of mobile device supporting WAP can have idiosyncrasies which deviate from the emerging WAP standard. Compensating for such idiosyncrasies is a matter of routine engineering and depends on the particular model of mobile device.

When presented with the WML document resulting in the display of FIG. 11, the user can select any item from the list by scrolling up and/or down in a conventional manner or by pressing the number key of keypad 1002 associated with the desired item. In this illustrative example, the subject user presses the "2" key to select the data object associated with the numeral "2" in the displayed list.

Figure 12:
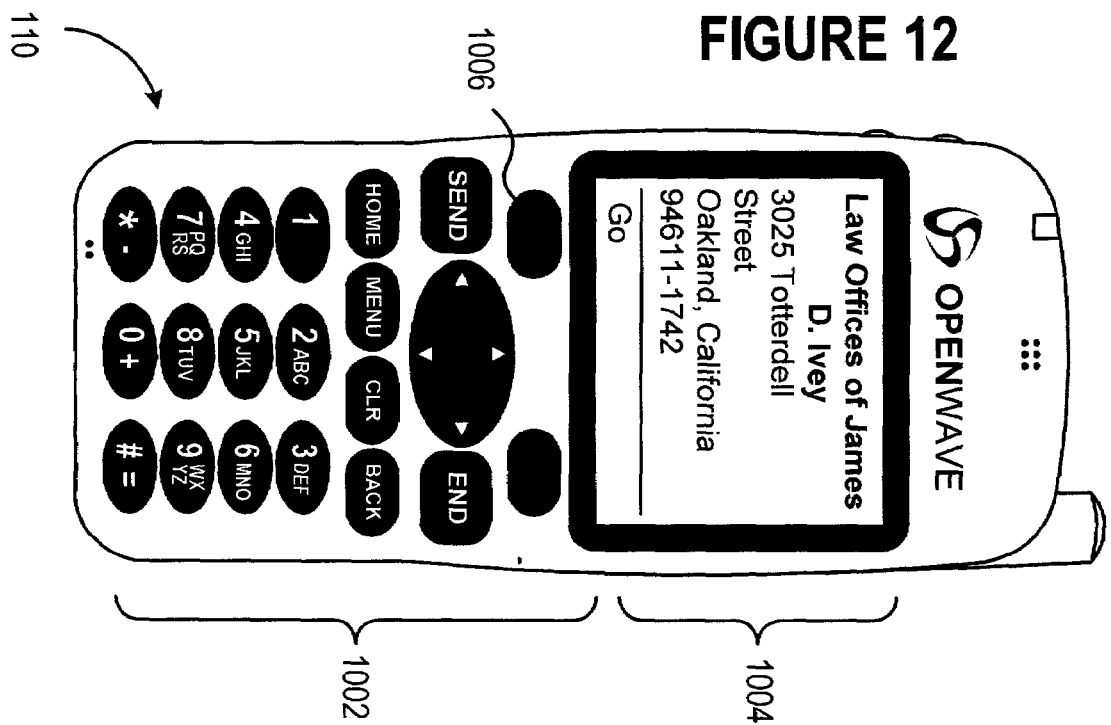
FIG. 12 shows a mobile device through which a user is shown a data object in accordance with the present invention.

According to WAP and the particular configuration of the WML document sent by mobile system interface 210, pressing of the "2" key (FIG. 11) by the subject user sends a signal from wireless telephone 110 to mobile system interface 210 identifying the data object associated with the numeral "2" in the displayed list (FIG. 11). In response thereto, mobile system interface 210 (FIG. 2) retrieves the data object 306 selected by the user. In addition, mobile system interface 210 retrieves content 508 (FIG. 5) of the selected data object 306 and builds a WML document representing content 508 to the subject user and sends the WML document to wireless telephone 110 for display as shown in FIG. 12. Content 508 (FIG. 5) is organized according to attribute definitions 604 (FIG. 6) of the pocket item type 206 to which the selected data object 306 (FIG. 5) belongs according to type 502. As shown in FIG. 12, the content of the selected data object is represented such that the name attribute is listed at the top and displayed in bold text and the street address, city, state, and postal code attributes are arranged to represent an address in a standard address format. Thus, the subject user is presented with summary confirmation of the selected data object.

The subject user can act upon the selected data object by pressing key 1006 which sends a message to mobile system interface 210 (FIG. 2) requesting access to actions applicable to the selected data object. As shown, a textual description "Go" is associated with key 1006. In an alternative embodiment, the textual description "Actions" is associated with key 1006.

In response to the request for applicable actions, mobile system interface 210 retrieves applicable actions in conjunction with action engine 212 in the manner described above and presents the list of applicable actions to the user. To do this, mobile system interface 210 builds a WML document which identifies the applicable actions and provides the subject user with a user interface mechanism to activate any of the applicable actions.

Each action in this illustrative embodiment includes both a short description and a collection of computer instructions and data defining behavior of the action. Each collection of computer instructions is designed to be performed either by mobile system interface 210 (FIG. 2) or by a mobile device such as wireless telephone 110. The WML document includes the brief description of each of the applicable actions and, associated within the WML document in the form of a WML script in this illustrative embodiment, actions to be taken by wireless telephone 110 upon activation of each of the actions. If the action is defined by computer instructions to be carried out by wireless telephone 110, those computer instructions are included in the WML document as a WML script. Conversely, if the action is defined by computer instructions to be performed by mobile system interface 210, data identifying the action is embedded in a URL which is associated with the brief description of the action. Thus, activation of an action to be performed by mobile system interface 210 causes a URL which identifies the action to be sent to mobile system interface 210 and the action can then be performed.

Figure 13:
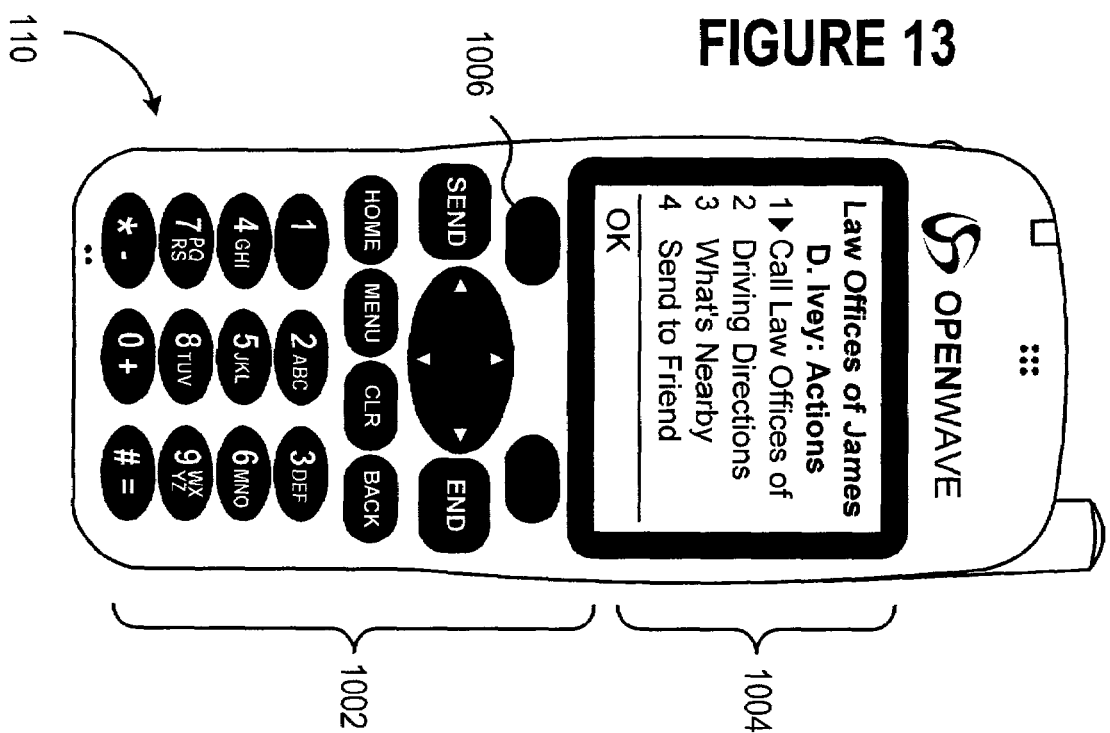
FIG. 13 shows a mobile device through which a user is provided access to actions associated with a data object in accordance with the present invention.

FIG. 13 shows the resulting display of the WML document by which mobile system interface 210 allows the user to invoke an action. Display 1004 includes a brief description of the actions applicable to a place data object. In particular, those actions include (i) initiating a telephone call to the place, (ii) obtaining driving directions relative to the place, (iii) locating other nearby places, and (iv) sending the place object to a friend. The subject user invokes any of the listed actions by the single user interface gesture of pressing a numeral key of keypad 1004 corresponding to a numeral associated with the intended action or by other standard and conventional user interface techniques.

Figure 14:
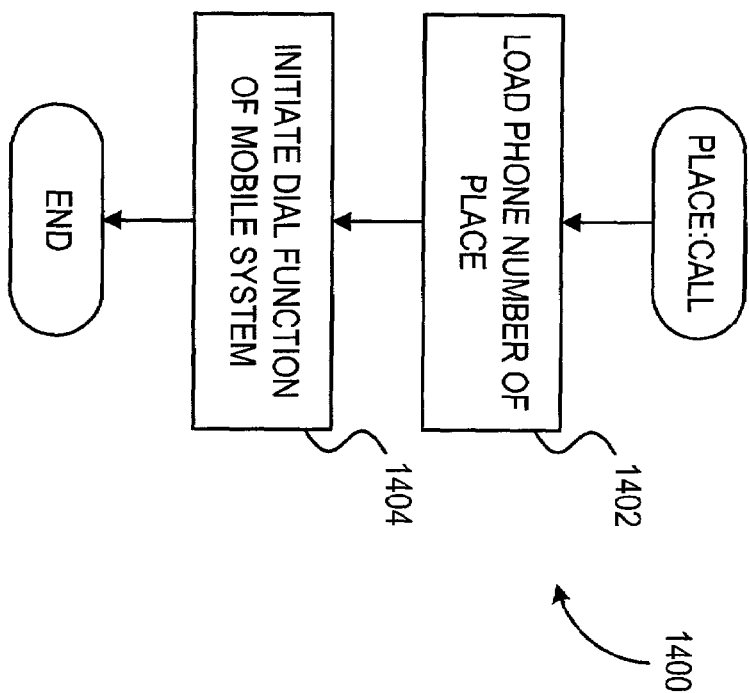
FIG. 14 is a logic flow diagram illustrating an initiate telephone call action in accordance with the present invention.

The call action, i.e., the action associated with the numeral "1" by which the subject user initiates a telephone call to the place, is performed by wireless telephone 110 and is therefore embodied in a WML script in the WML document resulting in the display shown in FIG. 13. Performance of the call action by wireless telephone 110 as specified in the WML script is illustrated by logic flow diagram 1400 (FIG. 14).

In step 1402, wireless telephone 110 loads the voice telephone number of the current place data object. In constructing the WML script which defines the behavior of wireless telephone 110 in performing the call action, mobile system interface 210 retrieves the voice telephone number from the place object as defined by attribute definitions 604 (FIG. 6) in the pocket item type 206 which defines the place type of data object. Mobile system interface 210 (FIG. 2) embeds the voice telephone into the WML script such that wireless telephone 110 does not require direct access to pocket dataset 204 and does not require direct awareness of the various type attributes and actions. Instead, the telephone number of the current place is written directly into the WML script and that telephone number is loaded for dialing within wireless telephone 110 in step 1402 (FIG. 14).

In step 1404 of the WML script for the call action, wireless telephone 110 initiates a telephone call to the number loaded in step 1402. Thus, three user interface gestures are required to both select the current place from the subject user's pocket and to dial the associated telephone number. Specifically, pressing the numeral "2" key of keypad 1002 (FIG. 11) selects the place from the list of data objects, pressing key 1006 (FIG. 12) requests a list of applicable actions, and pressing the "1" numeral key of keypad 1002 (FIG. 13) invokes the call action to place the call. This is a dramatic improvement over direct dialing and a significant improvement over other mechanisms for dialing of previously stored telephone numbers.

Figure 15:
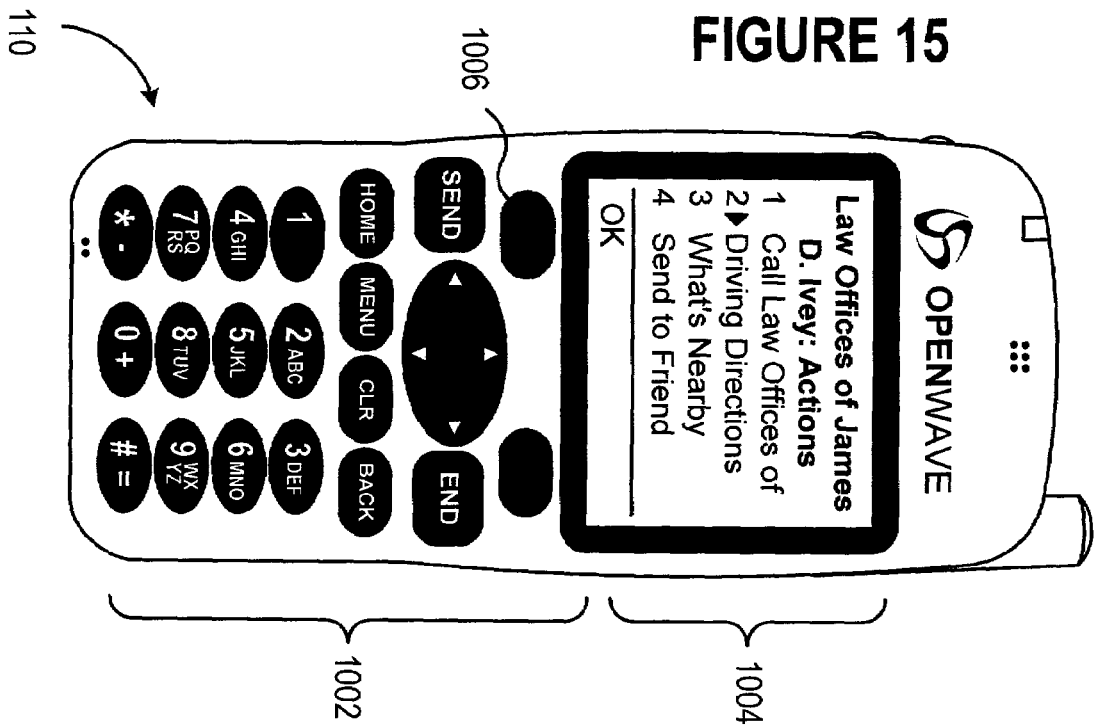
FIG. 15 shows a mobile device through which a user is provided access to actions associated with a data object in accordance with the present invention.
Figure 16:
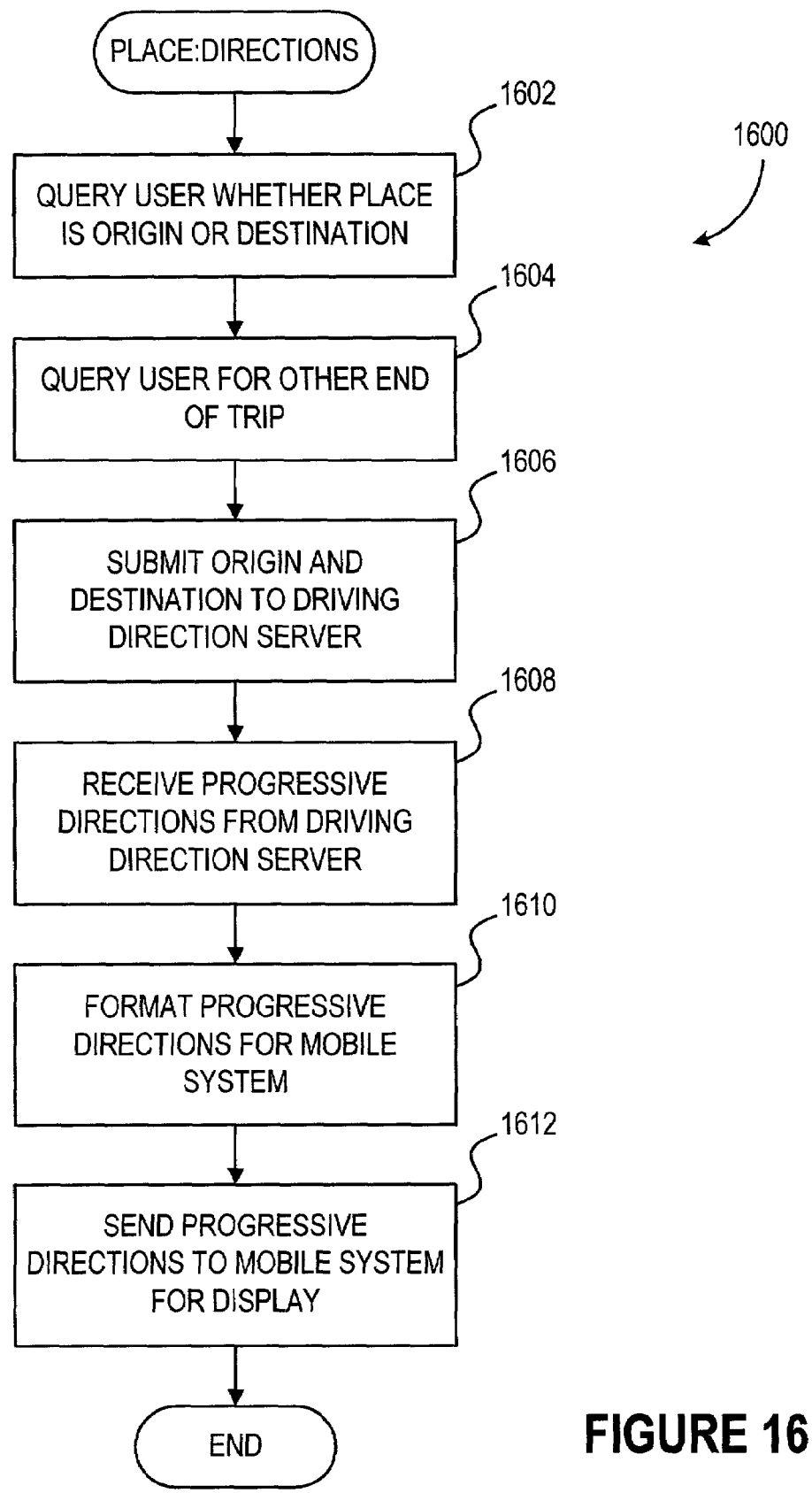
FIG. 16 is a logic flow diagram illustrating a directions action in accordance with the present invention.

The subject user invokes the directions action of the current place object from the list of actions as shown in FIG. 15. Performance of the directions action provides driving directions to the subject user relative to the current place. In this illustrative embodiment, the directions action is performed by mobile system interface 210 (FIG. 2) and the behavior of mobile system interface 210 in performing the directions action is illustrated by logic flow diagram 1600 (FIG. 16).

Figure 17:
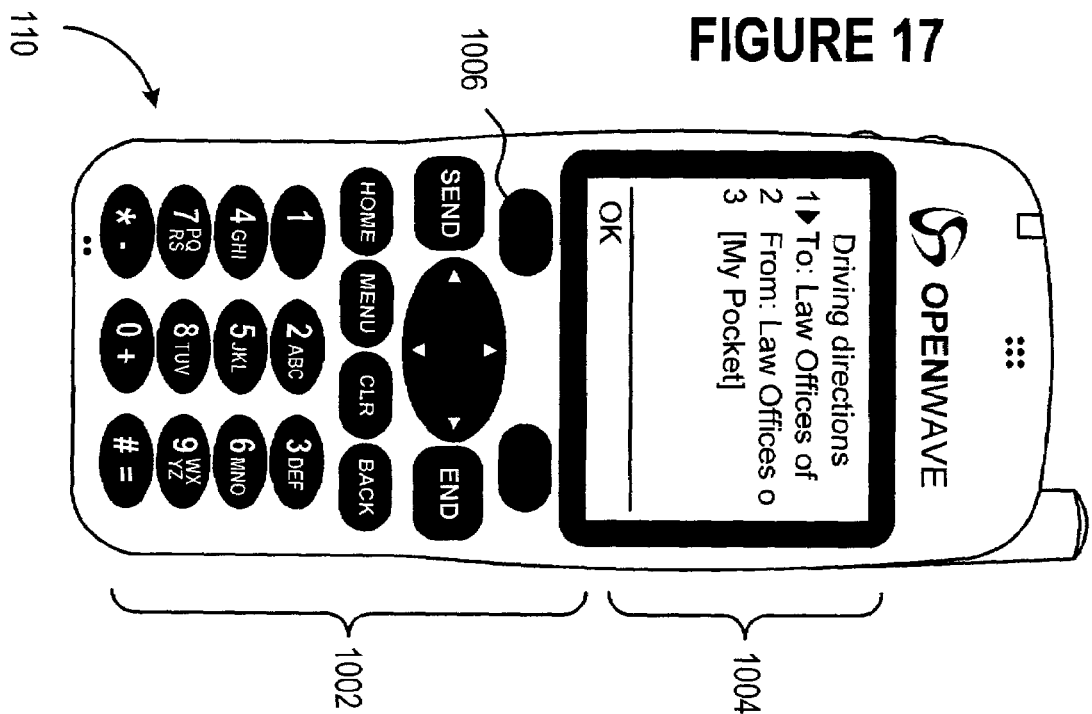
FIGS. 17–19 and 21–26 show a mobile device in performance of a nearby places action in accordance with the present invention.

In step 1602, mobile system interface 210 (FIG. 2) queries the subject user whether the current place is the origin or destination of the trip. FIG. 17 illustrates the display of the WML document by which mobile system interface 210 queries the subject user through wireless telephone 110. The subject user presses the "1" key to indicate that the subject place is the destination or alternatively presses the "2" key to indicate that the current place is the origin of the trip.

Figure 18:
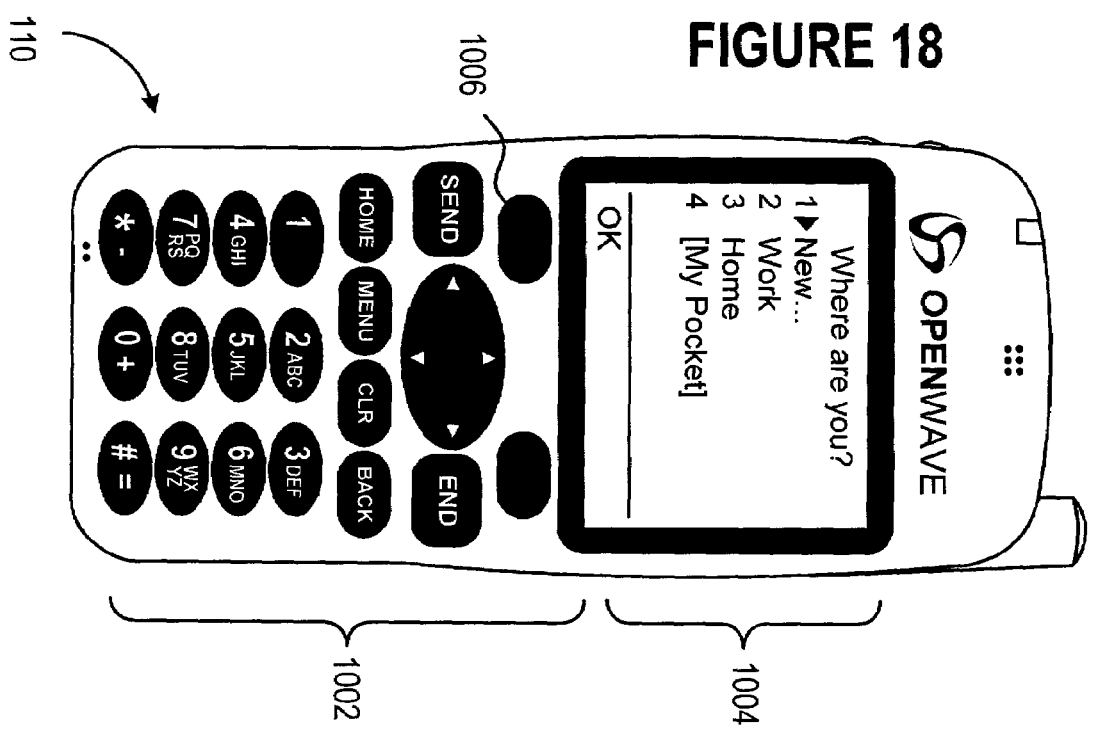

In step 1604, mobile system interface 210 queries the subject user for data specifying the other end of the trip. If the subject user has indicated that the current place is the destination of the trip, mobile system interface 210 sends a WML document to wireless telephone 110 querying the user for the origin of the trip as shown in FIG. 18. Conversely, if the subject user has indicated that the current place is the origin of the trip, mobile system interface 210 sends a WML document to wireless telephone 110 querying the user for the destination of the trip. In either case, the subject user is provided the opportunity to immediately select any of landmarks 414 (FIG. 4) of the subject user as other end of the trip for which directions are sought. Thus, the user can specify both ends of the trip without specifying any address through the very limited keypad 1002 for which data entry is provided in wireless telephone 110. In addition, the user is provided with a user interface option (see "New . . . " associated with the "1" key in FIG. 18) to specify a location other than those represented in landmarks 414 (FIG. 4) of the subject user.

In step 1606 (FIG. 16), mobile system interface 210 (FIG. 2) submits the origin and destination of the trip as specified by the subject user to a map server through wide area network 102 (FIG. 1). As used herein, a map server is a network server, such as any of servers 104A–C, which provides navigation information such as maps and driving directions between two locations. Map servers are known and conventional and are not further described herein. Examples of currently available map servers are those provided by Vicinity Corporation of Sunnyvale, Calif. (http://www.mapblast.com); MapQuest.com, Inc. of New York City, N.Y. (http://www.mapquest.com); and Yahoo! Inc. of Sunnyvale, Calif. (http://maps.yahoo.com/).

In step 1608 (FIG. 16), mobile system interface 210 (FIG. 2) receives the driving directions from the map server. In step 1610 (FIG. 16), mobile system interface 210 (FIG. 2) incorporates the received driving directions into one or more WML documents for presentation to the subject user through wireless telephone 110 and sends the WML document with the driving directions to wireless telephone 110 in step 1612.

In an alternative embodiment, mobile system interface 210 (FIG. 2) receives driving directions from the map server in a format which is suitable for presentation for wireless telephone 110, e.g., in a WAP-compliant format such as WML. In this alternative embodiment, mobile system interface 210 can send the received driving directions directly to wireless telephone 110, obviating step 1610.

Thus, by allowing the subject user to select from places previously collected through client computer 106 to specify both ends of the trip for which driving directions are sought, the subject user can get driving directions by applying just a few user interface gestures.

Figure 19:
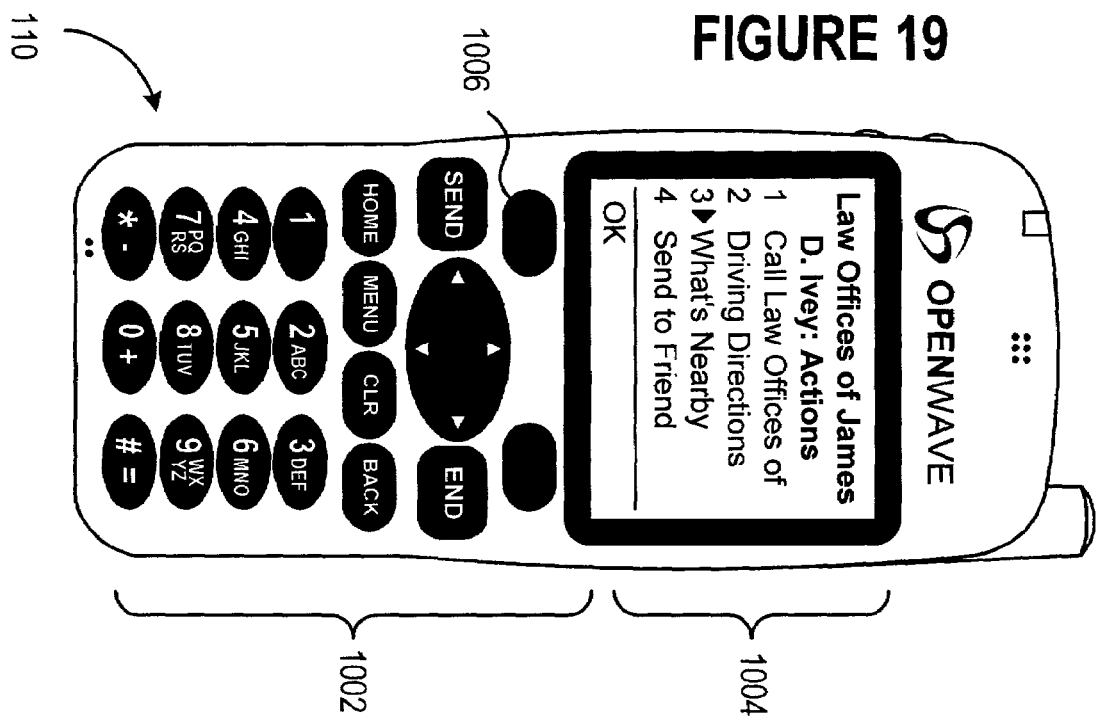
Figure 20:
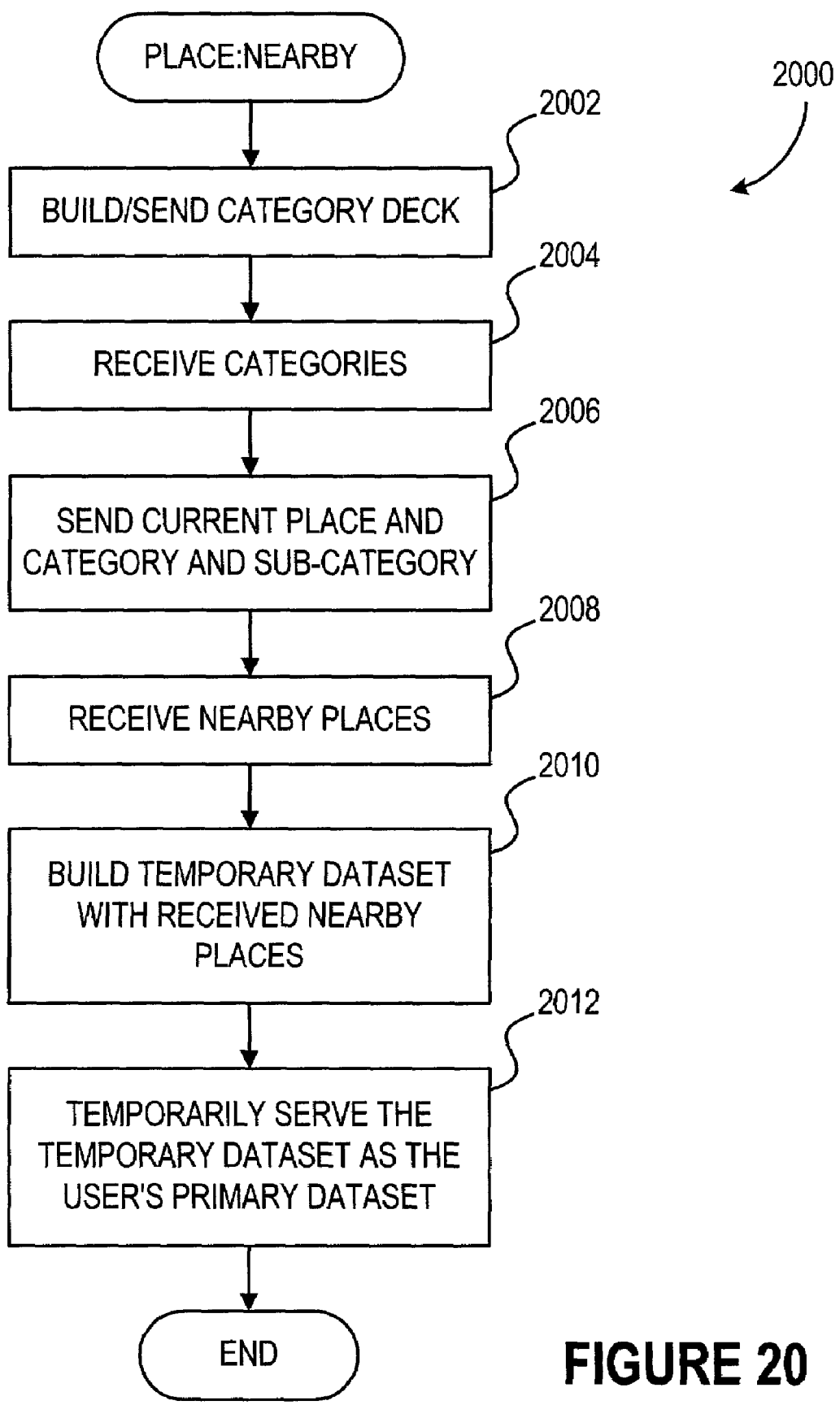
FIG. 20 is a logic flow diagram illustrating the nearby places action.

The subject user invokes the nearby places action of the current place object from the list of actions as shown in FIG. 19. Performance of the nearby places action provides the subject user a list of places which are near the current place. In this illustrative embodiment, the nearby places action is performed by mobile system interface 210 (FIG. 2) and the behavior of mobile system interface 210 in performing the nearby places action is illustrated by logic flow diagram 2000 (FIG. 20).

In step 2002, mobile system interface 210 (FIG. 2) builds a hierarchical WML document which is organized as a deck of cards in the manner described above. One card includes all categories of places from which the subject user can chose a desired category. For each of the categories, the deck includes another card representing all subcategories from which the subject user can more particularly specify the desired category. Mobile system interface 210 sends the WML document to wireless telephone 110 for browsing by the subject user.

Figure 21:
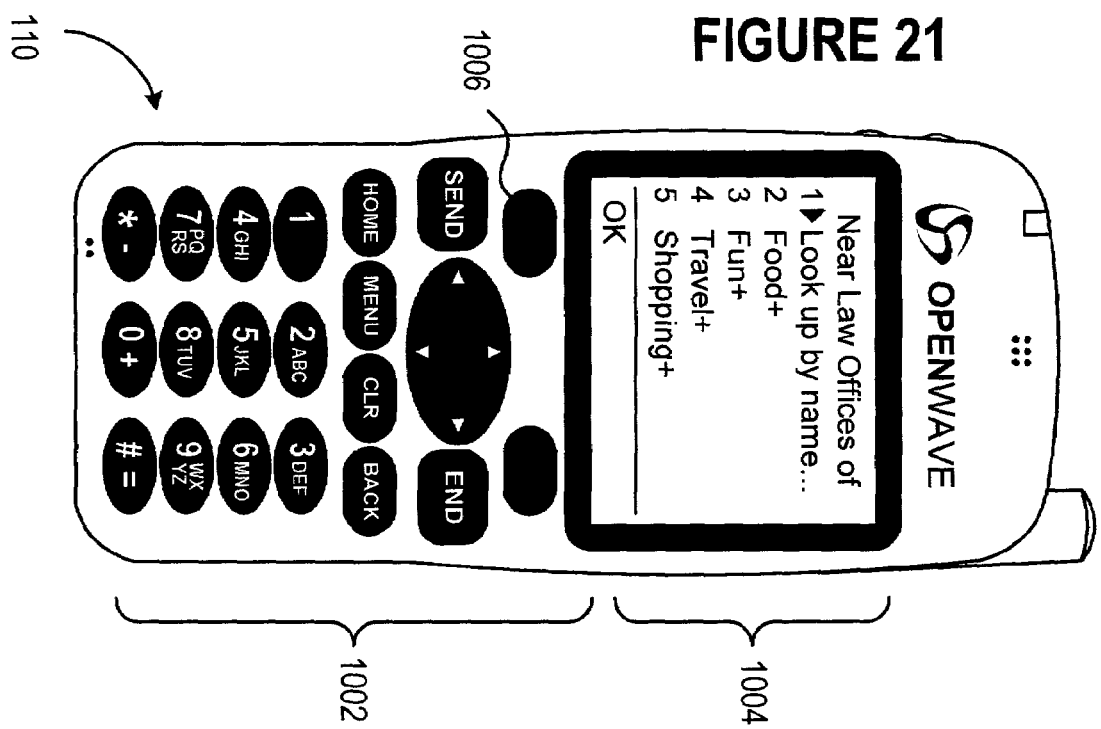

The resulting display of the WML document is shown in FIG. 21 and shows a number of categories from which the subject user can choose. The categories include: food, fun, travel, and shopping. Of course, other and different categories can be presented to the subject user. Similarly, more or fewer categories can be presented to the subject user. In addition to the listed categories, the WML document includes an option for the subject user to specify a name of a desired place.

Figure 22:
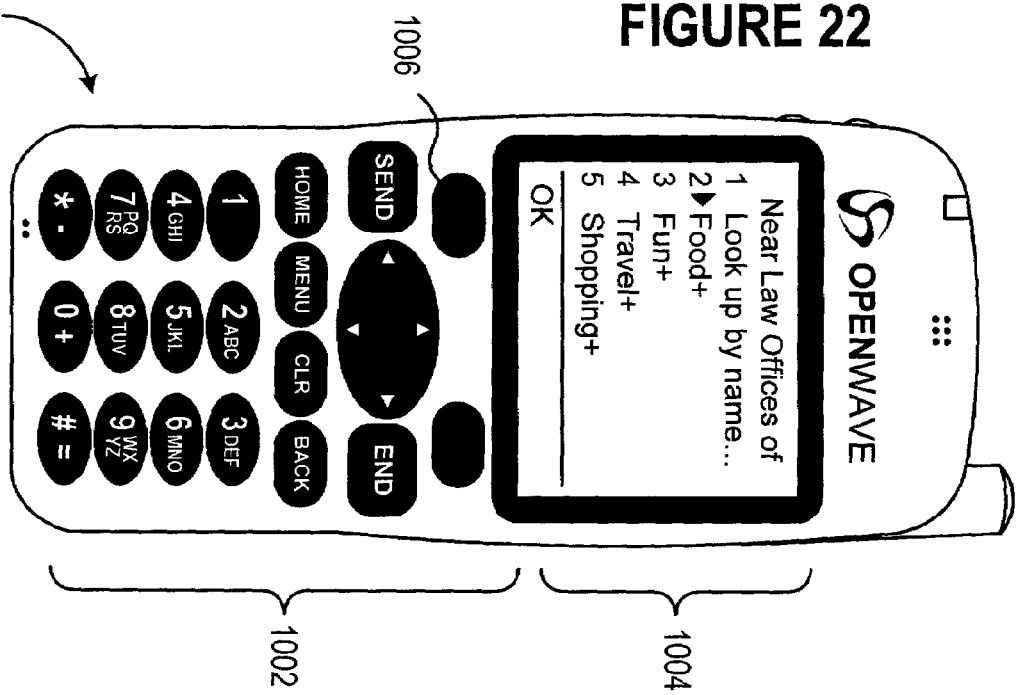
Figure 23:
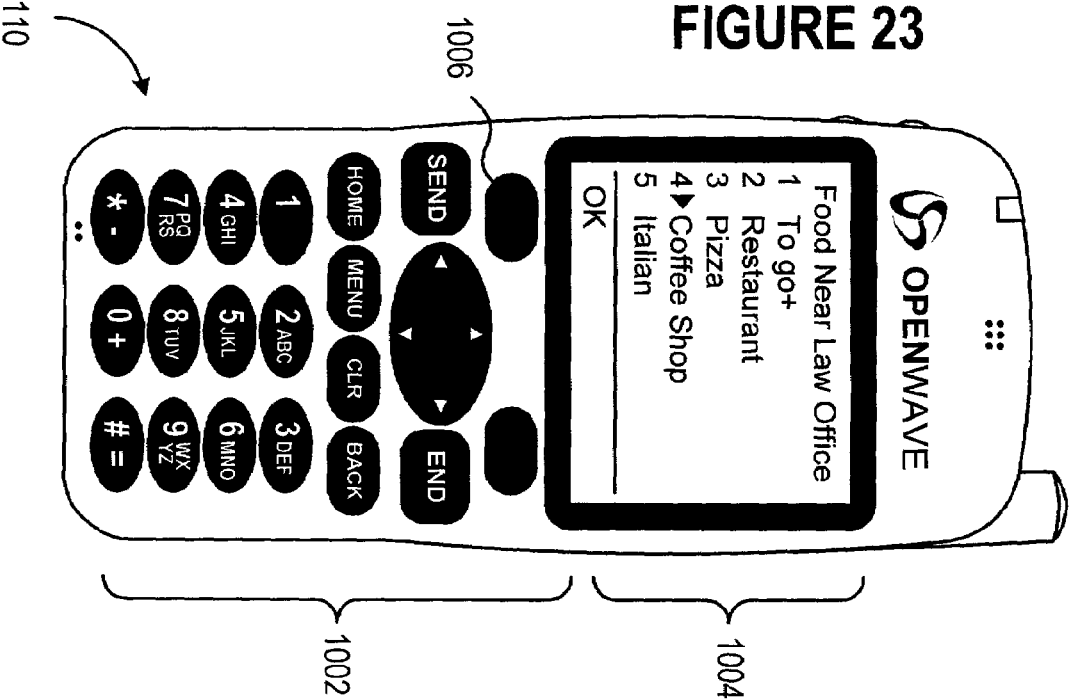

FIG. 22 shows that the subject user has selected the food category, thus retrieving a food category card within the WML document to present the food subcategories as shown in FIG. 23. The food subcategories of this illustrative embodiment include restaurants, pizza, coffee shops, and Italian food. More or fewer, other and different subcategories can be presented to the subject user. As shown in FIG. 23, the subject user chooses the coffee shop subcategory in this illustrative example.

In selecting the subcategory, the subject user invokes a link associated with the subcategory which communicates the category and subcategory to mobile system interface 210 (FIG. 2). In an alternative embodiment, the user is permitted to specify a name or partial name of a particular place for which the subject user is searching and this name or partial name is similarly communicated to mobile system interface 210.

Mobile system interface 210 receives the category and subcategory from the subject user in step 2004 (FIG. 20). In step 2006, mobile system interface 210 (FIG. 2) sends the address of the current place and the category and subcategory and any specified name or partial name to a directory server, which can be one of servers 104A–C. Directory servers are known and conventional. Examples of currently available directory servers include the Switchboard directory server of Switchboard Inc. of Westboro, Mass. (http://www.switchboard.com); the At Hand directory server of the At Hand Network (http://www.athand.com); and the Yellow Pages directory server of YellowPages.com Inc. of San Francisco, Calif. (http://www.yellowpages.com). Briefly, a directory server serves search requests for directories of regional businesses and residences—much like an ordinary paper telephone directory book. However, computer directory servers perform text-based and regional based searches of such addresses and telephone numbers. Mobile system interface 210 (FIG. 2) limits the result of the directory search to locations within a predetermined distance of the current place and matching any specified whole or partial name. Mobile system interface can specify that the directory server so limits the results or can filter the results itself to exclude locations more than the predetermined distance from the current place. In this illustrative embodiment, the predetermined distance is 5 miles. In an alternative embodiment, there is no limit on the distance of listed places from the current place. Instead, proximity is limited only by the user's willingness to look down the list as listed places increase in distance from the current place.

In response to the directory search request, mobile system interface 210 receives a list of places in step 2008 (FIG. 20). In step 2010, mobile system interface 210 (FIG. 2) sends the received places to the subject user. In particular, mobile system interface 210 builds a temporary object dataset which includes the places received in step 2008 (FIG. 20). Each of the places is parsed into attributes defined by the place type, e.g., by attribute definitions 604 (FIG. 6). In addition, actions similar to those described above with respect to place objects are associated with the places received in step 2008 (FIG. 20). Mobile system interface 210 (FIG. 2) builds a WML document which includes a list of the received places as one or more cards and a card describing each place by at least name, address, and telephone number in this illustrative embodiment. Finally, to send the received places to the subject user in step 2010, mobile system interface 210 sends the WML document to wireless telephone 110 in step 2012.

Figure 24:
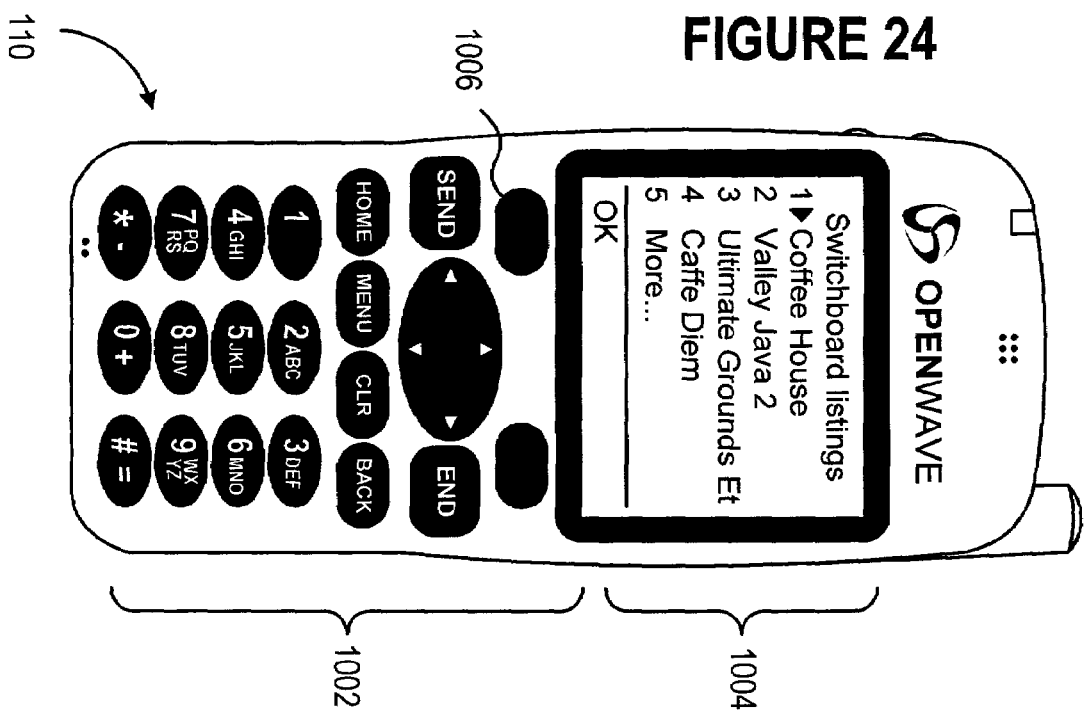
Figure 25:
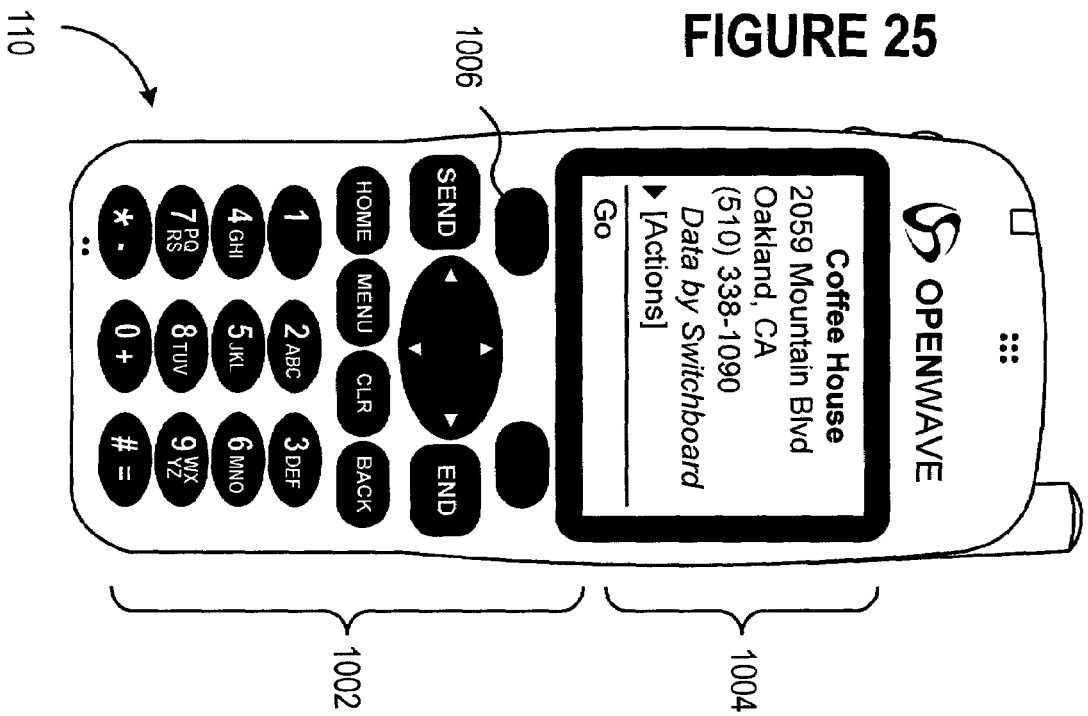
Figure 26:
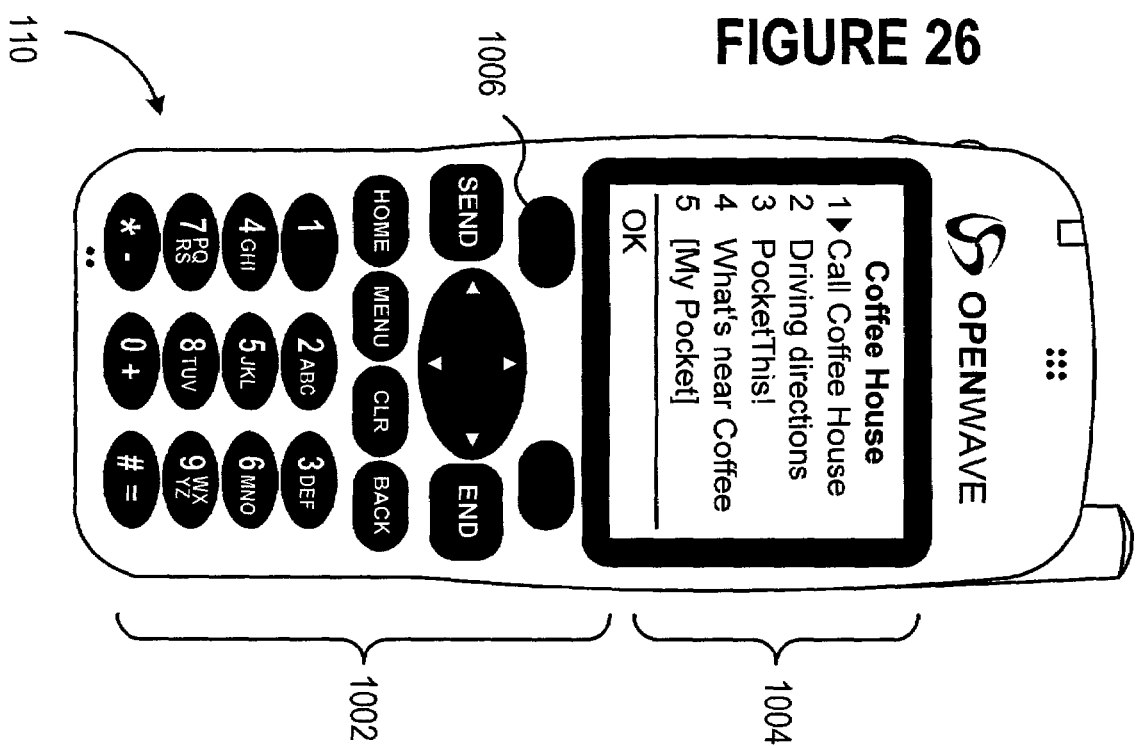
Figure 27:
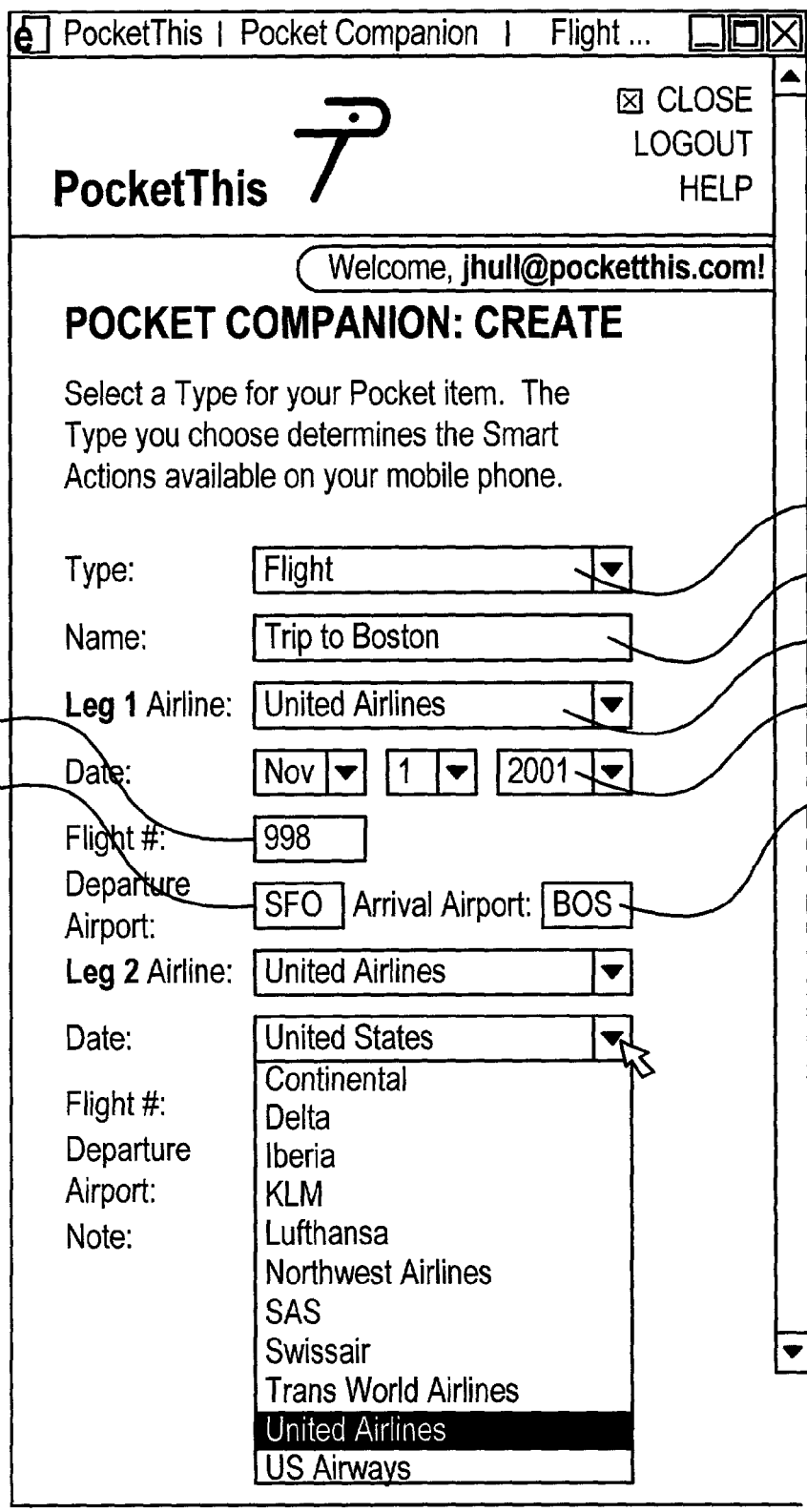
FIGS. 27–28 are screen views of creation of a flight data object in accordance with the present invention.

The resulting display is shown in FIG. 24. The subject user is presented with the first four (4) nearby coffee shops and an option to see more nearby coffee shops. In this illustrative embodiment, the nearby places are sorted by proximity to the current place. Upon selecting the first listed coffee shop, wireless telephone 110 presents the card of the WML document describing the selected coffee shop as shown in FIG. 25. By activating the actions menu, the subject user can invoke any of the actions associated with a place as shown in FIG. 26 It should be appreciated that the nearby places action can therefore be performed recursively. Specifically, the subject user can subsequently request places near the selected coffee shop.

It should also be noted that an extra action not associated with place objects of pocket dataset 204. In particular, the subject user can cause the selected place shown in FIG. 25 to be added to the pocket of the subject user, e.g., to be added to pocket dataset 204 (FIG. 3). This action is represented in the display of FIG. 26 as the "PocketThis!" action. Associated with the "PocketThis!" action description is a link in the WML document which embeds the individual data attributes corresponding to the nearby place in the manner described above with respect to link 704 (FIG. 7) for addition of the corresponding place as a new data object.

Thus, the nearby places action is quite powerful and requires only a few user interface gestures by the subject user to locate various types of establishments near a place of interest.

FIG. 19 also shows an action in which the selected place object (as shown in FIG. 12) is sent to a pocket dataset associated with another user. In performing the send-to-friend action, the subject user is presented with a list of people identified by friends 416 (FIG. 4). The user selects from the list or specifies a different person to which the current place is to be sent. Upon identification of the destination person, mobile system interface 210 (FIG. 2) locates the pocket dataset for the identified person and adds a data object representing the current place to that pocket dataset.

The preceding description pertains to data objects of the place type defined in this illustrative embodiment of the present invention. Other types of data objects defined in this illustrative embodiment include data objects representing flights, products, stocks, and notes.

Flight Objects

Another type of data object specified in pocket item types 206 (FIG. 2) is a flight. Screen view 2700 shows a dialog box accessible by the subject user through client computer 106 and illustrates the kind of attributes specified by attribute definitions 604 (FIG. 6) for the flight type of data object.

Box 2702 shows that the type of data object represented is a flight. This type can be specified in a URL activated by the subject user in the manner described above with respect to FIG. 7 or can be manually selected by the subject user using conventional user interface techniques.

In box 2704, a name of the flight data object is specified. The name of the flight data object identifies the data object to the subject user and should be distinct from names of other data objects in the pocket dataset associated with the user. The flight represented by the flight data object is sometimes referred to herein as the subject flight.

Boxes 2706–2714 represent the first or only leg of the subject flight. Additional boxes are provided for an optional second leg of the subject flight. Additional legs can also be specified.

The airline providing the first or only leg of the subject flight is specified in box 2706. Boxes 2708 specify the date of the first or only leg of the flight, and the flight number is specified in box 2710. Boxes 2712 and 2714 specify the origin and destination airports, respectively, of the first or only leg of the subject flight.

Figure 28:
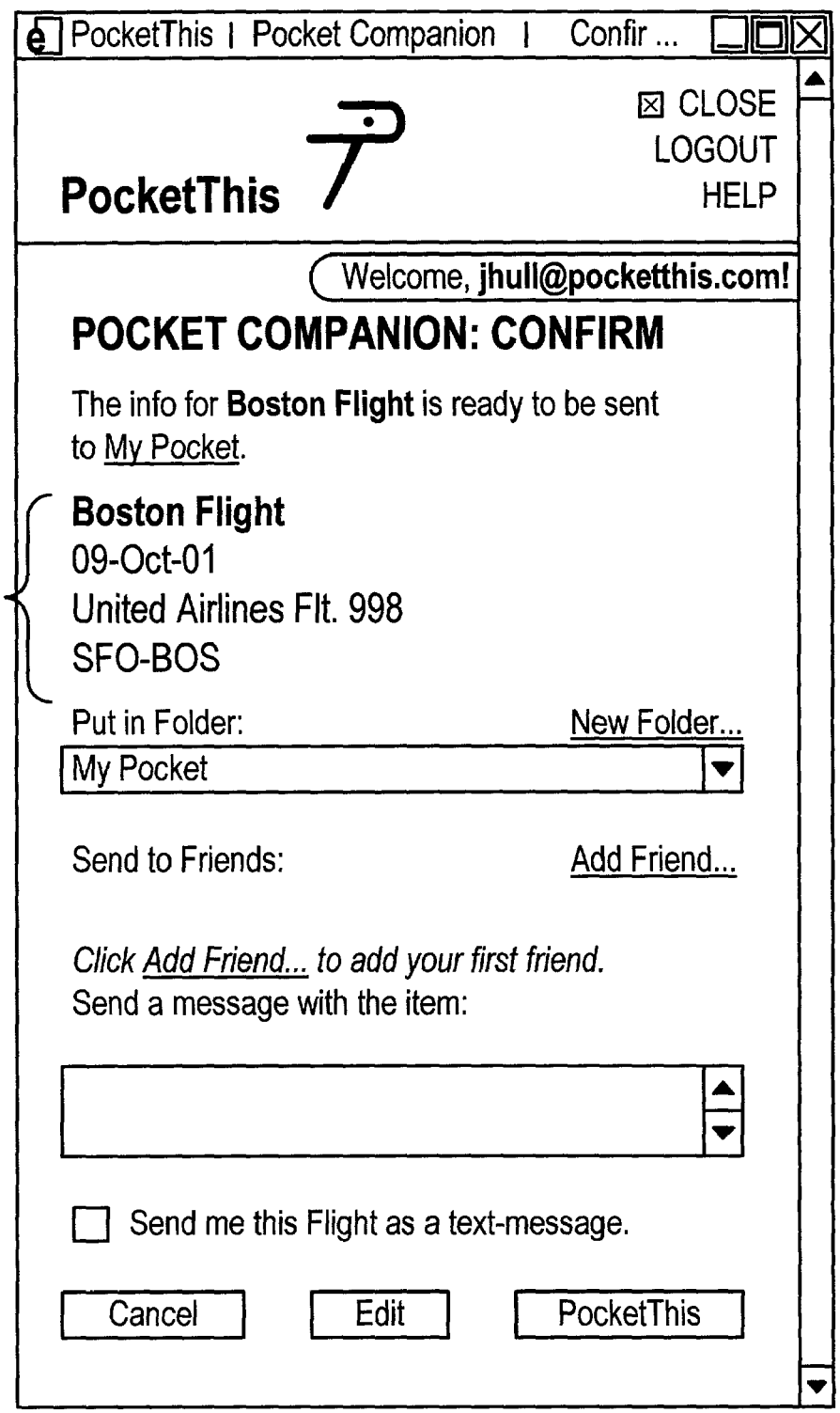

In response to submission of the information depicted in the HTML form of screen view 2700, base system interface 202 (i) creates a data object such as data object 306 (FIG. 5) representing the flight and (ii) prepares and sends a confirmation Web page which results in screen view 2800 (FIG. 28) on client computer 106. Content 508 (FIG. 5) of the flight data object is summarized by textual summary 2802 (FIG. 28). Upon confirmation by the subject user that the information should be added to her pocket dataset 204, base system interface 202 (FIG. 2) adds the flight data object to the pocket dataset 204 of the subject user.

Figure 29:
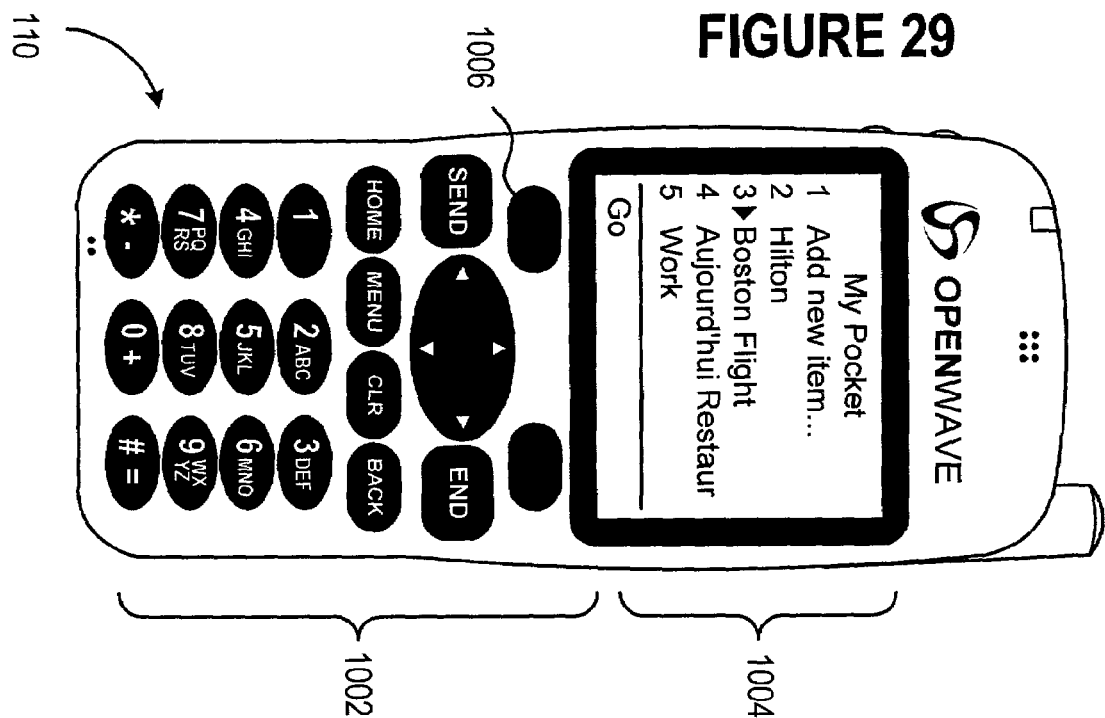
FIGS. 29–33 illustrate access by a user of the flight data object through a mobile device in accordance with the present invention.

FIG. 29 illustrates access of the flight data object by the subject user through wireless telephone 110. Display screen 1006 shows the flight data object, indicated by the name "Boston Flight," listed among other data objects included in the pocket dataset 204 of the subject user. Those other data objects include two place data objects corresponding to the destination of the flight data object, namely, Boston, Mass. The two place data objects include one named "Hilton" and representing a Hilton hotel in the Boston area and another named "Aujourd'hui Restaurant" and representing a restaurant in the Boston area.

Upon selection of the flight data object by the subject user, mobile system interface 210 (FIG. 2) receives the URL from wireless telephone 110 so indicating. In response to the URL indicating that the user wishes to see the flight data object, mobile system interface 210 constructs a WML deck which includes a top-level menu card, a details menu card, a flight details card, and a flight actions card. Mobile system interface 210 sends the WML deck to wireless telephone 110 to make the substance of the flight data object, and all associated actions, available to the subject user.

Figure 30:
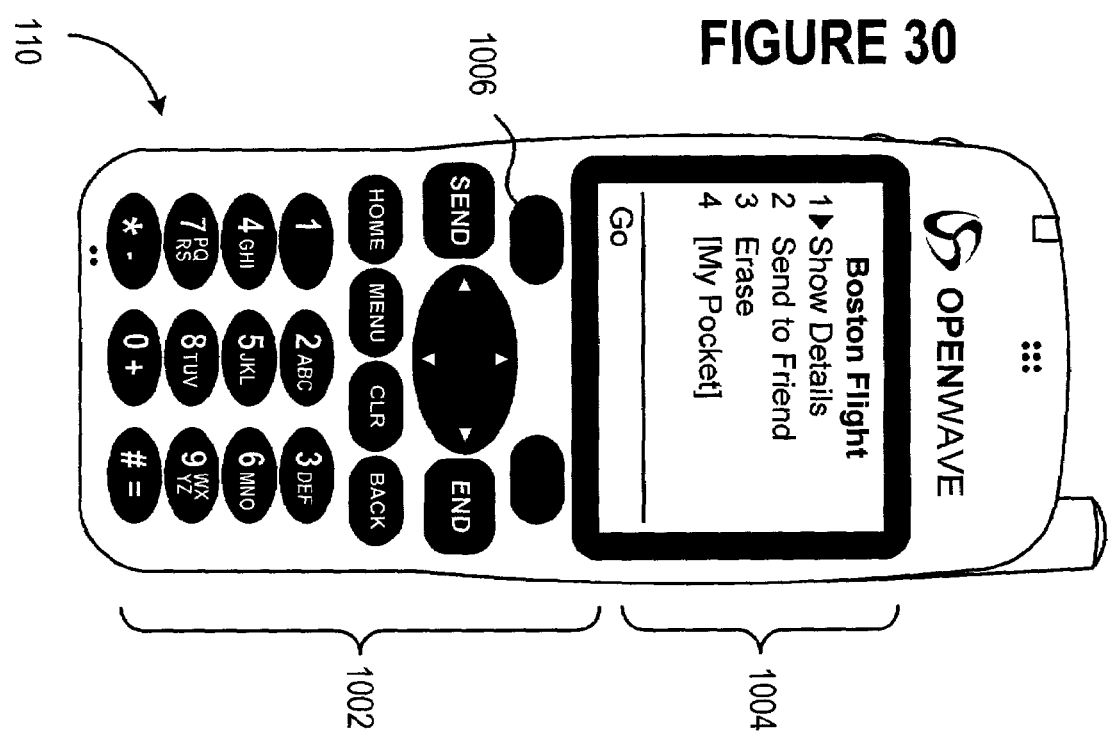

Presentation of the WML deck causes the initial card representing the top-level menu to be displayed in display 1006 of wireless telephone 110 as shown in FIG. 30. The top-level menu includes the following options: "Show Details," "Send to Friend," "Erase," and "[My Pocket]." Selection of the "[My Pocket]" option causes mobile system interface 210 to return to the initial WML deck in which all pocket data objects are listed for the subject user as shown in FIG. 29 and described above. Selection of the "Erase" option causes the flight data object to be removed from the pocket dataset 204 of the subject user. In this illustrative embodiment, the subject user is asked to confirm the removal before the removal is effected. Selection of the "Send to Friend" option causes the flight data object to be sent to another user in the manner described above for place objects.

Figure 31:
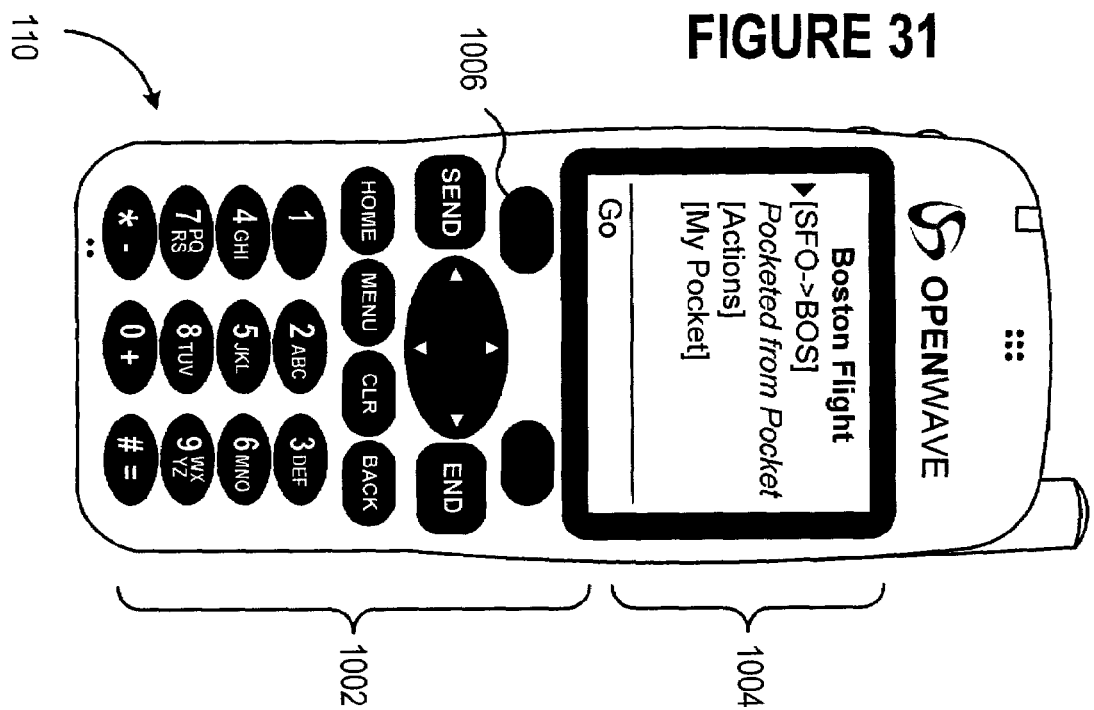

Selection of the "Show Details" option activates a link to the details menu card of the WML deck, the results of which are shown in FIG. 31 in display 1006. The details menu card includes an option to view the description of the subject flight, a textual line representing the source of the flight data object, an "[Actions]" option, and a "[My Pocket]" option which acts in the manner described in conjunction with FIG. 30.

Figure 32:
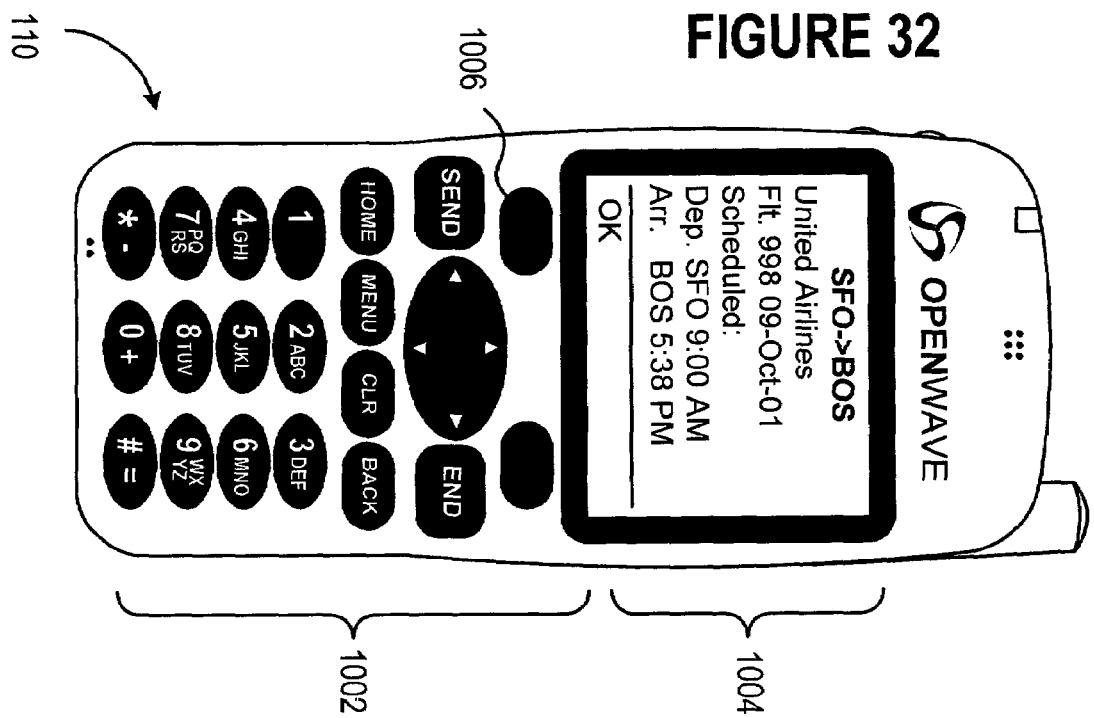

Activation of the description option by the subject user activates a link referring to the flight details card resulting in the display shown in FIG. 32 which includes the substantive content of the flight data object, namely, the airline, the flight number, the date, and departure and arrival information. When the subject user no longer needs to see the detailed information of FIG. 32, the subject user presses key 1006 and returns to the details menu card as shown in FIG. 31.

Figure 33:
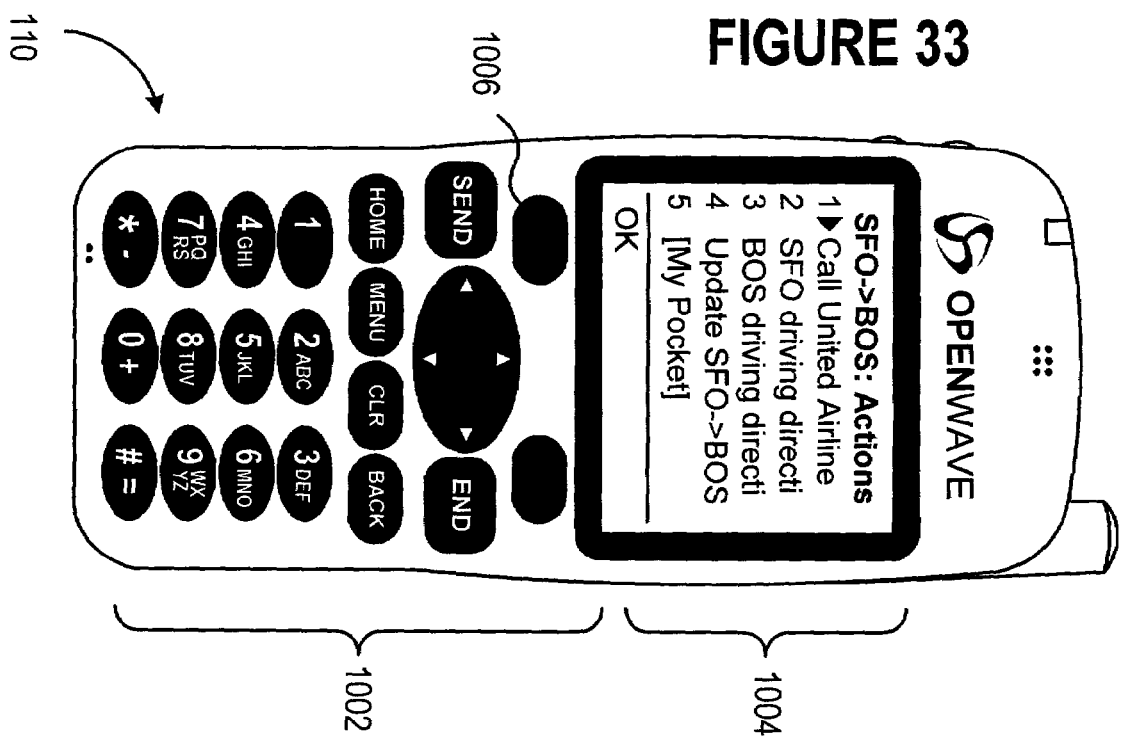

Activation of the "[Actions]" option by the subject user activates a link referring to the actions menu card resulting in the display shown in FIG. 33. As shown in FIG. 33, four (4) actions are associated with flight data objects: (i) call the airline, (ii) obtain driving directions relative to the origin, (iii) obtain driving directions relative to the destination, and (iv) update flight information.

The call action is generally analogous to the call action described above with respect to place data objects with the exception that mobile system interface 210 retrieves the telephone number for the airline of the flight data object from previously stored contact information for those airlines supported by pocket server 112.

Both driving directions actions are generally analogous to the directions action for place data objects described above. However, instead of retrieving location information for the map server from a place data object, mobile system interface 210 (FIG. 2) supplies data identifying the particular airport as one of the locations defining the trip for which directions are sought, which is sometimes referred to herein as the subject trip. For example, in performing the action which obtains driving directions relative to the origin of the subject flight, mobile system interface 210 identifies the airport of origin as one of the two locations defining the subject trip. Some map servers accept airport identification as sufficient specification of a location defining a trip. Accordingly, mobile system interface 210 supplies a standard 3-letter (or 4-letter for international airports) identifier of the airport specified by the flight data object as the airport of origin as the destination of the subject trip in this illustrative embodiment. In an alternative embodiment, mobile system interface 210 determines an alternative specification of the location of the airport, such as an address or latitude/longitude coordinates for example, and supplies the alternative location specification to the map server to obtain driving directions.

In the action by which the subject user obtains driving directions relative to the airport of origin, mobile system interface 210 presumes that the airport of origin is the destination of the subject trip and allows the subject user to specify an origin of the subject trip, i.e., from where the subject user would like directions to the airport of origin. The user specifies the origin of the subject trip in the manner described above with respect to the directions action of place data objects, namely, by selecting a place from the user's pocket dataset 204 or by specifying an address or other location designation. In an alternative embodiment, mobile system interface 210 allows the user to specify that the airport of original for the subject flight is the origin of the subject trip such that the subject user can obtain directions from the airport of origin to another place. Such is useful if the subject user's flight has been delayed a significant amount of time and the subject user would like to leave the airport of original to get something to eat.

The action by which the subject user can obtain driving directions relative to the destination airport is analogous to the action by which the subject user can obtain driving directions relative to the airport of origin except that (i) the destination airport is one of the two locations defining the subject trip and (ii) the destination airport is presumed to be the origin of the subject trip in this illustrative embodiment. In an alternative embodiment, the subject user is free to specify that the destination airport is the destination of the subject trip and to specify a different origin of the subject trip.

In performing the action which updates flight information for the subject flight, mobile system interface 210 submits data representing the airline and flight number of the subject flight to an airline reservation server through wide area network 102. Airline reservation servers are well-known and conventional and are not described further herein. Any of servers 104A–C can be an airline reservation server. In response to the data representing the airline and flight number, mobile system interface 210 receives updated information regarding the scheduled time of departure and, in some embodiments, gate information for the subject flight.

Upon receiving the updated flight information, mobile system interface 210 constructs a new WML deck which includes the updated flight information and sends the new WML deck to wireless telephone 110 for display to the subject user. In this illustrative embodiment, the new WML deck is configured such that the subject user initially sees the flight details card as shown in FIG. 32 such that the updated information is immediately available to the subject user without further interaction with wireless telephone 110.

Thus, the most common things a person wants to know about a flight are made immediately accessible to the subject user through wireless telephone 110. Specifically, the subject user has immediate and easy access to such information as (i) a voice conversation with the airline of the subject flight, (ii) directions to the airport of origin, (iii) directions from the destination airport, and (iv) updated flight information. It should also be noted that this information comes from different servers through wide area network 102. For example, driving directions can be provided by a different server controlled by a different entity than that which provides updated flight information. In addition, the accessibility of this information is significantly enhanced by the ability to use previously entered places to define trips for which directions are sought.

Stock Objects

Figure 34:
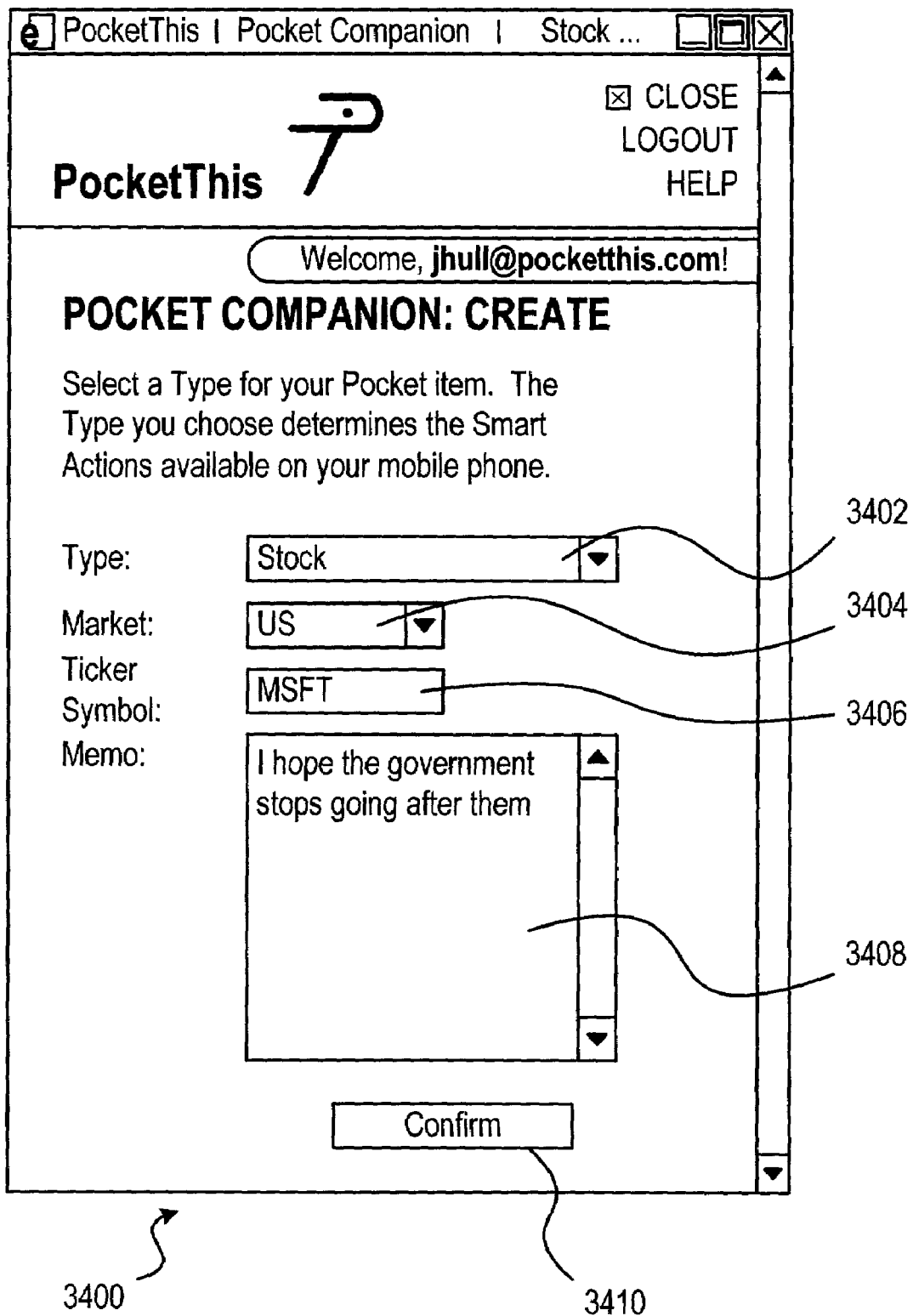
FIG. 34 is a screen view of creation of a stock data object in accordance with the present invention.

Pocket item types 206 (FIG. 2) of pocket server 112 define a stock type of data object to represent an investment of interest to the subject user. The subject user can specify data corresponding to attributes defined by attribute definitions 604 (FIG. 6) of the stock type through client computer 106 using a dialog box such as that shown in screen view 3400 (FIG. 34). The subject user can specify each of the attributes directly using conventional user interface techniques. Alternatively, the various attributes can be pre-specified and embedded in a URL in the manner described above with respect to FIG. 7.

Box 3402 (FIG. 34) indicates that the represented data object is a stock data object. Box 3404 specifies in which public market the subject stock is traded. The subject stock is the stock represented by the stock data object. Box 3406 specifies the ticker symbol of the subject stock. Box 3408 includes any notes the subject user wishes to add to the stock data object. For example, the subject user can note a date, price, and number of shares of a purchase made of the subject stock. Alternatively, or in addition, the subject user can record notes regarding reasons for investing, thoughts regarding potential growth, and/or general thoughts regarding the welfare of the underlying corporation. Upon pressing confirmation button 3410 by the subject user, base system interface 202 receives the HTML form data shown in FIG. 34 from client computer 106 and constructs therefore a stock data object and adds the stock data object to the pocket dataset corresponding to the subject user.

One feature of data object management by pocket server 112 is worth noting. Pocket server 112 organizes data objects for each user according to the date most recently accessed. Navigating lists which span several screens in a mobile device such as wireless telephone 110 is a considerable inconvenience. Accordingly, pocket server 112 assumes that those data objects most recently accessed by the subject user, whether through client computer 106 or through wireless telephone 110, are most likely to be the next accessed data objects. Therefore, pocket server 112 sorts data objects in pocket dataset 204 for the subject user from most recently accessed to least recently accessed.

Figure 35A:
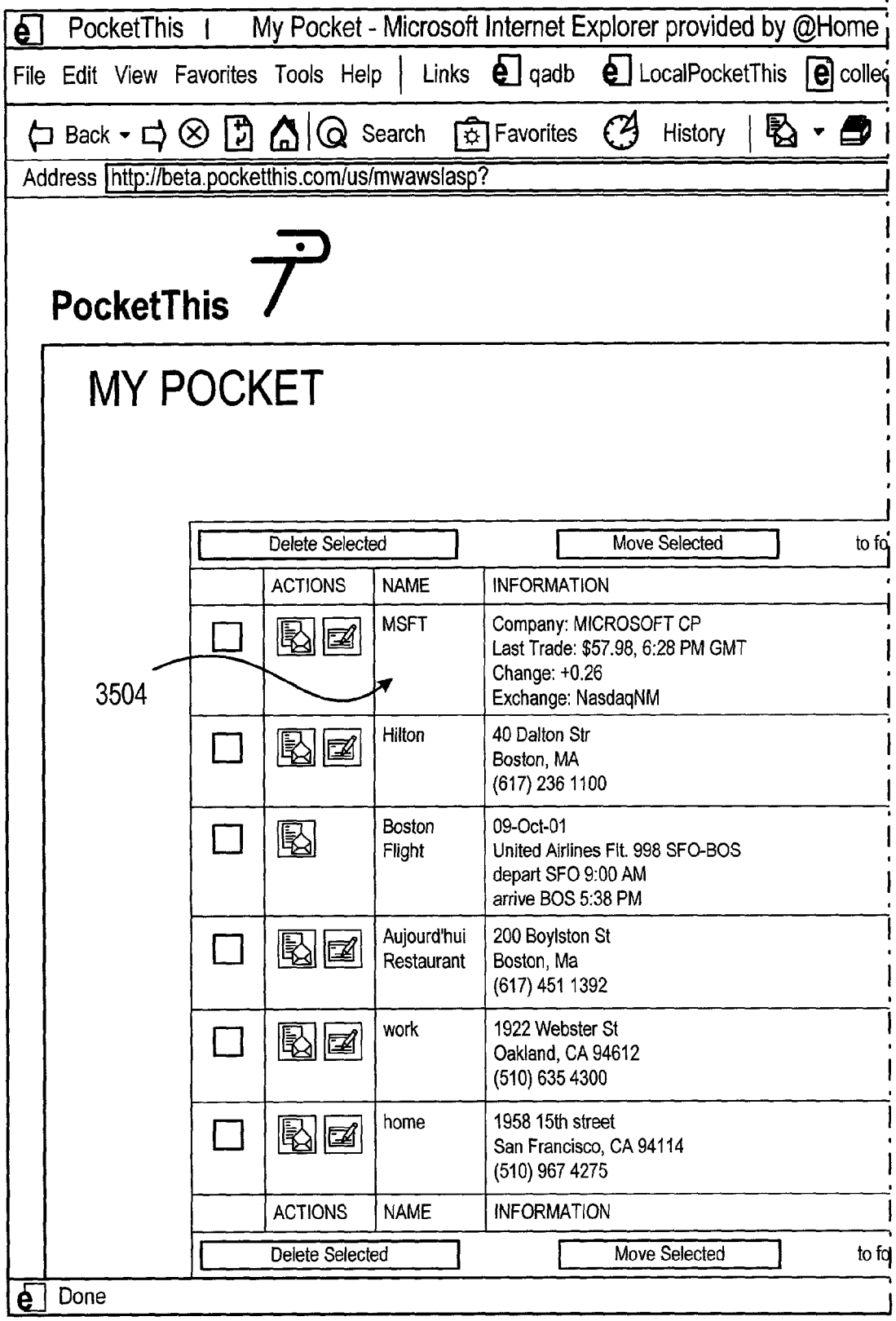
FIG. 35 illustrates placement of the newly created stock object at the beginning of a list of data objects in accordance with the present invention.
Figure 35C:
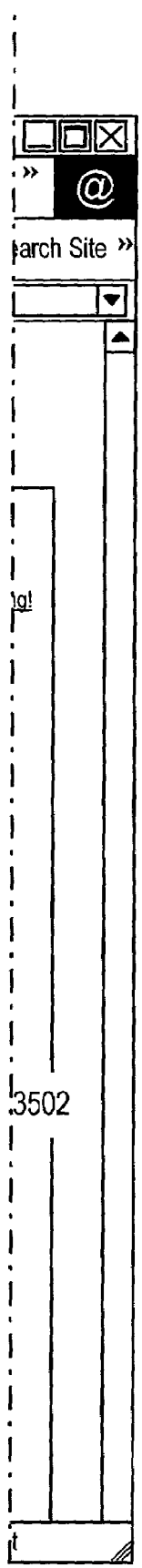
Figure 35:
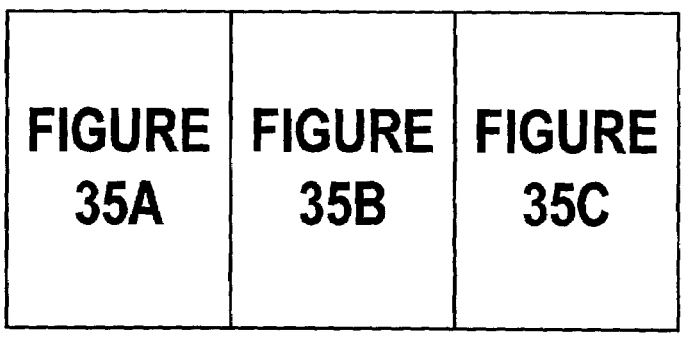

This feature is illustrated by screen view 3500 (FIG. 35) in which the stock data object most recently entered as shown in FIG. 34 is the first item 3504 in the list 3502 of data objects of the subject user. When the subject user accesses the list of data objects through wireless telephone 110, pocket server 112 presents the data objects to the subject user in the same order such that the newly added stock data object is immediately accessible to the subject user.

The subject user selects a stock data object from a list of data objects in the user's pocket dataset in the manner described above for other data objects. In response, mobile system interface 210 (FIG. 2) retrieves the ticker symbol and market of the stock data object from content 508 (FIG. 5) and submits that information to a stock server in the form of a request for updated stock information. Stock servers are well-known and are not described further herein. Examples of stock servers which are currently available include E*TRADE of the E*TRADE Group, Inc. (http://www.e-trade.com); the Nasdaq Stock Market (http://www.nasdaq.com); the New York Stock Exchange (http://www.nyse.com); and North American Quotes (http://www.naq.com). Any of servers 104A–C can act as a stock server. The stock server responds to the request in a conventional manner, supplying the price, date and time of the most recent trade of the identified stock and the change in price from the close of the most recently concluded trading period.

Figure 36:
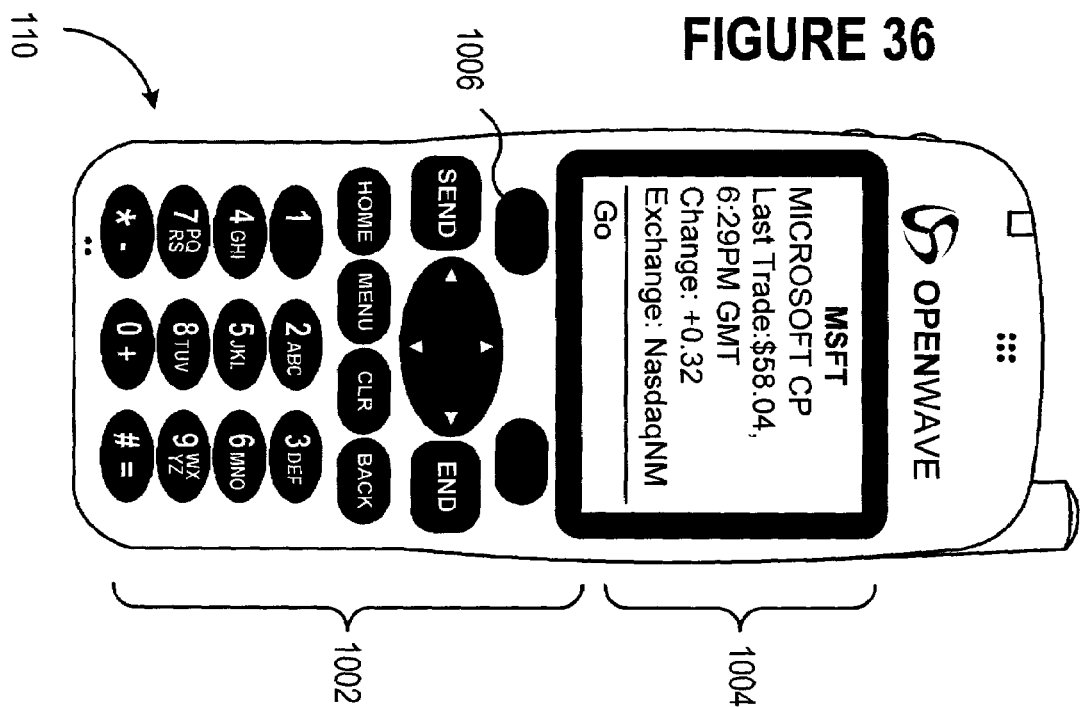
FIGS. 36–37 illustrate access by a user of the stock data object through a mobile device in accordance with the present invention.

Upon receipt of the updated stock information, mobile system interface 210 (FIG. 2) constructs a WML deck representing the updated stock information and including navigation cards to facilitate access to associated actions. The initially displayed card of the WML deck is shown in FIG. 36 and includes the stock ticker symbol as the header, a more detailed name of the stock, the price and time of the last trade, the change in price since the close of the most recently concluded trading period, and the name of the exchange on which the stock is traded.

Figure 37:
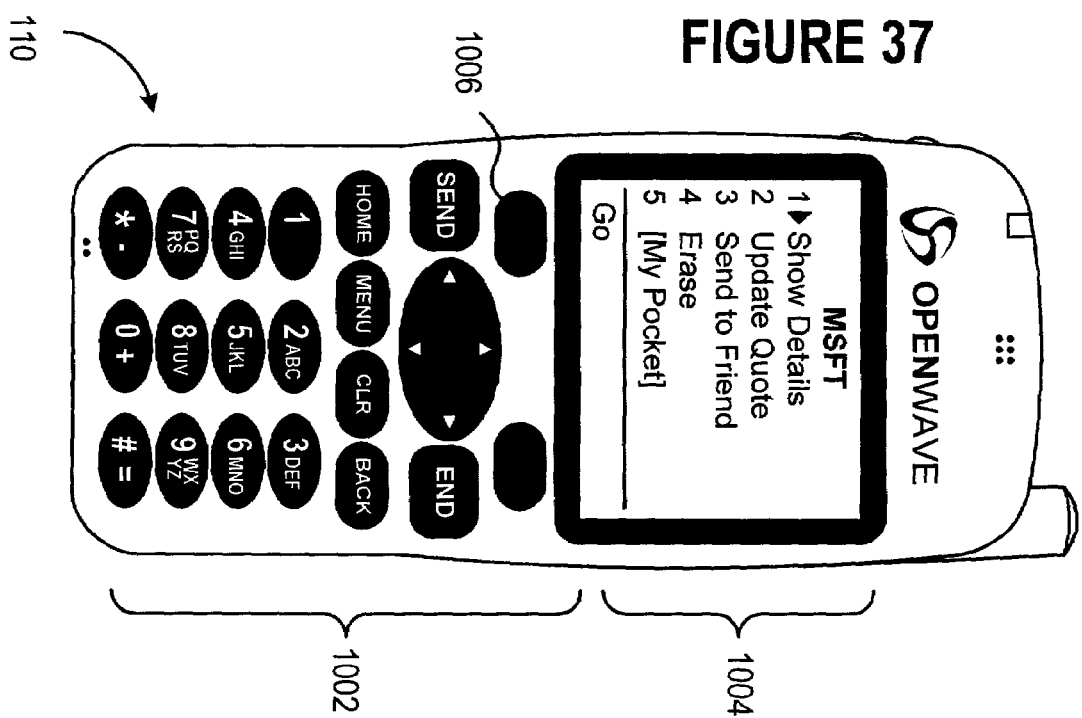

Upon confirmation by the subject user that this updated information has been read, a navigation card of the WML deck is presented to the user as shown in FIG. 37. The actions include those similar to similarly named actions described above, namely, a shown details action which returns the subject user to the card shown in FIG. 37, the send-to-friend action in which the stock data object is added to a pocket dataset associated with another user, the erase action in which the subject stock data object is removed from the pocket dataset associated with the subject user, and the action which returns the subject user to viewing names of all data objects in the user's pocket dataset.

For stock data objects, an update quote action is defined. The update quote action is performed by mobile system interface 210 on behalf of wireless telephone 110. In performing the update quote action, mobile system interface 210 again queries a stock server for updated information on the subject stock in the manner described above and re-constructs the WML deck in the manner described above. Mobile system interface 210 sends the re-constructed WML deck, which includes freshly updated stock information, to wireless telephone 110 for display to the subject user in the manner described above. From the perspective of the subject user, invocation of the update quote action returns the subject user to the display shown in FIG. 36 with the information represented therein newly updated. The behavior is similar to the show details action listed in FIG. 37 except that the show details action merely returns to a previously shown display and there is no interaction with mobile system interface 210 and the information shown is not updated.

Thus, using all the user interface conveniences of client computer 106, the subject user can create stock data objects for each of a number of stocks of interest and subsequently access current information about those stock which significant ease. With a single key press, the user can retrieve a stock data object representing a particular stock. With two key presses—one to access the actions menu and another to invoke the update quote action—the subject user can get newly updated information about the stock.

Product Data Objects

Pocket item types 206 (FIG. 2) define a product type of data object in this illustrative embodiment. The dialog box of screen view 3800 (FIG. 38) illustrates attributes defined by attribute definitions 604 (FIG. 6) of the product type of data object. Product data objects represent items that the subject user has interest in purchasing.

Figure 38:
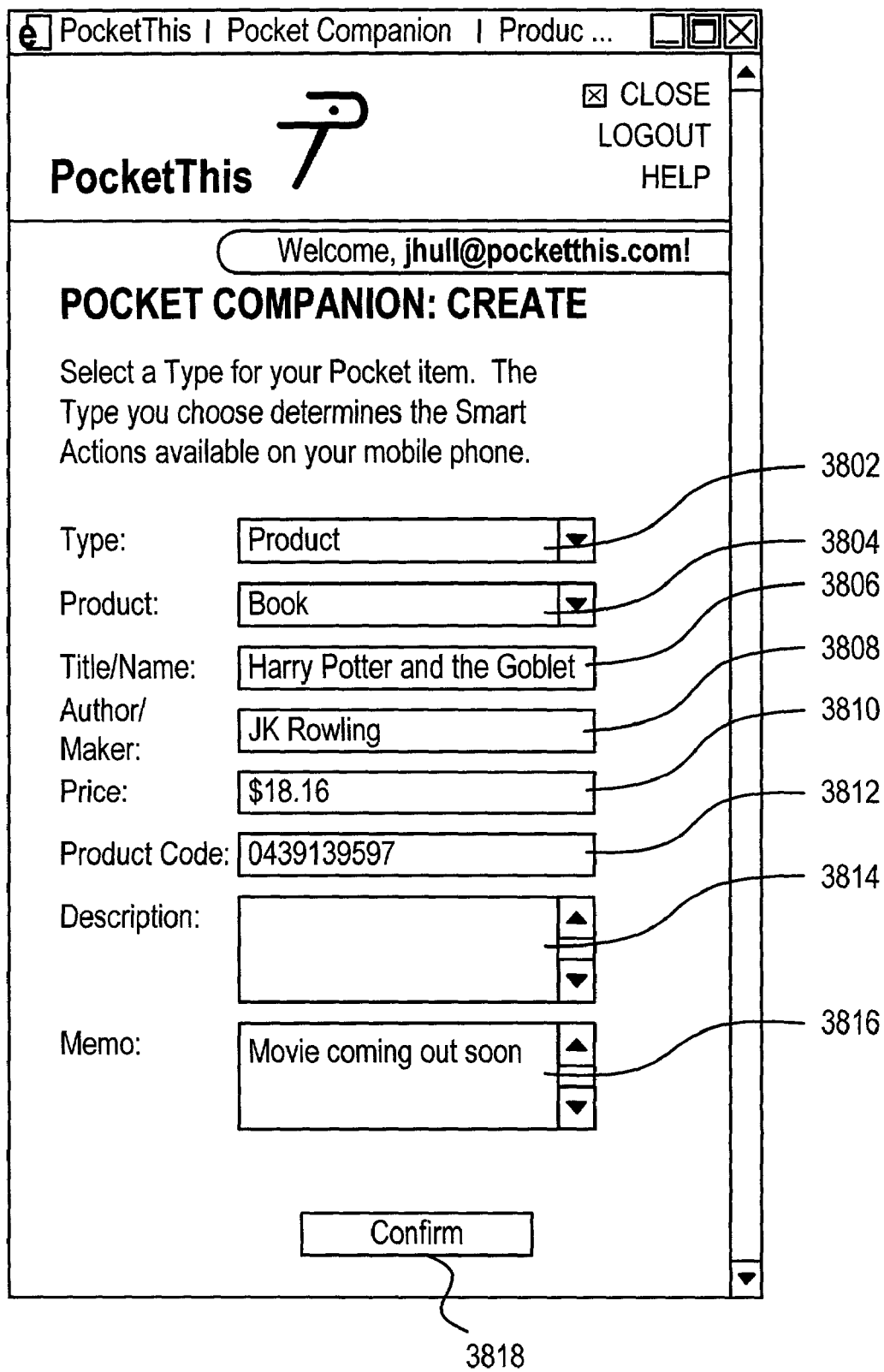
FIG. 38 is a screen view of creation of a product data object in accordance with the present invention.

The subject user can specify data corresponding to attributes defined by attribute definitions 604 (FIG. 6) of the product type through client computer 106 using a dialog box such as that shown in screen view 3800 (FIG. 38). The subject user can specify each of the attributes directly using conventional user interface techniques. Alternatively, the various attributes can be pre-specified and embedded in a URL in the manner described above with respect to FIG. 7.

Box 3802 (FIG. 38) indicates that the represented data object is a product data object. Box 3804 specifies a product sub-type. In this illustrative embodiment, product sub-types include car, clothing, book, electronic, furniture, music, and video/DVD products. Box 3806 specifies the name or brief description of the subject product. The subject product is the product represented by the product data object. Box 3808 identifies the author or manufacturer of the subject product. Box 3810 specifies the price of the product. Box 3812 specifies a product code by which the subject product is identified. For example, the product code can be an International Book Serial Number (ISBN) is the subject product is a book as shown in FIG. 38 in this illustrative example.

Box 3814 includes a more detailed textual description of the subject product. Box 3816 includes any notes the subject user wishes to add to the product data object. Upon pressing confirmation button 3818 by the subject user, base system interface 202 receives the HTML form data shown in FIG. 38 from client computer 106 and constructs therefore a product data object and adds the product data object to the pocket dataset corresponding to the subject user.

Figure 39A:
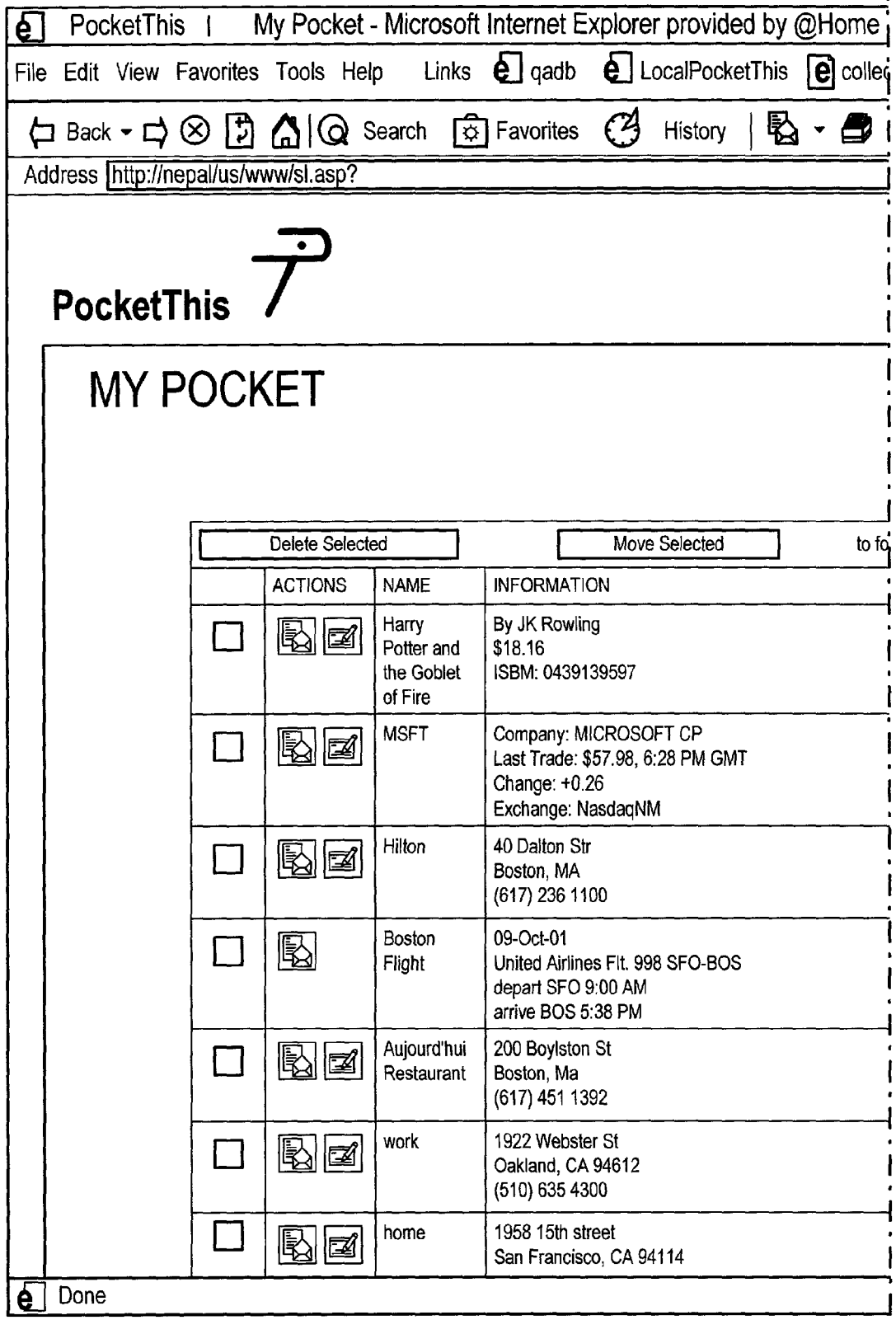
FIG. 39 illustrates placement of the newly created product object at the beginning of a list of data objects in accordance with the present invention.
Figure 39C:
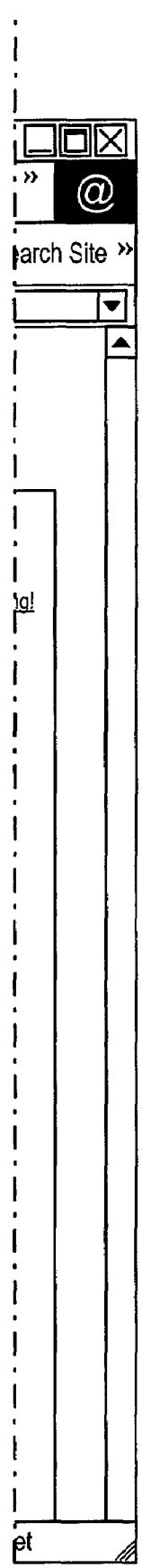
Figure 39:
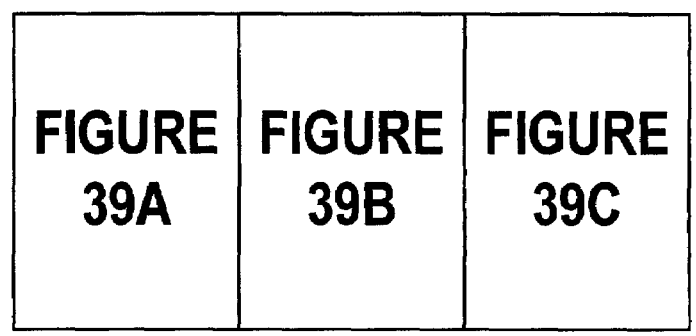

Further illustrating sorting by pocket server 112, the newly added product data object is most recently accessed by either client computer 106 or wireless telephone 110 and is there listed first as shown in screen view 3900 (FIG. 39).

Figure 40:
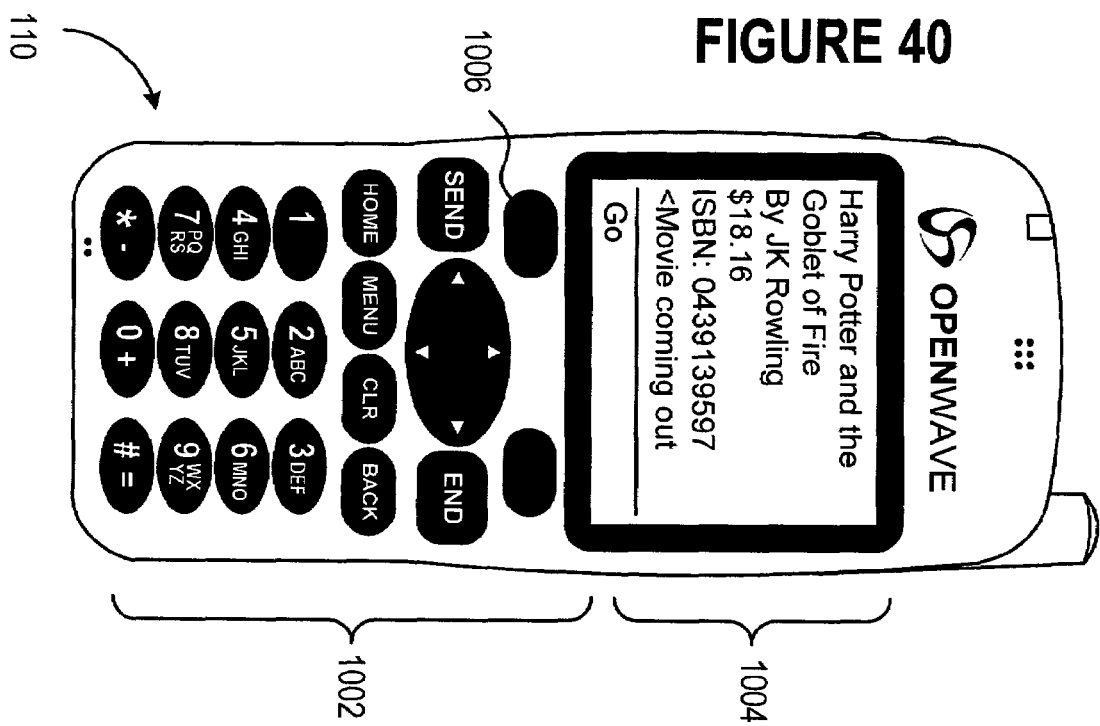
FIGS. 40–41 illustrate access by a user of the product data object through a mobile device in accordance with the present invention.

When mobile system interface 210 (FIG. 2) receives a request to display a product data object, e.g., when selected from a list of data objects by the subject user in the manner described above, mobile system interface 210 retrieves content 508 (FIG. 5) of the requested product data object and builds a WML deck which includes the retrieved content formatted as product information (as shown in FIG. 40) and also includes navigation cards and associations with actions associated with the product type as specified in actions 208.

Figure 41:
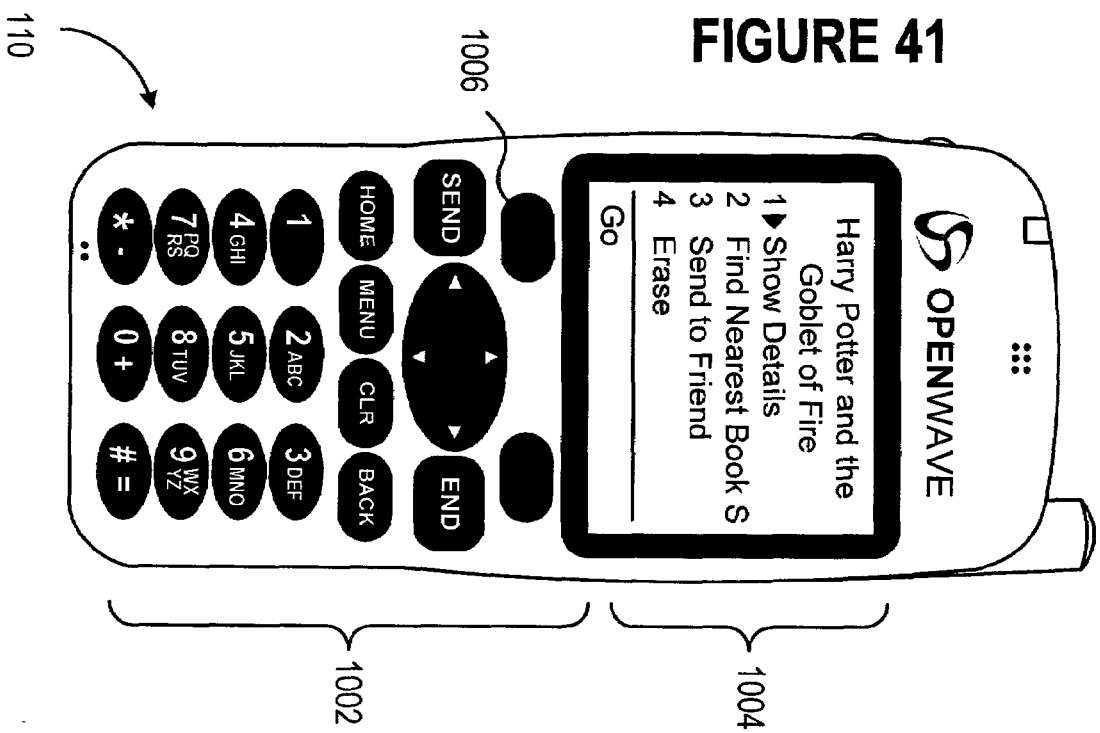
Figure 42A:
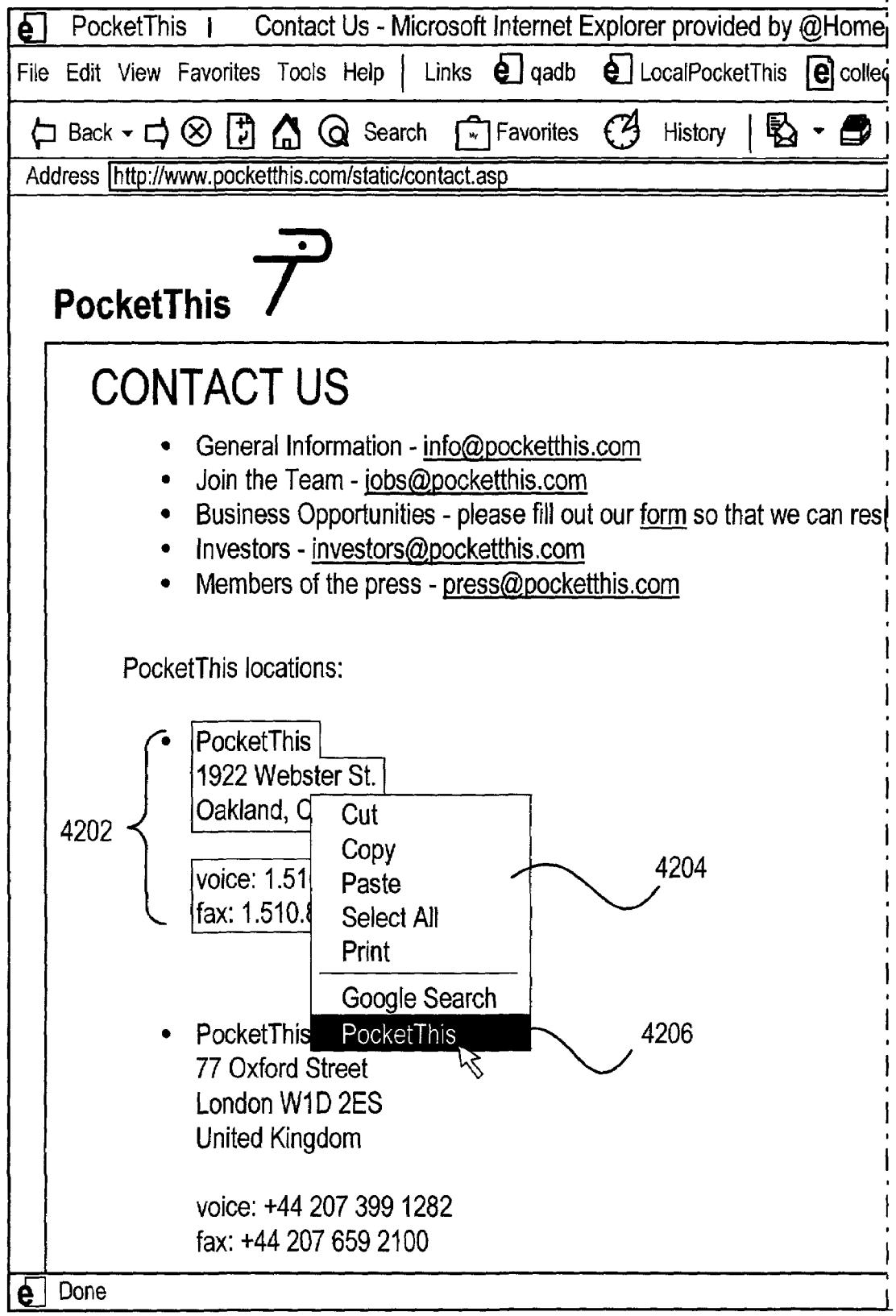
FIG. 42 is a screen view illustrating copying of bulk text by the user.
Figure 42B:
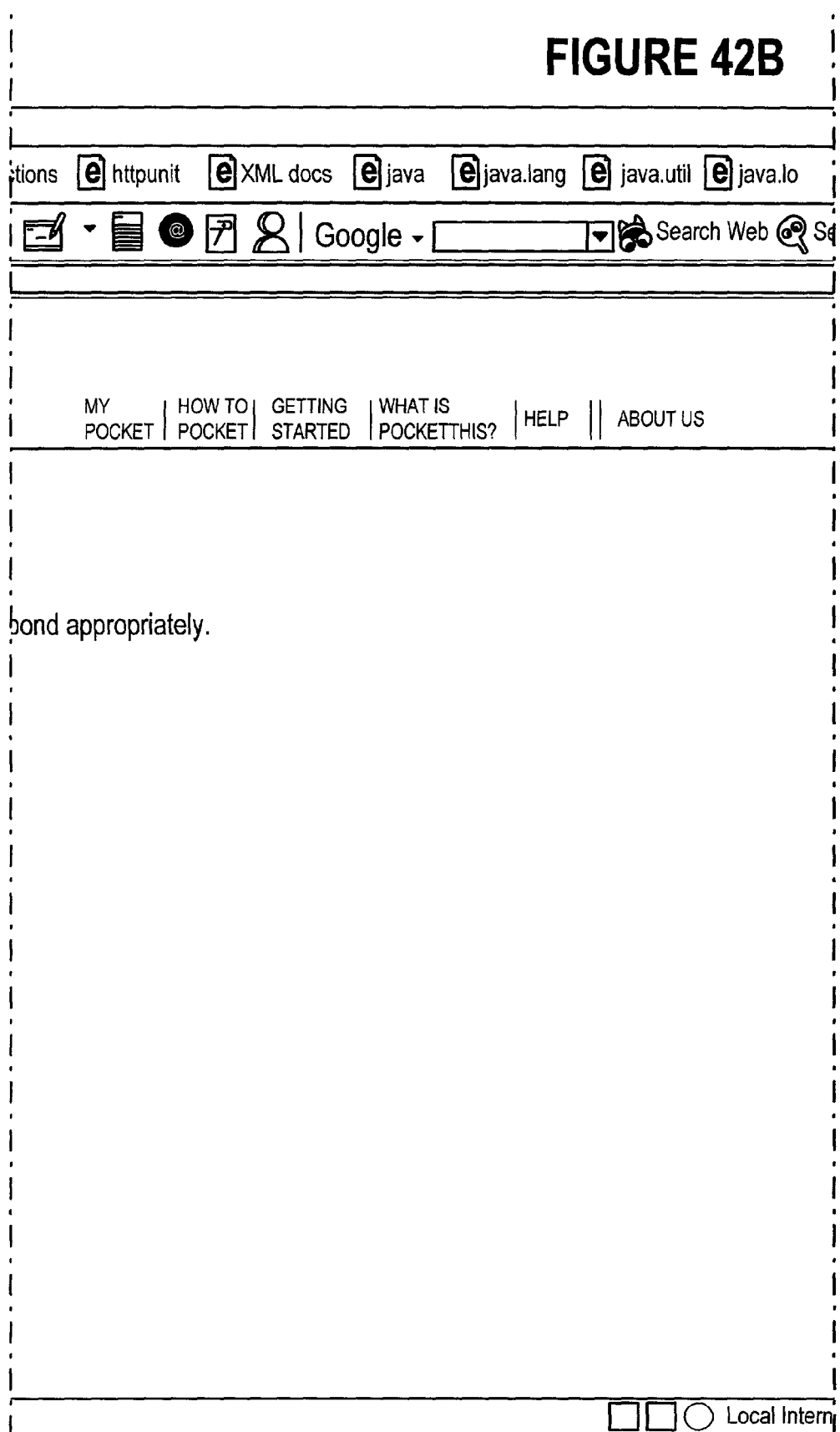
Figure 42C:
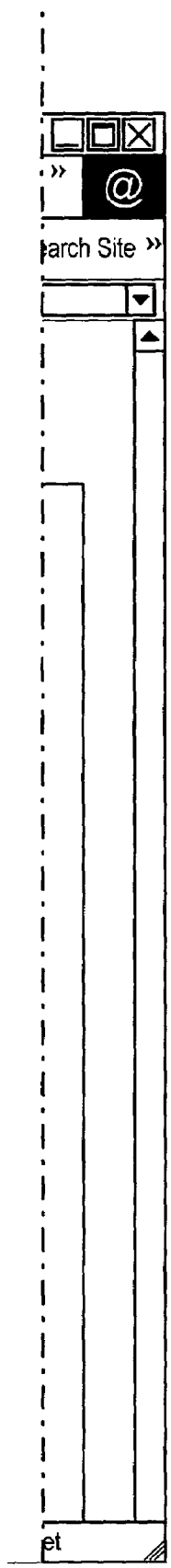
Figure 42:
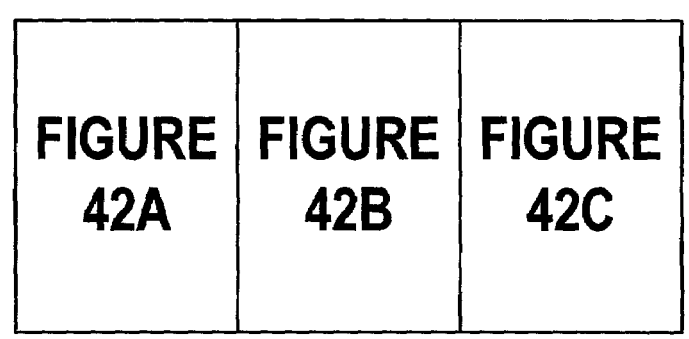
Figure 43:
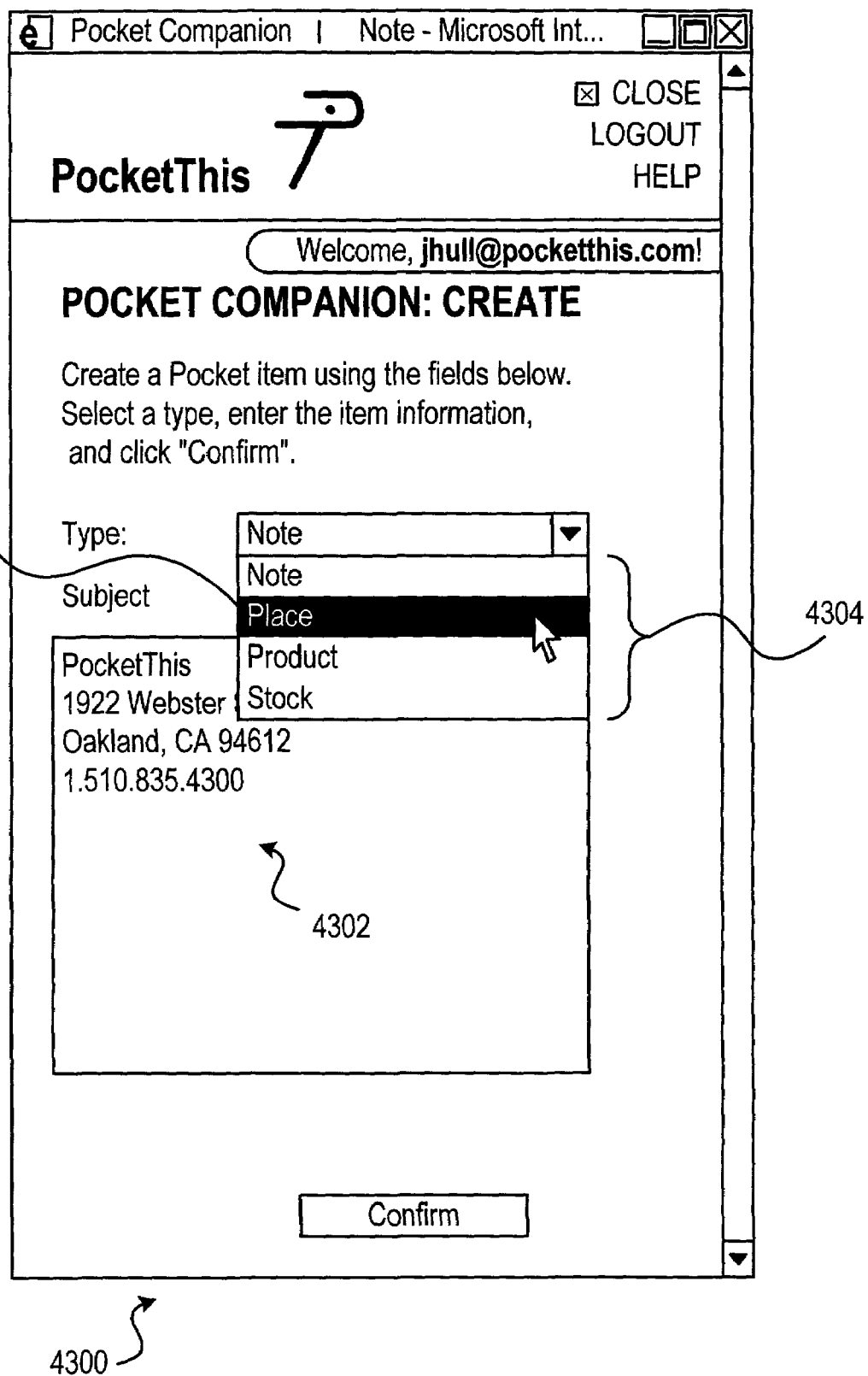
FIG. 43 is a screen view illustrating pasting of the bulk text by the user into a form for creation of a new data object and selection by the user of a pocket item type for the new data object.
Figure 44:
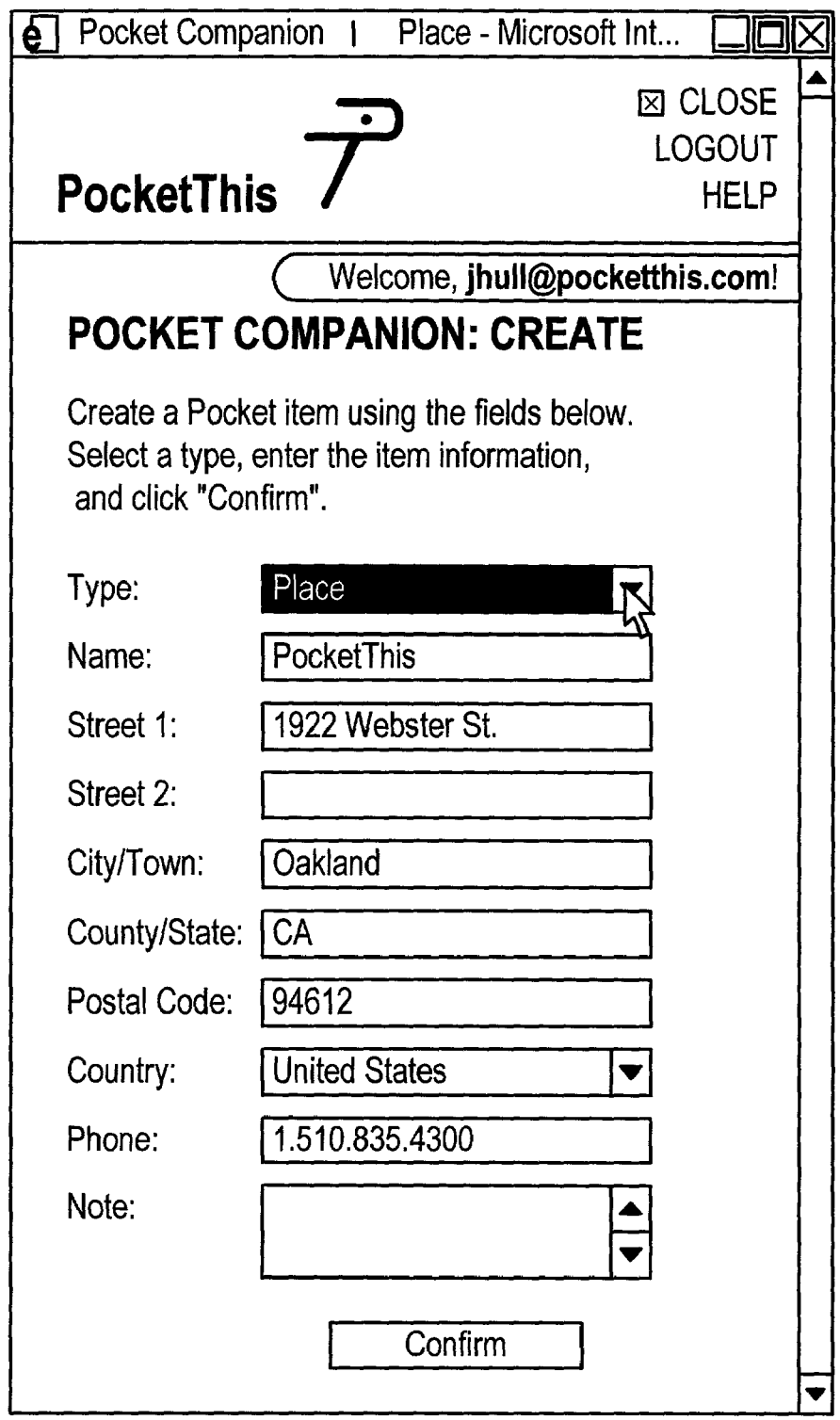
FIG. 44 is a screen view showing the parsed attributes from the bulk text in accordance with the present invention.

Upon acknowledging reading of the detailed information in display 1004 (FIG. 40), e.g., by pressing key 1006, wireless telephone displays an actions menu card (FIG. 41) in display 1004. The show details, send to friend, and erase actions shown are analogous to similarly named actions for other data object types described above.

In addition, a find nearest action is defined for product data objects. The find nearest action is similar to the nearby places action defined for place data objects as described above. Briefly, the subject user, by invoking the find nearest action, is requesting nearby places of a category and subcategory associated with the product subtype. Within the product type definition, pocket server 112 maintains data associating each product subtype with both a directory category and a subcategory. In performing the find nearest action associated with product data objects, mobile system interface 210 queries a directory server as described above in conjunction with the nearby places action, supplying the associated place category and subcategory associated with the current product data object.

As described above, such a request for nearby places is for places near a place of reference. In the find nearest action for product data objects, the point of reference is supplied by the subject user. In a manner analogous to that described above with respect to specification by the subject user of a location defining a trip for which driving directions are sought, the subject user specifies a current location relative to which nearby sources for the subject product are sought. Such includes, for example, identifying a place object with the pocket dataset of the subject user, identifying either airport in a flight data object, or specifying a location explicitly such as by an address or latitude/longitude coordinates.

When mobile system interface 210 receives the list of nearby places from the directory server, mobile system interface 210 constructs a WML deck which includes the nearest places received and sends the WML deck to wireless telephone 110 for presentation to the subject user in the manner described above with respect to FIG. 24.

Folder Data Objects

A folder data object is a data object whose content 508 (FIG. 5) includes one or more references to other objects within pocket item dataset 204. The subject user can create folder data objects through client computer 106 and assign other data object to be included in the created folder. For example, the subject user can create a folder which is to contain all data object pertaining to a particular trip—for example, a flight data object representing the first flight and another representing the return flight, and a place data object representing each of a hotel in which the subject user is staying and various restaurants at which the subject user has plans to dine.

By representing folders using data objects, the ability to associate actions in the manner described above is also applicable to folders. For example, the subject user can send the folder for a particular trip to a friend 416 (FIG. 4) to communicate an entire itinerary with a single action.

In addition, a hierarchy of data objects can be specified in a single URL such as the one described above with respect to link 704 (FIG. 7). In particular, the URL can include component attributes of both a data object and a folder object which contains the data object. In addition, the folder object can have an associated action specified in the URL or previously specified to pocket server and associated with the source or provider which is in turn associated with the newly created folder data object. For example, a URL in a link at a real estate brokerage Web site can include a place object representing a particular property for sale and can include a folder object representing the real estate brokerage, including the place object, and specifying an action which links the subject user to the WAP site of the real estate brokerage for features and information found therein.

Pattern Matching

As described above in conjunction with FIG. 7, specific attributes of a data object can be specified in a URL such that the subject user can immediately add the data object with a single user interface gesture. However, such requires that an author of the Web page including the URL embed the attributes of the associated data object into the URL to enable this particularly useful feature.

Occasionally, the subject user will want to include a data object pertaining to information found on wide area network 102 that is not pre-configured for direct input to pocket server 112 as a data object ready for storage in the subject user's dataset 204. Accordingly, pocket server 112 helps automate this process by recognizing attributes of data object types in text selected by the subject user.

Screen view 4200 (FIG. 42) shows selected text 4202 of a Web page shown on client computer 106 during browsing of wide area network 102 by the subject user. The subject user selects selected text 4202 (FIG. 42) using well-known and conventional user interface techniques. In addition, the subject user causes a pop-up menu 4204 to be presented. A pop-up menu such as pop-menu 4204 is typically invoked using a secondary button on a pointing device such as an electronic mouse or trackball. The subject user selects option 4206 which is labeled "PocketThis!"

Selection of option 4206 sends selected text 4202 to base system interface 202 (FIG. 2) in conjunction with a request to create a new data object for storage in object dataset 204 for the subject user. In response, base system interface 202 presents a dialog box 4300 (FIG. 43) by which the subject user is permitted to modify the data object prior to storage in pocket dataset 204 (FIG. 2). Base system interface 202 assumes a default type of data object, namely, a note. A note data object is the simplest type of data object in this illustrative embodiment of the present invention. In particular, a note includes only subject and text body attributes and supports only the show details, send to friend, and erase actions described above. Accordingly, selected text 4202 (FIG. 42) is initially represented as textual body 4302 (FIG. 43) of a prospective new note data object.

In this illustrative example, the subject user intents selected text 4202 (FIG. 42) to be a place data object. Accordingly, the subject user selects option 4306 (FIG. 43) from a pull-down menu 4304 to indicate that the newly created data object should be a place data object. Pull-down menus are known and conventional user interface mechanisms and are not described further herein.

In response to indication by the subject user that the newly created data object should be a place data object, base system interface 202 retrieves an attribute pattern 606 (FIG. 6) of pocket item type 206 according to which base system interface 202 parses attributes defined by attributed definitions 602. Parsing of telephone numbers and addresses is well-known and conventional and is not described further herein.

Figure 45C:
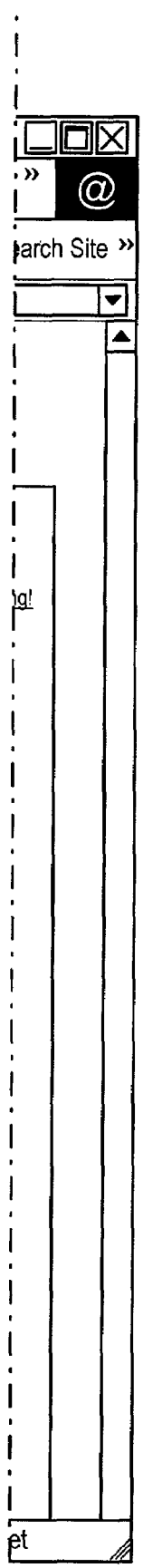
FIG. 45 is a screen view showing the newly parsed and created data object in a list of data objects associate with the user.
Figure 45:
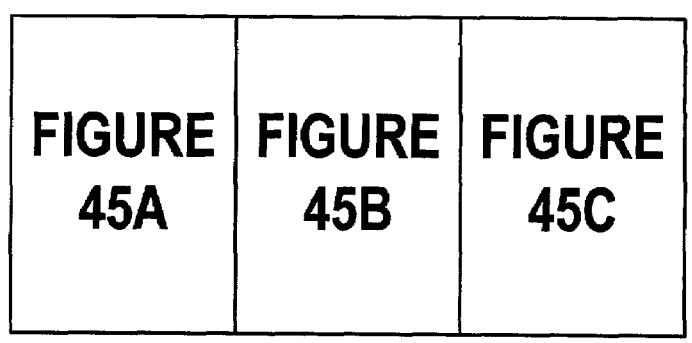

Once text body 4302 (FIG. 43) is parsed by base system interface 202, base system interface 202 presents a dialog box 4400 as an HTML form within a Web page to client computer 106 thus allowing the subject user to verify and/or correct the parsing of the place attributes prior to confirmation in the manner described above. Upon confirmation by the subject user, base system interface 202 receives the HTML form data specifying the respective attributes of the new place data object, constructs the new place data object using the form data, and stores the new place data object in the subject user's pocket dataset 204. The new place data object is shown in the subject user's pocket dataset 204 in screen view 4500 (FIG. 45).

Thus, the user can easily and quickly add new data objects based on data found in Web pages or other documents not otherwise prepared for automatic creation of pocket data objects.

Tracking of Browsing by the Subject User

As described above, access of a particular data object by the subject user moves that data object to the beginning of the list of data objects in the pocket dataset 204 of the subject user. In this illustrative embodiment, base system interface 202 updates access time 506 (FIG. 5) in accordance with the most recent access of data object 306. Subsequently, in displaying data objects of the pocket dataset 204 associated with the subject user, base system interface 202 (if the subject user is listing the data objects on client computer 106) or mobile system interface 210 (if the subject user is listing the data objects on wireless telephone 110) sorts the data object by most recent access time. In an alternative embodiment, pocket server 112 maintains a sequence data field (not shown) in data object 306 which is set each time data object 306 is accessed by the subject user to thereby enable sorting of data objects according to recency of access. In another alternative embodiment, data object 306 includes one or more pointers (not shown) to other data objects in the subject user's pocket dataset 204 (FIG. 3) and pocket server 112 maintains an ordered linked list of data objects in each pocket dataset according to recency of access by the associated user.

In this illustrative embodiment, the subject user does not need to explicitly view a data object in her pocket dataset 204 to move that data object to the beginning of the list of data objects. Mere viewing of a Web page in which the substance of the data object is represented is sufficient.

To illustrate this feature, it is helpful to consider the example of the subject user's visiting the Web page shown in screen view 702 (FIG. 7) after link 704 has been used to add the place object to the user's dataset 204 in the manner described above.

In this illustrative example, the Web page of screen view 702 is served by a server such as any of servers 104A–C. In this illustrative example, this Web page is served by server 104A. In serving the Web page, server 104A stores a document which defines the content of screen view 702 in HTML (Hyper-Text Markup Language) and presents the document in response to a request for the document in the form of a URL identifying the document. Such a URL includes identification of server 104A as the server for the Web page defining screen view 702. Such identification is typically a domain name or an Internet Protocol (IP) address.

HTML documents are well-known and conventional. However, to facilitate appreciation and understanding of the present invention, certain aspects of HTML documents are described briefly herein. It is common for HTML document to include other embedded documents. In fact, since HTML is a textual language and HTML document include only text, all images, sounds, and active scripts in Web pages are defined by separate documents which are included in the HTML document by reference—by the URL of the embedded separate document. Such embedded documents can be served by a different server than the server serving in the embedding HTML document. In this illustrative example, photograph 708 (FIG. 7) is included by reference and is served by a different server, e.g., server 104B.

When the subject user requests the Web page of screen view 702 by use of the URL thereof, client computer 106 sends the URL through wide area network 102 to server 104A. Server 104A responds by sending the HTML document of the Web page. In displaying the Web page, client computer 106 encounters the embedded URL for photograph 708 and sends the photograph URL through wide area network 102 to server 104B which responds by sending a data file which represents photograph 708. Until the subject user activates link 704, pocket server 112 normally has no awareness of or interaction with client computer 106 or servers 104A–B related to the viewing of the Web page by the subject user.

However, the Web page shown in screen view 702 is configured to inform pocket server 112 of the fact that the subject user has visited the Web page of screen view 702. In particular, the HTML document defining the Web page of screen view 702 includes an embedded item served by pocket server 112 such that pocket server 112 is involved in the display of the Web page of screen view 702. Specifically, a single pixel 710 which is the same color as the background of the subject Web page is served by pocket server 112.

In addition to making pocket server 112 aware of the display of the Web page, pocket server 112 is notified as to the particular user displaying the Web page and the particular pocket data object associated with the Web page. To inform pocket server 112 as to which Web page is being displayed, both link 704 and 710 include the URL of the Web page of screen view 702 embedded therein. When pocket server 112 stores a data object as a result of activation of link 704, pocket server 112 receives the URL of the Web page of screen view 702 and associates the URL with the stored data object. Accordingly, the URL of the Web page of screen view 702 can be used by pocket server 112 to identify which of the data object within pocket datasets 204 (FIG. 2) corresponds to the Web page of screen view 702 (FIG. 7).

To identify the subject user as the particular user browsing the Web page of screen view 702, pocket server 112 uses a cookie. Cookies and their use are known and conventional. Briefly, a cookie is a unique identifier by which a server recognizes a previously served client. The first time the subject user views the Web page of screen view 702, there is no cookie placed there by pocket server 112. Accordingly, pocket server 112 does not recognize the user. Pocket server 112 stores a cookie on client computer 106 such that subsequent views of the Web page of screen view 702 enable recognition of the subject user by pocket server 112. In this illustrative embodiment, the subject user places the place data object represented by link 704 in the pocket dataset associated with the subject user in the manner described above in this first visit.

When the subject user subsequently visits the Web page of screen view 702, the embedded pixel 710 informs pocket server 112 of the viewing of the Web page. In serving embedded pixel 710, pocket server 112 retrieves the cookie identifying the subject user. Accordingly, pocket server 112 knows the identity of both the subject user and the place data object described in the viewed Web page.

As a result of the subject user's visit to this Web page, pocket server 112 assumes that the described data object was viewed by the subject user, albeit served by a different server through wide area network 102. Pocket server 112 therefore updates the order in which data objects are presented to the subject user, through both client computer 106 and wireless telephone 110.

Thus, by merely viewing the Web page of screen view 702, the data object representing place data 706 is the first item listed when subsequently accessed through wireless telephone 110. In essence, the subject user's pocket dataset 204 is perpetually updated to reflect items determined to be of interest to the subject user—even when the subject user is not directly interacting with pocket server 112.

Thus, a mechanism is provided by which pocket server 112 is notified when data associated with a particular data object is accessed by a particular user. It should be appreciated that different levels of access can be notified. For example, pocket server 112 can be notified in the manner described above when substantive content 706 (FIG. 7) is displayed to the subject user. Similarly, any of servers 104A–C providing a Web page which includes a link to the Web page of screen view 702 can similarly notify pocket server 112 that the subject user has accessed information which is apparently relevant to content 706.

Mobile system interface 210 (FIG. 2) similarly updates access time 506 (FIG. 5) when the user has accessed data object 306 through wireless telephone 110. In various embodiments, different levels of access are required before access time 506 is updated. In one embodiment, time accessed 508 is updated when data object 306 is presented in a list of data objects to the subject user through wireless telephone 110. In an alternative embodiment, time accessed 508 is updated when the details of data object 306 are viewed by the subject user. In another embodiment, time accessed 508 is updated when the subject user requests a list of applicable actions for data object 306.

Off-Line Identification of Pre-Stored Data Objects

Having users moving about with complete access to a vast, wide area network such as the Internet provides advertisers with a tremendous opportunity to grant access to their products and services. However, much advertising is through mass media when the targeted customers are not using or near their computers.

The data objects described herein, being organized into attributes on which actions can act, provide a convenient, orderly access point for users of mobile devices to access the vast amount of information available through Internet-capable mobile devices. In addition, typical WAP URLs—being alphanumeric—are particularly difficult to enter using the typical numeric keypad 1002 available with most mobile devices.

Accordingly, pocket server 112 allows data objects such as data object 306 to be stored independently of any user and associated with a numerical identifier. Accordingly, a data object representing a restaurant—with all the attributes individually specified and all relevant actions properly defined—can be pre-created and stored within pocket server 112 and associated with a numerical identifier. The restaurant can be advertised on television, radio, billboards, in airports and train stations, in newspapers, etc.—all places which compete for customers' attention when the customer is away from her computer.

If a customer is interested in the restaurant, the customer can—through wireless telephone 110 which is immediately accessible to the customer while out and about—select a "Pocket by Number" action and provide the numerical identifier. Since the identifier is numerical, the customer can readily enter it using the numerical keypad 1002 of the typical mobile device. Even mobile devices such as PDAs which support textual input have difficulty with punctuation and other symbols typically included in URLs—WAP or otherwise. Accordingly, the simplicity of numerical identifiers significantly improves the ease with which the user can specify the identifier in these other forms of mobile devices.

Thus, the customer has access to the restaurant in the form of its name, address, an auto-dial action, driving directions, directories of nearby places, etc. all by entering several digits of a numerical identifier of the restaurant. Such represents tremendous economy in the amount of user effort compared to the amount of useful information obtained by such effort in a mobile information platform.

The above description is illustrative only and the present invention is defined solely by the claims which follow and their full range of equivalents.

What is claimed is:

1. A method for managing information on behalf of a user, the method comprising:
receiving data representing the information from the user through a base system interface;
storing a data object representing the data in a database;
associating the data object with the user within the database;
associating the data object with a select one of two or more data object types wherein the selected data object type specifies the type of the data object;
parsing the data into one or more portions, each of which corresponds to the one or more data attributes defined for the selected data object type;
receiving a request from the user for retrieval of the data through a mobile system interface; and
sending the data to the user through the mobile system interface in accordance with one or more data attributes defined for the selected data object type; and
wherein storing the data object includes storing the one or more portions organized according to the data attributes defined for the selected data object type.

2. The method of claim 1 wherein each of the data object types is associated with a type identifier.

3. The method of claim 1 wherein the parsing is according to an attribute pattern specified for the selected data object type.

4. A method for managing information on behalf of a user, the method comprising:
receiving data representing the information from the user through a base system interface;
storing a data object representing the data in a database;
associating the data object with the user within the database;
associating the data object with a select one of two or more data object types wherein the selected data object type specifies the type of the data object;
receiving a request from the user for retrieval of the data through a mobile system interface; and
sending the data to the user through the mobile system interface in accordance with one or more data attributes defined for the selected data object type along with one or more user interface triggers by which the user can invoke one or more respectively associated actions defined for the selected object type to be taken with respect to the data.

5. The method of claim 4 wherein a selected one of the actions is to be performed by a mobile device used by the user to request the data.

6. The method of claim 5 wherein the selected action has a behavior defined by one or more instructions to be performed by the mobile device; and
further wherein sending the data to the user includes sending the instructions with the data.

7. The method of claim 4 wherein a selected one of the actions is accessible to the user only if the selected data object type of the data object is one of one or more acceptable ones of the two or more data object types.

8. The method of claim 4 wherein performance of a selected one of the actions acts upon one or more of the data attributes of the data object.

9. The method of claim 4 wherein a selected one of the actions is accessible to the user depending upon user data representing characteristics of the user.

10. The method of claim 9 wherein the user data includes specification of a mobile data services provider.

* * * * *